(12) United States Patent
Gentalen et al.

(10) Patent No.: US 11,285,484 B2
(45) Date of Patent: Mar. 29, 2022

(54) MULTICHANNEL ISOELECTRIC FOCUSING DEVICES AND HIGH VOLTAGE POWER SUPPLIES

(71) Applicant: Intabio, LLC, Washington, DC (US)

(72) Inventors: Erik Gentalen, Fremont, CA (US); Eric Gwerder, Pleasanton, CA (US); Scott Mack, Boulder Creek, CA (US)

(73) Assignee: Intabio, LLC, Washington, DC (US)

( * ) Notice: Subject to any disclaimer, the term of this patent is extended or adjusted under 35 U.S.C. 154(b) by 0 days.

(21) Appl. No.: 16/799,387

(22) Filed: Feb. 24, 2020

(65) Prior Publication Data
US 2021/0046480 A1    Feb. 18, 2021

Related U.S. Application Data

(60) Provisional application No. 62/909,675, filed on Oct. 2, 2019, provisional application No. 62/893,549, filed
(Continued)

(51) Int. Cl.
*B01L 3/00* (2006.01)
*G01N 27/447* (2006.01)

(52) U.S. Cl.
CPC ....... *B01L 3/502776* (2013.01); *B01L 3/5027* (2013.01); *B01L 3/502715* (2013.01);
(Continued)

(58) Field of Classification Search
CPC ............. B01L 3/5027; B01L 3/502776; G01N 27/44795
See application file for complete search history.

(56) References Cited

U.S. PATENT DOCUMENTS

| 5,110,434 A | 5/1992 | Zhu et al. |
| 5,183,489 A | 2/1993 | Brehm et al. |

(Continued)

FOREIGN PATENT DOCUMENTS

| AT | 548347 T | 3/2012 |
| DE | 05705627 T1 | 5/2007 |

(Continued)

OTHER PUBLICATIONS

D. Ross, Simple Device for Multiplexed Electrophoretic Separations Using Gradient Elution Moving Boundary Electrophoresis with Channel Current Detection, Analytical Chemistry, 2008, 80, p. 9467-9474. (Year: 2008).*

(Continued)

*Primary Examiner* — Luan V Van
*Assistant Examiner* — Caitlyn Mingyun Sun
(74) *Attorney, Agent, or Firm* — McAndrews Held & Malloy, Ltd.

(57) ABSTRACT

Methods, devices, and systems for performing a plurality of isoelectric focusing reactions in parallel are described. In some instances, the disclosed devices may be designed to perform isoelectric focusing or other separation reactions followed by further characterization of the separated analytes using mass spectrometry. The disclosed methods, devices, and systems provide for fast, accurate separation and characterization of protein analyte mixtures or other biological molecules by isoelectric point.

14 Claims, 47 Drawing Sheets

Related U.S. Application Data on Aug. 29, 2019, provisional application No. 62/885,733, filed on Aug. 12, 2019.

(52) U.S. Cl.
CPC ... *B01L 3/502761* (2013.01); *B01L 3/502792* (2013.01); *G01N 27/44791* (2013.01); *G01N 27/44795* (2013.01); *B01L 2200/0636* (2013.01); *B01L 2200/0647* (2013.01); *B01L 2200/0684* (2013.01); *B01L 2300/047* (2013.01); *B01L 2300/0645* (2013.01); *B01L 2300/0816* (2013.01); *B01L 2300/0864* (2013.01); *B01L 2300/12* (2013.01); *B01L 2300/161* (2013.01); *B01L 2400/0421* (2013.01)

(56) References Cited

U.S. PATENT DOCUMENTS

| | | |
|---|---|---|
| 5,259,939 A | 11/1993 | Chen |
| 5,395,502 A | 3/1995 | Pawliszyn |
| 5,423,964 A | 6/1995 | Smith et al. |
| 5,468,359 A | 11/1995 | Pawliszyn |
| 5,779,868 A | 7/1998 | Parce et al. |
| 5,784,154 A | 7/1998 | Pawliszyn |
| 5,800,690 A | 9/1998 | Chow et al. |
| 5,842,787 A | 12/1998 | Kopf-Sill et al. |
| 5,858,195 A | 1/1999 | Ramsey |
| 5,876,675 A | 3/1999 | Kennedy |
| 5,880,071 A | 3/1999 | Parce et al. |
| 5,957,579 A | 9/1999 | Kopf-Sill et al. |
| 5,958,203 A | 9/1999 | Parce et al. |
| 5,965,001 A | 10/1999 | Chow et al. |
| 5,972,187 A | 10/1999 | Parce et al. |
| 5,985,121 A | 11/1999 | Wu et al. |
| 6,001,229 A | 12/1999 | Ramsey |
| 6,010,607 A | 1/2000 | Ramsey |
| 6,010,608 A | 1/2000 | Ramsey |
| 6,033,546 A | 3/2000 | Ramsey |
| 6,042,709 A | 3/2000 | Parce et al. |
| 6,048,498 A | 4/2000 | Kennedy |
| 6,080,295 A | 6/2000 | Parce et al. |
| 6,110,343 A | 8/2000 | Ramsey et al. |
| 6,149,787 A | 11/2000 | Chow et al. |
| 6,167,910 B1 | 1/2001 | Chow |
| 6,186,660 B1 | 2/2001 | Kopf-Sill et al. |
| 6,231,737 B1 | 5/2001 | Ramsey et al. |
| 6,287,520 B1 | 9/2001 | Parce et al. |
| 6,321,791 B1 | 11/2001 | Chow |
| 6,413,401 B1 | 7/2002 | Chow et al. |
| 6,430,512 B1 | 8/2002 | Gallagher |
| 6,482,364 B2 | 11/2002 | Parce et al. |
| 6,494,230 B2 | 12/2002 | Chow et al. |
| 6,517,234 B1 | 2/2003 | Kopf-Sill et al. |
| 6,547,942 B1 | 4/2003 | Parce et al. |
| 6,611,768 B2 | 8/2003 | Gallagher |
| 6,632,655 B1 | 10/2003 | Mehta et al. |
| 6,676,819 B1* | 1/2004 | Liu ................ C07K 1/26 204/451 |
| 6,744,046 B2 | 6/2004 | Valaskovic et al. |
| 6,803,568 B2 | 10/2004 | Bousse et al. |
| 6,831,274 B2 | 12/2004 | Smith et al. |
| 6,974,526 B2 | 12/2005 | Lee et al. |
| 6,974,527 B2 | 12/2005 | Liu et al. |
| 6,977,372 B2 | 12/2005 | Valaskovic et al. |
| 7,001,496 B2 | 2/2006 | Parce et al. |
| 7,022,214 B2 | 4/2006 | Olech |
| 7,166,202 B2 | 1/2007 | Bukshpan et al. |
| 7,243,670 B2 | 7/2007 | Witt et al. |
| 7,285,411 B1 | 10/2007 | Parce et al. |
| 7,329,865 B2 | 2/2008 | Kuypers |
| 7,339,166 B2 | 3/2008 | Tang et al. |
| 7,381,317 B2 | 6/2008 | Liu et al. |
| 7,391,020 B2 | 6/2008 | Bousse et al. |
| 7,425,700 B2 | 9/2008 | Stults et al. |
| 7,426,442 B2 | 9/2008 | Gallagher |
| 7,495,210 B2 | 2/2009 | Li |
| 7,601,251 B2 | 10/2009 | Rooney et al. |
| 7,642,508 B2 | 1/2010 | Li |
| 7,655,477 B1 | 2/2010 | Schneider et al. |
| 7,825,375 B2 | 11/2010 | Sano |
| 7,871,575 B2 | 1/2011 | Baeuerle et al. |
| 8,076,152 B2 | 12/2011 | Robotti |
| 8,097,472 B2 | 1/2012 | Schneider et al. |
| 8,260,561 B2 | 9/2012 | Gallagher |
| 8,267,914 B1 | 9/2012 | Chang et al. |
| 8,613,845 B2 | 12/2013 | Maxwell et al. |
| 8,728,290 B1 | 5/2014 | Sommer et al. |
| 8,859,296 B2 | 10/2014 | Schneider et al. |
| 8,940,232 B2 | 1/2015 | Roach et al. |
| 9,006,648 B2 | 4/2015 | Ramsey et al. |
| 9,108,195 B2* | 8/2015 | Herr ................ G01N 33/54366 |
| 9,159,537 B2 | 10/2015 | McGivney et al. |
| 9,255,905 B1 | 2/2016 | Mellors et al. |
| 9,347,440 B2 | 5/2016 | Lebl et al. |
| 9,362,102 B2 | 6/2016 | Dovichi et al. |
| 9,377,440 B2 | 6/2016 | Wu et al. |
| 9,465,014 B2 | 10/2016 | Dovichi et al. |
| 9,502,225 B2 | 11/2016 | Mellors et al. |
| 9,606,082 B2 | 3/2017 | Mellors et al. |
| 9,728,387 B2 | 8/2017 | Mellors et al. |
| 9,778,223 B2 | 10/2017 | Schneider et al. |
| 10,107,782 B2 | 10/2018 | Huang et al. |
| 10,209,217 B2 | 2/2019 | Gentalen et al. |
| 10,209,218 B2 | 2/2019 | Mellors |
| 10,401,324 B2 | 9/2019 | Gentalen |
| 10,407,655 B2* | 9/2019 | Hinojosa ................ B01L 3/5027 |
| 10,514,360 B1 | 12/2019 | Gentalen et al. |
| 10,591,488 B2 | 3/2020 | Gentalen et al. |
| 10,782,264 B2 | 9/2020 | Gentalen |
| 2002/0079220 A1 | 6/2002 | Pawliszyn |
| 2002/0139751 A1 | 10/2002 | Zhang et al. |
| 2002/0166592 A1 | 11/2002 | Liu et al. |
| 2003/0000835 A1 | 1/2003 | Witt et al. |
| 2003/0089605 A1 | 5/2003 | Timperman |
| 2004/0091943 A1 | 5/2004 | Schneider |
| 2004/0112751 A1 | 6/2004 | Han et al. |
| 2004/0113068 A1 | 6/2004 | Bousse et al. |
| 2004/0202994 A1 | 10/2004 | Timperman |
| 2005/0021799 A1 | 1/2005 | Imamura et al. |
| 2005/0047969 A1 | 3/2005 | Zhao et al. |
| 2005/0072915 A1 | 4/2005 | Stults et al. |
| 2005/0155861 A1 | 7/2005 | Guzman |
| 2005/0189225 A1 | 9/2005 | Liu et al. |
| 2006/0027744 A1 | 2/2006 | Stults et al. |
| 2006/0113463 A1 | 6/2006 | Rossier et al. |
| 2007/0163884 A1 | 7/2007 | Strand et al. |
| 2008/0035484 A1 | 2/2008 | Wu et al. |
| 2008/0318334 A1 | 12/2008 | Robotti |
| 2009/0035770 A1 | 2/2009 | Mathies et al. |
| 2009/0194419 A1 | 8/2009 | Huang et al. |
| 2010/0116659 A1 | 5/2010 | Liu et al. |
| 2010/0155243 A1 | 6/2010 | Schneider et al. |
| 2010/0193702 A1 | 8/2010 | Li et al. |
| 2011/0072914 A1 | 3/2011 | Lebl et al. |
| 2011/0243813 A1 | 10/2011 | Jackinsky et al. |
| 2012/0080316 A1 | 4/2012 | Schneider et al. |
| 2013/0140180 A1 | 6/2013 | Dovichi et al. |
| 2013/0190212 A1 | 7/2013 | Handique et al. |
| 2013/0280815 A1 | 10/2013 | Wu et al. |
| 2013/0319862 A1 | 12/2013 | Kotowski et al. |
| 2014/0360877 A1 | 12/2014 | Ramsey et al. |
| 2015/0008130 A1 | 1/2015 | Schneider et al. |
| 2015/0093757 A1 | 4/2015 | Gavin |
| 2015/0162177 A1 | 6/2015 | McGivney et al. |
| 2015/0311056 A1 | 10/2015 | Dovichi et al. |
| 2015/0340219 A1 | 11/2015 | Mellors et al. |
| 2015/0362460 A1 | 12/2015 | Ferguson |
| 2016/0084805 A1 | 3/2016 | Kelly et al. |
| 2016/0136643 A1 | 5/2016 | Larson |
| 2016/0370319 A1 | 12/2016 | Molho et al. |
| 2017/0025263 A1 | 1/2017 | Mellors et al. |
| 2017/0045527 A1 | 2/2017 | Muthusamy et al. |

(56) References Cited

U.S. PATENT DOCUMENTS

| | | | |
|---|---|---|---|
| 2017/0110307 | A1 | 4/2017 | Mellors et al. |
| 2017/0176386 | A1 | 6/2017 | Gentalen |
| 2017/0299549 | A1 | 10/2017 | Schneider et al. |
| 2017/0363575 | A1* | 12/2017 | Huang ............. G01N 27/44752 |
| 2018/0003674 | A1* | 1/2018 | Gentalen ........... B01L 3/502715 |
| 2018/0036729 | A1 | 2/2018 | Furtaw et al. |
| 2018/0036730 | A1 | 2/2018 | Furtaw et al. |
| 2018/0088080 | A1 | 3/2018 | Dovichi et al. |
| 2019/0128843 | A1 | 5/2019 | Gentalen |
| 2019/0234961 | A1 | 8/2019 | Gentalen |
| 2019/0367861 | A1* | 12/2019 | Swoboda ............... C12M 25/02 |
| 2019/0369048 | A1 | 12/2019 | Gentalen et al. |
| 2019/0369068 | A1 | 12/2019 | Gentalen et al. |

FOREIGN PATENT DOCUMENTS

| | | |
|---|---|---|
| EP | 1715348 B1 | 2/2011 |
| EP | 1718960 B1 | 3/2012 |
| JP | 2005509872 A | 4/2005 |
| JP | 2006505797 A | 2/2006 |
| JP | 2006220551 A | 8/2006 |
| JP | 2010094104 A | 4/2010 |
| JP | 4900245 B2 | 3/2012 |
| JP | 2015516078 A | 6/2015 |
| WO | WO-0015321 A1 | 3/2000 |
| WO | WO-02095362 A2 | 11/2002 |
| WO | WO-2005072121 A2 | 8/2005 |
| WO | WO-2007055293 A1 | 5/2007 |
| WO | WO-2013191908 A1 | 12/2013 |
| WO | WO-2015048458 A2 | 4/2015 |
| WO | WO-2017012397 A1 | 1/2017 |
| WO | WO-2017095813 A1 | 6/2017 |
| WO | WO-2017123970 A1 | 7/2017 |
| WO | WO-2018058131 A1 | 3/2018 |
| WO | WO-2018183622 A1 | 10/2018 |
| WO | WO-2019148198 A1 | 8/2019 |
| WO | WO-2019232397 A1 | 12/2019 |

OTHER PUBLICATIONS

B. Lorber, Protein Analysis by Dynamic Light Scattering: Methods and Techniques for Students, Biochemistry and Molecular Biology Education, 2012(40), p. 372-382. (Year: 2012).*

Herr et al., On-Chip Coupling of Isoelectric Focusing and Free Solution Electrophoresis for Multidimensional Separations, Anal. Chem., Mar. 1, 2003, 75:1180-87.

U.S. Appl. No. 16/808,063 First Action Interview Pilot Program Pre-Interview Communication dated May 21, 2020.

Baker, C. et al. Online Coupling of Digital Microfluidic Devices with Mass Spectrometry Detection Using an Eductor with Electrospray Ionization. Analytical Chemistry, vol. 84, 2012, 6 pages.

Benz, C. et al. Chip-Based Free-Flow Electrophoresis with Integrated Nanospray Mass-Spectrometry. Angewandte Chemie International Edition, vol. 54, 2015, 5 pages.

CE Pharm 2016, Roundtable Discussion Notes (2016). 3 pages. Retrieved at URL: <https://www.casss.org/page/CE16111b>.

Chartogne et al. Capillary electrophoretic separations of proteins using carrier ampholytes. Journal of Chromatography A 959:289-298 (2002).

Chen, et al. Comparison of ampholytes used for slab gel and capillary isoelectric focusing of recombinant tissue-type plasminogen activator glycoforms. J Chromatogr A. Sep. 13, 1996;744(1-2):279-84.

Co-pending U.S. Appl. No. 16/688,141, filed Nov. 19, 2019.
Co-pending U.S. Appl. No. 16/781,436, filed Feb. 4, 2020.
Co-pending U.S. Appl. No. 16/808,063, filed Mar. 3, 2020.
Co-pending U.S. Appl. No. 62/088,353, filed Dec. 5, 2014.

Cui, H. et al. Isoelectric Focusing in a Poly(dimethylsiloxane) Microfluidic Chip. Analytical Chemistry, vol. 77, 2005, 7 pages.

Dai et al. Capillary Isoelectric Focusing-Mass Spectrometry Method for the Separation and Online Characterization of Intact Monoclonal Antibody Charge Variants. Anal Chem. Feb. 6, 2018;90(3):2246-2254.

Deng et al. Chip-Based Capillary Electrophoresis/Mass Spectrometry Determination of Carnitines in Human Urine. Anal Chem 73:639-646 (Feb. 1, 2001).

Dolník, V. Wall coating for capillary electrophoresis on microchips. Electrophoresis. Nov. 2004;25(21-22):3589-601.

Figeys, D. et al. An Integrated Microfluidics-Tandem Mass Spectrometry System for Automated Protein Analysis. Analytical Chemistry, vol. 70, No. 18, Sep. 15, 1998, 7 pages.

Geiser, et al. Potential of formamide and N-methylformamide in nonaqueous capillary electrophoresis coupled to electrospray ionization mass spectrometry. Application to the analysis of beta-blockers. J Chromatogr A. Dec. 6, 2002;979(1-2):389-98.

Gentalen Erik, NIH SBIR Award Abstract #1R44TR002570-01. Award Notice Date: Aug. 10, 2018. 2 pages.

Gentalen Erik, NIH SBIR Award Abstract #4R44TR002570-02. Award Notice Date: Feb. 28, 2019. 2 pages.

Gentalen Erik, NSF SBIR Phase 1 Award Abstract #1747340 (Dec. 18, 2017). 2 pages.

Haselberg, R. et al. Performance of a Sheathless Porous Tip Sprayer for Capillary Electrophoresis-Electrospray Ionization-Mass Spectrometry of Intact Proteins. Journal of Chromatography A, vol. 1217, 2010, 7 pages.

Hühner et al. Capillary isoelectric focusing-mass spectrometry: Coupling strategies and applications. Electrophoresis 36:2670-2686 (2015). First published Aug. 24, 2015. DOI: https://doi.org/10.1002/elps.201500185.

Hiratsuka et al. Fully Automated Two-Dimensional Electrophoresis System for High-Throughput Protein Analysis. Anal Chem 79(15):5730-5739 (Aug. 1, 2007). Published online Jun. 28, 2007.

Hiroaki Nakanishi, et. al. Fabrication of Quartz Microchips with Optical Slit and Development of a Linear Imaging UV Detector for Microchip Electrophoresis Systems, Electrophoresis (2001), vol. 22, pp. 230-234.

Hjertén, Stellan. High-performance electrophoresis : Elimination of electroendosmosis and solute adsorption. Journal of Chromatography A. vol. 347, 1985, pp. 191-198.

Hu, X. et al. Fabrication of a Polystyrene Microfluidic Chip Coupled to Electrospray Ionization Mass Spectrometry for Protein Analysis. Journal of Chromatography B, vol. 990, 2015, 8 pages.

Huang. Finding a Piece of the Protein Characterization Puzzle. The Analytical Chemist, Nov. 2015, pp. 46-48.

Jacobson et al. Microchip Capillary Electrophoresis with an Integrated Postcolumn Reactor. Anal Chem 66:3472-3476 (Oct. 15, 1994).

Jiang, Y. et al. Integrated Plastic Microfluidic Devices with ESI-MS for Drug Screening and Residue Analysis. Analytical Chemistry, vol. 73, 2001, 6 pages.

Jin et al. Estimation of isoelectric points of human plasma proteins employing capillary isoelectric focusing and peptide isoelectric point markers. Electrophoresis. Sep. 2002;23(19):3385-91.

Karger, et al. High-performance capillary electrophoresis in the biological sciences. J Chromatogr. Aug. 11, 1989;492:585-614.

Kitagawa. et al., High-speed Analysis of Proteins by Microchip Isoelectric Focusing with Linear-imaging UV Detection, Analytical Sciences, Aug. 2009, vol. 25, 979-984.

Lalwani et al. Isoelectric buffers, part 3: Determination of pKa and pI values of diamino sulfate carrier ampholytes by indirect UV-detection capillary electrophoresis. Electrophoresis 26(13):2503-2510 (Jul. 2005). First published Jul. 4, 2005. DOI: https://doi.org/10.1002/elps.200500002.

Li, N. et al. Evaluation of the iCE280 Analyzer as a Potential High-Throughput Tool for Formulation Development. Journal of Pharmaceutical and Biomedical Analysis, vol. 43, 2007, 11 pages.

Li, Y. et al. Integration of Isoelectric Focusing with Parallel Sodium Dodecyl Sulfate Gel Electrophoresis for Multidimensional Protein Separations in a Plastic Microfluidic Network. Analytical Chemistry, vol. 76, 2004, 7 pages.

Lin et al. Laser Micromachined Isoelectric Focusing Device on Polymer Substrate for Electrospray Mass Spectrometry. Part of the SPIE Conference on Microfluidic Devices and Systems II, Santa Clara, CA. SPIE vol. 3877, pp. 28-35 (Sep. 1999).

(56) References Cited

OTHER PUBLICATIONS

Mack, et al. A systematic study in CIEF: defining and optimizing experimental parameters critical to method reproducibility and robustness. Electrophoresis. Dec. 2009;30(23):4049-58.

Manabe, et al. Separation of human plasma/serum proteins by capillary isoelectric focusing in the absence of denaturing agents. Electrophoresis. Jun. 1997;18(7):1159-65.

Mao, Q. et al. Demonstration of Isoelectric Focusing on an Etched Quartz Chip with UV Absorption Imaging Detection. Analyst, vol. 124, 1999, 5 pages.

Marasco, C. et al. Real-Time Cellular Exometabolome Analysis With A Microfluidic-Mass Spectrometry Platform. PLOS One, Feb. 27, 2015, 19 pages.

Mellors, J. et al. Fully Integrated Glass Microfluidic Device for Performing High-Efficiency Capillary Electrophoresis and Electrospray Ionization Mass Spectrometry. Analytical Chemistry, vol. 80, 2008, 7 pages.

Michels et al. Imaged Capillary Isoelectric Focusing for Charge-Variant Analysis of Biopharmaceuticals. BioProcess 9(10):48-54 (Nov. 2011).

Michels, et al. Separation Methods and Orthogonal Techniques. State-of-the-Art and Emerging Technologies for Therapeutic Monoclonal Antibody Characterization vol. 2. Biopharmaceutical Characterization: The NISTmAb Case Study. Oct. 15, 2015. Chapter 5, pp. 237-284.

Minarik et al. Dispersion effects accompanying pressurized zone mobilisation in capillary isoelectric focusing of proteins. Journal of Chromatography A. Jun. 1996. 738(1):123-128.

Mitsuhiro KINOSHITA, Quality Assurance of Monoclonal Antibody Pharmaceuticals Based on Their Charge Variants Using Microchip Isoelectric Focusing Method, Journal of Chromatography A (2013), vol. 1309 pp. 76-83.

Mohan et al. On-line coupling of capillary isoelectric focusing with transient isotachophoresis-zone electrophoresis: A two-dimensional separation system for proteomics. Electrophoresis 23:3160-3167 (2002).

Mokaddem, et al. Online CIEF-ESI-MS in glycerol-water media with a view to hydrophobic protein applications. Electrophoresis. vol. 30, Issue 23, Dec. 2009. pp. 4040-4048.

Nordman et al. Interfacing Microchip Isoelectric Focusing with On-chip Electrospray: Ionization Mass Spectrometry. Journal of Chromatography A 1398:121-126 (2015). Available online Apr. 23, 2015.

Nordman et al. Interfacing Microchip Isoelectric Focusing with On-chip Electrospray: Ionization Mass Spectrometry, Supplementary Data. Journal of Chromatography A 1398:121-126 (2015). 6 pages. Available online Apr. 23, 2015.

Nordman et al. Shape-anchored porous polymer monoliths for integrated online solid-phase extraction-microchip electrophoresis-electrospray ionization mass spectrometry. Electrophoresis 36:428-432 (2015).

Nordman, N. et al. Rapid Biomolecule Analysis Using Two-Dimensional Electrophoresis-Electrospray Ionization Microchip. 15th International Conference on Miniaturized Systems for Chemistry and Life Science, Oct. 2-6, 2011, Seattle, Washington, 3 pages.

Nordman, N. Microchip Technology In Mass Spectrometry-Based Bioanalysis: Advances in the Analysis of Peptides, Proteins, and Pharmaceuticals. Academic Dissertation, University of Helsinki, Apr. 17, 2015, 144 pages.

Poitevin, et al. Comparison of different capillary isoelectric focusing methods—use of "narrow pH cuts" of carrier ampholytes as original tools to improve resolution. J Chromatogr A. Jul. 6, 2007;1155(2):230-6.

Procházková et al. Analysis of amino acids by combination of carrier ampholyte-free IEF with ITP. Electrophoresis 28:2168-2173 (2007).

Righetti, et al. Carrier ampholytes for IEF, on their fortieth anniversary (1967-2007), brought to trial in court: the verdict. Electrophoresis. Nov. 2007;28(21):3799-810.

Roy, et al. Surface analysis, hydrophilic enhancement, ageing behavior and flow in plasma modified cyclic olefin copolymer (COC)-based microfluidic devices. Sensors and Actuators B: Chemical. vol. 150, Issue 2, Oct. 28, 2010, pp. 537-549.

Salas-Solano et al. Robustness of iCIEF Methodology for the Analysis of Monoclonal Antibodies: An Interlaboratory Study. Journal of Separation 35:3124-3129 (2012).

Salas-Solano, O. et al. Intercompany Study to Evaluate the Robustness of Capillary Isoelectric Focusing Technology for the Analysis of Monoclonal Antibodies. Chromatographia, vol. 73, 2011, 8 pages.

Scientific Considerations in Demonstrating Biosimilarity to a Reference Product: Guidance for Industry, U.S. Department of Health and Human Services Food and Drug Administration, Apr. 2015. 27 pages. Retrieved Feb. 12, 2019 from URL: <https://www.fda.gov/downloads/drugs/guidances/ucm291128.pdf>.

Shimura, K. et al. Isoelectric Focusing in a Microfluidically Defined Electrophoresis Channel. Analytical Chemistry, vol. 80, 2008, 6 pages.

Sikanen, T. et al. Intact Protein Separations With Inherently Biocompatible Ormocomp Separation Chip With Integrated Electrospray Ionization Emitter. 15th International Conference on Miniaturized Systems for Chemistry and Life Science, Oct. 2-6, 2011, Seattle, Washington, 3 pages.

Sikanen, T. et al. Microchip Capillary Electrophoresis-Electrospray Ionization-Mass Spectrometry of Intact Proteins Using Uncoated Ormocomp Microchips. Analytica Chimica Acta, vol. 711, 2012, 8 pages.

Sikanen, T. et al. Microchip Technology In Mass Spectrometry. Mass Spectrometry Reviews, vol. 29, 2010, 41 pages.

Sung, et al. Chip-based microfluidic devices coupled with electrospray ionization-mass spectrometry. Electrophoresis. vol. 26, Issue 9, No. 9, May 2005. pp. 1783-1791.

Suzuki, S. et al. High-speed Electrophoretic Analysis of 1-phenyl-3-methyl-5-pyrazolone Derivatives of Monosaccharides on a Quartz Microchip with Whole-Channel UV Detection. Electrophoresis, vol. 24, 2003, 6 pages.

Tan, W. et al. Miniaturized Capillary Isoelectric Focusing in Plastic Microfluidic Devices. Electrophoresis, vol. 23, 2002, 8 pages.

Tang et al. Comparison of Protein Separations in Capillary Zone Electrophoresis and Capillary Isoelectric Focusing Interfacing with Electrospray Mass Spectrometry. Journal of Mass Spectrometry. Nov. 1996. 31(11):1284-1290.

Taylor, P. Matrix Effects: The Achilles Heel of Quantitative High-Performance Liquid Chromatography-Electrospray-Tandem Mass Spectrometry. Clinical Biochemistry, vol. 38, 2005, 7 pages.

Tentori et al. Detection of Isoforms Differing by a Single Charge Unit in Individual Cells. Angew Chem Ed 55 (2016). 6 pages.

Tentori et al. Supporting Information: Detection of Isoforms Differing by a Single Charge Unit in Individual Cells. Angew Chem Ed 55 (2016). 25 pages.

Tentori et al. Performance implications of chemical mobilization after microchannel IEF. Electrophoresis 35:1453-1460 (2014).

Thormann et al. High-resolution computer simulation of electrophoretic mobilization in isoelectric focusing. Electrophoresis 29:1676-1686 (2008).

Týčová et al. Recent advances in CE-MS coupling: Instrumentation, methodology, and applications. Electrophoresis. Jan. 2017;38(1):115-134.

Vagenende, et al. Mechanisms of protein stabilization and prevention of protein aggregation by glycerol. Biochemistry. Nov. 24, 2009;48(46):11084-96.

Vlckova, M. et al. Pharmaceutical Applications of Isoelectric Focusing on Microchip With Imaged UV Detection. Journal of Chromatography A, vol. 1181, 2008, 8 pages.

Wakankar, A. et al. Analytical Methods for Physicochemical Characterization of Antibody Drug Conjugates. mAbs, vol. 3, No. 2, Mar./Apr. 2011, 12 pages.

Wang et al. High Resolution Capillary Isoelectric Focusing Mass Spectrometry Analysis of Peptides, Proteins and Monoclonal Antibodies with a Flow-Through Microvial Interface. Anal Chem 90(15):9495-9503 (Jul. 11, 2018).DOI: 10.1021/acs.analchem.8b02175.

(56) References Cited

OTHER PUBLICATIONS

Wehr. Chapter 9: Capillary Isoelectric Focusing. Handbook of Isoelectric Focusing and Proteomics, D. Garfin and S. Ahuja, Eds., Elsevier Inc. pp. 181-210 (2005).

Wen, J. et al. Microfabricated Isoelectric Focusing Device for Direct Electrospray Ionization-Mass Spectrometry. Electrophoresis, vol. 21, 2000, 7 pages.

Wu, et al. Secrets of iCE Method Design for Protein Therapeutics. Protein Simple. Presentation Abstract. Tuesday Mar. 27, 2012. URL: <http://events.r20.constantcontact.com/register/event?llr=p9xbiodab&oeidk=a07e5nz3rtw6f41039b>.

Wu, J. et al. Absorption Spectra and Multicapillary Imaging Detection for Capillary Isoelectric Focusing Using a Charge Coupled Device Camera. Analyst, vol. 120, May 1995, 5 pages.

Wu, J. et al. Capillary Isoelectric Focusing with Whole Column Detection and a Membrane Sample Preparation System. Analytica Chimica Acta, vol. 383, 1999, 12 pages.

Wu, J. J et al. Protein Analysis by Isoelectric Focusing in a Capillary Array With An Absorption Imaging Detector. Journal of Chromatography B, vol. 669, 1995, 5 pages.

Yang et al. Capillary isoelectric focusing-electrospray ionization mass spectrometry for transferrin glycoforms analysis. Anal Biochem. Dec. 1, 1996;243(1):140-9.

Zhang, B. et al. Microfabricated Devices for Capillary Electrophoresis-Electrospray Mass Spectrometry. Analytical Chemistry, vol. 71, 1999, 7 pages.

Zhang et al. Stepwise Mobilization of Focused Proteins in Capillary Isoelectric Focusing Mass Spectrometry. Analytical Chemistry 72(7):1462-1468 (Apr. 1, 2000). Published online Mar. 3, 2000. DOI: https://doi.org/10.1021/ac9912653.

Zhong et al. Mass Transport in a Micro Flow-Through Vial of a Junction-at-the-Tip Capillary Electrophoresis-Mass Spectrometry Interface. Anal Chem 83(12):4916-4923 (Apr. 29, 2011).

Zhong, X, et al. Flow-Through Microvial Facilitating Interface of Capillary Isoelectric Focusing and Electrospray Ionization Mass Spectrometry. Analytical Chemistry, vol. 83, 2011, 8 pages.

Co-pending U.S. Appl. No. 16/983,293, filed Aug. 3, 2020.

U.S. Appl. No. 16/808,063 First Action Interview Office Action Summary dated Jul. 17, 2020.

Co-pending U.S. Appl. No. 17/088,672, inventors Mack; Scott et al., filed Nov. 4, 2020.

U.S. Appl. No. 16/808,063 Notice of Allowance dated Nov. 4, 2020.

\* cited by examiner

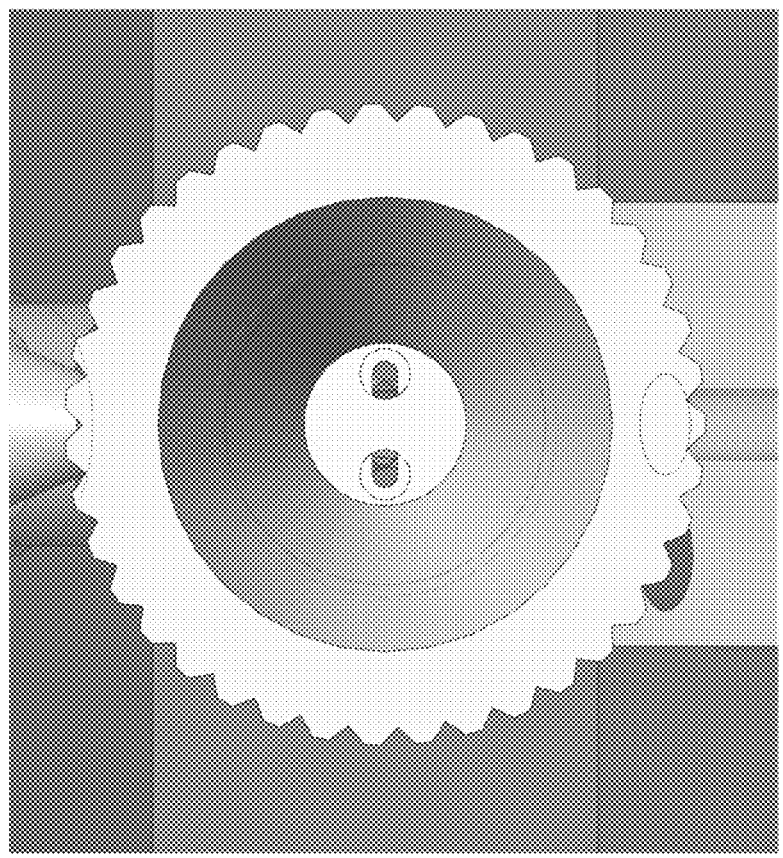
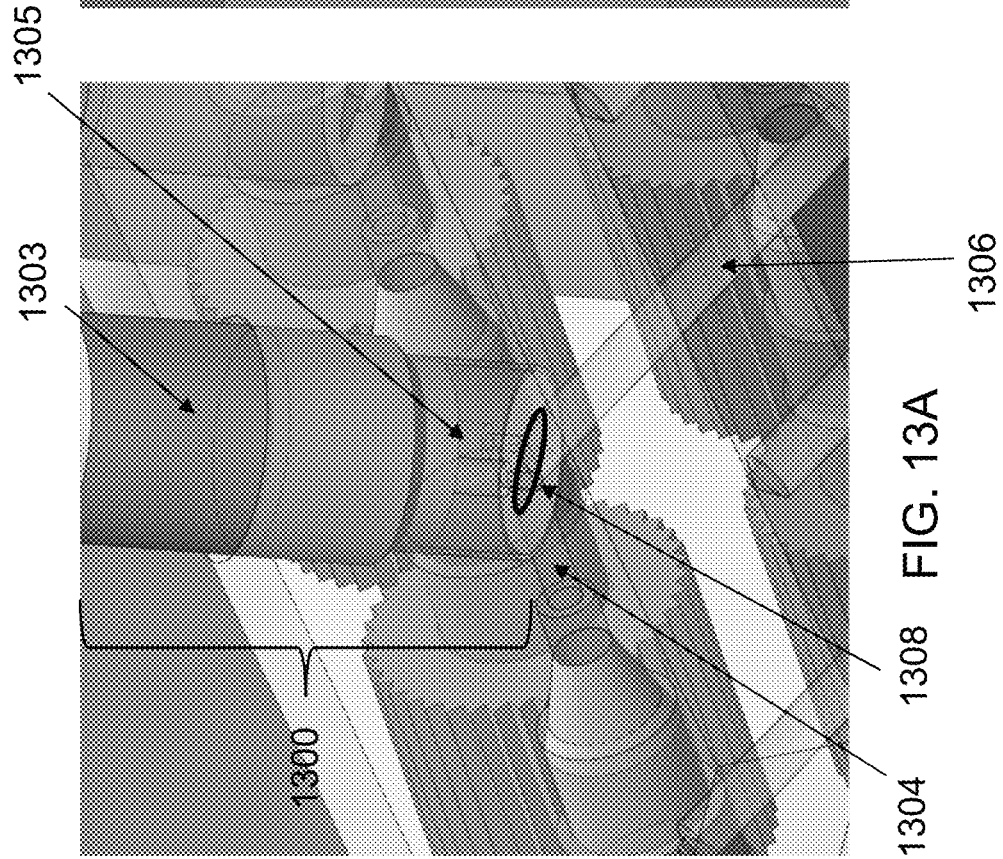
FIG. 13B
FIG. 13A

# MULTICHANNEL ISOELECTRIC FOCUSING DEVICES AND HIGH VOLTAGE POWER SUPPLIES

CROSS-REFERENCE TO RELATED APPLICATIONS

This application claims the benefit of U.S. Provisional Patent Application Ser. No. 62/909,675, filed Oct. 2, 2019, U.S. Provisional Patent Application Ser. No. 62/893,549, filed Aug. 29, 2019, and U.S. Provisional Patent Application Ser. No. 62/885,733, filed Aug. 12, 2019, each of which applications is herein incorporated by reference in its entirety for all purposes.

BACKGROUND

This disclosure relates to methods, devices, and systems for sample processing and characterization, and various uses thereof. In a first aspect, this disclosure relates to methods, devices, and systems for performing separation and characterization of analytes in a mixture of analytes, and more specifically to multichannel devices (and related methods and systems) for performing multiple isoelectric focusing reactions in parallel. In a second aspect, this disclosure relates to microfluidic devices (and related methods and systems) designed to perform one or more separation reactions (e.g., isoelectric focusing) followed by mobilization and electrospray ionization of the separated analytes for characterization by mass spectrometry.

SUMMARY

Disclosed herein are methods, devices, and systems that enable improved quantitative performance for the separation and analysis of analytes in an analyte mixture, with potential applications in biomedical research, clinical diagnostics, and pharmaceutical manufacturing. For example, rigorous characterization of biologic drugs and drug candidates (e.g., proteins) are required by regulatory agencies. The methods and devices described herein may be suitable for characterizing proteins and/or other analytes. In some instances, the methods and devices described herein may relate to characterizing an analyte mixture wherein one or more enrichment steps are performed to separate an analyte mixture into enriched analyte fractions. In some instances, the methods and devices described herein may relate to performing one or more enrichment steps to separation an analyte mixture into enriched analyte fractions in a multiplexed format for high throughput characterization of samples. In some instances, the methods and devices described herein relate to characterizing an analyte mixture wherein one or more enrichment steps are performed to separate an analyte mixture into enriched analyte fractions that are subsequently introduced into a mass spectrometer via an electrospray ionization interface. The disclosed methods and devices may provide improvements in convenience, reproducibility, and/or analytical performance of analyte separation and characterization.

In an aspect, disclosed herein are methods for performing a plurality of isoelectric focusing reactions in parallel, the method comprising: a) providing a device comprising a planar substrate, wherein the planar substrate comprises a plurality of separation channels; b) introducing a sample comprising a mixture of analytes into at least two separation channels of the plurality of separation channels; c) controlling a voltage applied to the at least two separation channels to perform the plurality of isoelectric focusing reactions to separate the mixture of analytes of the sample in the at least two separation channels; and d) independently monitoring a current flowing through the at least two separation channels as the plurality of isoelectric focusing reactions are performed in parallel.

In some embodiments, a first end of the at least two separation channels of the plurality of separation channels is electrically coupled to an anolyte reservoir using a membrane-containing high voltage electrode fixture. In some embodiments, a second end of the at least two separation channels of the plurality of separation channels is electrically coupled to a catholyte reservoir using a membrane-containing high voltage electrode fixture. In some embodiments, voltages applied to the at least two separation channels are independently controlled. In some embodiments, the samples introduced into the at least two separation channels are the same, and a first set of experimental conditions is used to perform the isoelectric focusing reactions in a first subset of the at least two separation channels and an at least second set of experimental conditions is used to perform the isoelectric focusing reactions in an at least second subset of the at least two separation channels. In some embodiments, a different set of experimental conditions is used to perform the isoelectric focusing reactions in each of the at least two separation channels. In some embodiments, a set of experimental conditions used to perform the plurality of isoelectric focusing reactions comprises at least one member of the group consisting of: a buffer selection, a pH gradient selection, a voltage setting, a current setting, an electric field strength setting, a time course for varying a voltage setting, a current setting, an electric field strength setting, or an isoelectric focusing reaction time. In some embodiments, the samples introduced into the at least two separation channels are different for at least two subsets of the at least two separation channels and the same set of experimental conditions are used to perform the isoelectric focusing reactions in each of the at least two separation channels. In some embodiments, the samples introduced into each of the at least two separation channels are different. In some embodiments, the method further comprises recording a current trace for each of the at least two separation channels while performing the plurality of isoelectric focusing reactions. In some embodiments, the method further comprises flushing the at least two separation channels following completion of the isoelectric focusing reactions and introducing another sample into the at least two separation channels in an automated fashion. In some embodiments, detection of a failure in any of the at least two separation channels triggers an automated re-introduction and repeat of the isoelectric focusing reaction for the sample that had been introduced into that separation channel. In some embodiments, the failure comprises introduction of a bubble, formation of a bubble, an incorrectly prepared sample, an underfilled reagent reservoir, or any combination thereof. In some embodiments, the failure is detected by monitoring the current flowing through a separation channel or by processing an image of the separation channel. In some embodiments, the method further comprises measuring dynamic light scattering in at least one of the at least two separation channels while performing isoelectric focusing. In some embodiments, the measurement of dynamic light scattering provides a determination of a size distribution profile, a determination of an aggregation state, or a determination of a hydrodynamic radius for one or more separated analytes. In some embodiments, the membrane-containing high voltage electrode fixture comprises: a) an electrode reservoir; b) an inlet fluid channel comprising a first end and a second end; c) an outlet fluid channel comprising a first end that is fluidically coupled to the second end of the inlet fluid channel, and a second end that is fluidically coupled to a separation channel, wherein the inlet fluid channel and the outlet fluid channel intersect with and are fluidically coupled to each other at a plane that defines or is parallel to a surface of the electrode reservoir; and d) a membrane disposed within the electrode reservoir at or adjacent to the plane such that the membrane covers all or substantially all of an opening comprising an intersection of the inlet fluid channel and the outlet fluid channel; wherein the membrane provides a high hydrodynamic resistance, low electrical resistance connection between a high voltage electrode positioned within the electrode reservoir and a fluid contained within the inlet fluid channel and the outlet fluid channel. In some embodiments, the membrane is hydrophilic and comprises cellulose or polytetrafluoroethylene (PTFE). In some embodiments, the membrane-containing high voltage electrode fixture further comprises an insert disposed within the electrode reservoir and positioned at or adjacent to the membrane, wherein the insert comprises an inlet fluid path and an outlet fluid path that facilitates substantially bubble-free wetting of a surface of the membrane when the electrode reservoir is filled with an electrolyte solution. In some embodiments, the method further comprises filling the electrode reservoir with the electrolyte solution at a concentration between about 1 millimolar (mM) to about 500 mM. In some embodiments, the method further comprises filling the electrode reservoir with the electrolyte solution at a concentration between about 10 mM to about 150 mM. In some embodiments, the electrolyte solution has a pH in a range between about 2 and about 11.

In another aspect, disclosed herein is a microfluidic device comprising a planar substrate, wherein the planar substrate comprises: a) a plurality of fluid inlets, wherein all or a portion of the plurality of fluid inlets are located on one or more edges of the planar substrate; and b) a plurality of separation channels comprising: i) a first end that is electrically coupled to an anolyte reservoir using a membrane-containing high voltage electrode fixture; ii) a second end that is electrically coupled to a catholyte reservoir using a membrane-containing high voltage electrode fixture; and iii) one of the first end or the second end of each separation channel of the plurality of separation channels is in fluid communication with a different fluid inlet of the plurality of fluid inlets.

In some embodiments, the plurality of separation channels is configured for UV absorbance imaging or fluorescence imaging of all or a portion of the plurality of separation channels. In some embodiments, the microfluidic device further comprises a cartridge which encompasses all or a portion of a substrate comprising the plurality of separation channels, and wherein the cartridge comprises a plurality of membrane-containing high voltage electrode fixtures. In some embodiments, the cartridge is a disposable component of a system configured to perform multiplexed isoelectric focusing reactions.

Also disclosed herein is a system for performing multiplexed isoelectric focusing reactions, the system comprising: a) a microfluidic device comprising a planar substrate, wherein the planar substrate comprises: i) a plurality of fluid inlets, wherein all or a portion of the plurality of fluid inlets are located on one or more edges of the planar substrate; and ii) a plurality of separation channels comprising: a first end that is electrically coupled to an anolyte reservoir using a membrane-containing high voltage electrode fixture; a second end that is electrically coupled to a catholyte reservoir using a membrane-containing high voltage electrode fixture; and one of the first end or the second end of each separation channel of the plurality of separation channels is in fluid communication with a different fluid inlet of the plurality of fluid inlets; and b) a multiplexed power supply, wherein the multiplexed power supply is configured to: i) control a voltage applied to each of at least two separation channels; and ii) independently monitor a current flowing through each of the at least two separation channels while performing multiplexed isoelectric focusing reactions for a plurality of samples comprising mixtures of analytes.

In some embodiments, the multiplexed power supply is configured to independently control the voltage applied to each of the at least two separation channels. In some embodiments, the system further comprises an imaging unit configured to (i) acquire UV absorbance or fluorescence images of all or a portion of each of the at least two separation channels, and (ii) process the UV absorbance or fluorescence images to detect a position of one or more isoelectric point (pI) markers contained within a separation channel during operation so that a pI value may be determined for one or more separated analyte peaks in each of the at least two separation channels. In some embodiments, the system further comprises a dynamic light scattering unit configured to measure dynamic light scattering in at least one separation channel of the plurality of separation channels. In some embodiments, the system further comprises an automated liquid handling system for loading samples into sample inlet ports that are fluidically-coupled via the plurality of fluid inlets to the plurality of separation channels. In some embodiments, the system is configured to flush the plurality of separation channels following completion of the multiplexed isoelectric focusing reactions and introduce another set of samples into the plurality of separation channels in an automated fashion. In some embodiments, detection of a failure in a separation channel triggers an automated re-introduction and repeat of the isoelectric focusing reaction for the sample that had been introduced into that separation channel.

In another aspect, disclosed herein is a fixture comprising: an electrode reservoir; an inlet fluid channel comprising a first end and a second end; an outlet fluid channel comprising a first end that is fluidically coupled to the second end of the inlet fluid channel, and a second end that is fluidically coupled to a separation channel, wherein the inlet fluid channel and the outlet fluid channel intersect with and are fluidically coupled to each other at a plane that defines or is parallel to a surface of the electrode reservoir; and a membrane disposed within the electrode reservoir at or adjacent to the plane such that the membrane covers all or substantially all of an opening comprising the intersection of the inlet fluid channel and the outlet fluid channel; wherein the membrane provides a high hydrodynamic resistance, low electrical resistance connection between a high voltage electrode positioned within the electrode reservoir and a fluid contained within the inlet fluid channel and outlet fluid channel.

In some embodiments, the membrane is hydrophilic. In some embodiments, the membrane comprises a regenerated cellulose membrane. In some embodiments, the membrane comprises a woven polytetrafluoroethylene (PTFE) membrane that has been treated to be hydrophilic. In some embodiments, a cross-sectional area of the membrane or opening is between about 0.001 mm$^2$ and 100 mm$^2$. In some embodiments, the electrode reservoir further comprises an insert disposed within the electrode reservoir and positioned at or adjacent to the membrane, wherein the insert comprises an inlet fluid path and an outlet fluid path that facilitate substantially bubble-free wetting of a surface of the membrane when the electrode reservoir is filled with an electrolyte solution. In some embodiments, the hydrodynamic resistance between the electrode reservoir and the intersection of the inlet fluid channel and outlet fluid channel is greater than 0.1 $((N/mm^2)/(mm^3/sec))$. In some embodiments, the hydrodynamic resistance between the electrode reservoir and the intersection of the inlet fluid channel and outlet fluid channel is greater than 1 $((N/mm^2)/(mm^3/sec))$. In some embodiments, the electrical resistance between the electrode reservoir and the intersection of the inlet fluid channel and outlet fluid channel is less than 10,000,000 ohms. In some embodiments, the electrical resistance between the electrode reservoir and the intersection of the inlet fluid channel and outlet fluid channel is less than 100,000 ohms. In some embodiments, during operation, the electrode reservoir is filled with the electrolyte solution at a concentration between about 1 millimolar (mM) to about 500 mM. In some embodiments, during operation, the electrode reservoir is filled with the electrolyte solution at a concentration between about 10 mM to about 150 mM. In some embodiments, during operation, the electrode reservoir is filled with the electrolyte solution with a pH range between about 2 and about 11. In some embodiments, the separation channel comprises a lumen of a capillary. In some embodiments, the separation channel comprises a fluid channel within a microfluidic device. In some embodiments, the separation channel is configured to perform electrophoresis. In some embodiments, the separation channel is configured to perform isoelectric focusing.

Also disclosed herein is a fluidic device comprising: at least one fluid inlet; at least one fluid outlet; at least one separation channel comprising a first end that is fluidically coupled to the at least one fluid inlet and a second end that is fluidically coupled to the at least one fluid outlet; wherein at least one fluid inlet or at least one fluid outlet is electrically coupled to a high voltage electrode using a fixture comprising: an electrode reservoir; an inlet fluid channel comprising a first end and a second end; an outlet fluid channel comprising a first end that is fluidically coupled to the second end of the inlet fluid channel, and a second end that is fluidically coupled to one of the at least one fluid inlet or the at least one fluid outlet, wherein the inlet fluid channel and the outlet fluid channel intersect with and are fluidically coupled to each other at a plane that defines or is parallel to a surface of the electrode reservoir; and a membrane disposed within the electrode reservoir at or adjacent the plane such that it covers all or substantially all of an opening comprising the intersection of the inlet fluid channel and the outlet fluid channel; wherein the membrane provides a high hydrodynamic resistance, low electrical resistance connection between a high voltage electrode positioned within the electrode reservoir and a fluid contained within the inlet fluid channel and outlet fluid channel.

In some embodiments, the device comprises at least one capillary, and wherein the at least one capillary comprises a lumen which functions as the at least one separation channel. In some embodiments, the device is a microfluidic device comprising a planar substrate, and wherein the planar substrate comprises the at least one separation channel. In some embodiments, the at least one fluid inlet or the at least one fluid outlet is disposed on at least one edge of the planar substrate. In some embodiments, the membrane is hydrophilic. In some embodiments, the membrane comprises a regenerated cellulose membrane. In some embodiments, the membrane comprises a woven polytetrafluoroethylene (PTFE) membrane that has been treated to be hydrophilic. In some embodiments, a cross-sectional area of the membrane or opening is between about 0.001 $mm^2$ and 100 $mm^2$. In some embodiments, the electrode reservoir further comprises an insert disposed within the electrode reservoir and positioned at or adjacent to the membrane, wherein the insert comprises an inlet fluid path and an outlet fluid path that facilitate substantially bubble-free wetting of a surface of the membrane when the electrode reservoir is filled with an electrolyte solution. In some embodiments, during operation, the electrode reservoir is filled with the electrolyte solution at a concentration between about 1 millimolar (mM) to about 500 mM. In some embodiments, during operation, the electrode reservoir is filled with the electrolyte solution at a concentration between about 10 mM to about 150 mM. In some embodiments, during operation, the electrode reservoir is filled with the electrolyte solution with a pH range between about 2 and about 11. In some embodiments, the hydrodynamic resistance between the electrode reservoir and the intersection of the inlet fluid channel and outlet fluid channel is greater than 0.1 $((N/mm^2)/(mm^3/sec))$. In some embodiments, the hydrodynamic resistance between the electrode reservoir and the intersection of the inlet fluid channel and outlet fluid channel is greater than 1 $((N/mm^2)/(mm^3/sec))$. In some embodiments, the electrical resistance between the electrode reservoir and the intersection of the inlet fluid channel and outlet fluid channel is less than 10,000,000 ohms. In some embodiments, the electrical resistance between the electrode reservoir and the intersection of the inlet fluid channel and outlet fluid channel is less than 100,000 ohms.

In some embodiments, the ratio of the hydrodynamic resistance and the electrical resistance between the electrode reservoir and the intersection of the inlet fluid channel and outlet fluid channel is greater than about 0.001 $((N/mm^2)/(mm^3/sec))/Ohm$. In some embodiments, the ratio is greater than about 0.01 $((N/mm^2)/(mm^3/sec))/Ohm$. In some embodiments, the ratio is greater than about 0.1 $((N/mm^2)/(mm^3/sec))/Ohm$. In some embodiments, the ratio is greater than about 1 $((N/mm^2)/(mm^3/sec))/Ohm$. In some embodiments, the ratio is greater than about 10 $((N/mm^2)/(mm^3/sec))/Ohm$. In some embodiments, the ratio is greater than about 100 $((N/mm^2)/(mm^3/sec))/Ohm$. In some embodiments, the ratio is greater than about 1000 $((N/mm^2)/(mm^3/sec))/Ohm$. In some embodiments, the ratio is greater than about 10000 $((N/mm^2)/(mm^3/sec))/Ohm$.

Also disclosed herein are methods for performing a plurality of isoelectric focusing reactions in parallel, the method comprising: a) providing a plurality of sample aliquots, wherein each sample aliquot comprises a mixture of analytes; b) providing a device comprising a plurality of separation channels, wherein one sample aliquot of the plurality of sample aliquots is introduced into each separation channel; and c) providing a multiplexed power supply, wherein the multiplexed power supply is configured to independently control and monitor a current flowing through each of the plurality of separation channels while performing a plurality of isoelectric focusing reactions to separate the analytes in each sample.

In some embodiments, the sample aliquot introduced into each separation channel is drawn from the same sample and a different set of experimental conditions is used to perform the isoelectric focusing reactions in at least two subsets of the plurality of separation channels. In some embodiments, a different set of experimental conditions is used to perform the plurality of isoelectric focusing reactions in each of the plurality of separation channels. In some embodiments, at least two subsets of the plurality of sample aliquots introduced into the separation channels are drawn from different samples and the same set of experimental conditions are used to perform the plurality of isoelectric focusing reactions. In some embodiments, each of the sample aliquots introduced into the separation channels is drawn from a different sample. In some embodiments, the set of experimental conditions used to perform the plurality of isoelectric focusing reactions comprises a buffer selection, a pH gradient selection, a voltage setting, a current setting, an electric field strength setting, a time course for varying a voltage setting, a current setting, or an electric field strength setting, an isoelectric focusing reaction time, or any combination thereof. In some embodiments, the analytes comprise proteins. In some embodiments, the device comprises a microfluidic device. In some embodiments, the microfluidic device comprises from 4 to 8 separation channels. In some embodiments, the sample aliquots are introduced into the separation channels using an automated liquid handling system. In some embodiments, the method further comprises recording a current trace for each of the plurality of separation channels while performing the plurality of isoelectric focusing reactions. In some embodiments, the method further comprises monitoring the plurality of isoelectric focusing reactions using an imaging technique to detect a position of one or more separated analyte peaks in each separation channel. In some embodiments, the imaging technique comprises a whole channel imaging technique. In some embodiments, the imaging technique comprises UV absorbance imaging or fluorescence imaging. In some embodiments, fluorescence imaging comprises native fluorescence imaging. In some embodiments, the method further comprises using the imaging technique to detect a position of one or more pI markers so that a pI value may be determined for one or more separated analyte peaks. In some embodiments, the method further comprises flushing the separation channels following completion of the plurality of isoelectric focusing reactions and introducing new sample aliquots into the separation channels in an automated fashion. In some embodiments, an automated cycle time for introducing the plurality of sample aliquots, performing the plurality of isoelectric focusing reactions, and flushing the separation channels is between 1 minute and 30 minutes. In some embodiments, detection of an isoelectric focusing reaction failure in any of the plurality of separation channels triggers an automated re-introduction and repeat of the isoelectric focusing reaction for the sample aliquot that had been introduced into that separation channel. In some embodiments, the isoelectric focusing reaction failure comprises introduction of a bubble, formation of a bubble, or any combination thereof. In some embodiments, the isoelectric focusing reaction failure is detected by monitoring the current flowing through a separation channel or by processing an image of the separation channel. In some embodiments, the method further comprises measuring dynamic light scattering in at least one channel of the plurality of separation channels while performing isoelectric focusing. In some embodiments, the measurement of dynamic light scattering provides a determination of a size distribution profile for one or more separated analytes. In some embodiments, the measurement of dynamic light scattering provides a determination of an aggregation state for one or more separated analytes. In some embodiments, the measurement of dynamic light scattering provides a determination of a hydrodynamic radius for one or more separated analytes.

Also disclosed herein are microfluidic devices comprising: a) a plurality of inlet ports; b) a substrate comprising a plurality of separation channels, wherein a proximal end of each separation channel is in fluid communication with a different inlet port; and c) a plurality of outlet ports, wherein a distal end of each separation channel is in fluid communication with a different outlet port; wherein the channels of the plurality of separation channels are configured for whole channel imaging.

In some embodiments, the microfluidic device further comprises an integrated pair of electrodes for each separation channel, wherein one electrode of each pair is in contact with the proximal end of a separation channel, and the other electrode is in contact with the distal end of the separation channel. In some embodiments, the microfluidic device comprises from 4 to 8 separation channels. In some embodiments, the plurality of separation channels is configured for whole channel UV absorbance imaging. In some embodiments, the plurality of separation channels is configured for whole channel fluorescence imaging. In some embodiments, at least one channel within the plurality of separation channels is configured for performing dynamic light scattering measurements. In some embodiments, there are no reservoirs or wells on the device. In some embodiments, the inlet ports are located on one or more edges of the device as illustrated in FIG. 1A. In some embodiments, the outlet ports are located on one or more edges of the device as illustrated in FIG. 1A. In some embodiments, the microfluidic device is a disposable component of a system for performing isoelectric focusing reactions. In some embodiments, the microfluidic device further comprises a cartridge which encompasses all or a portion of the substrate, the plurality of inlet ports, or the plurality of outlet ports. In some embodiments, the cartridge is a disposable component of a system for performing isoelectric focusing reactions. In some embodiments, one or more inlet ports or outlet ports are interfaced with a high voltage electrode using a membrane-containing high voltage electrode fixture that provides a bubble-free electrical connection. In some embodiments, the membrane-containing high voltage electrode fixture is that illustrated in FIG. 12. In some embodiments, the membrane comprises a hydrophilic membrane. In some embodiments, the membrane comprises a regenerated cellulose membrane. In some embodiments, the membrane comprises a woven polytetrafluoroethylene (PTFE) membrane that has been treated to be hydrophilic. In some embodiments, a membrane-covered fluid port within the membrane-containing high voltage electrode fixture has a diameter ranging from about 0.5 to about 2 mm. In some embodiments, an electrode reservoir within the membrane-containing high voltage electrode fixture comprises an insert positioned within and at the bottom of the electrode reservoir, wherein the insert comprises an inlet fluid path and an outlet fluid path that allow bubble-free wetting of a surface of the membrane when the electrode reservoir is filled. In some embodiments, the cartridge comprises at least one integrated membrane-containing high voltage electrode fixture. In some embodiments, the cartridge comprises at least one reagent reservoir. In some embodiments, the at least one reagent reservoir comprises an anolyte reservoir, a catholyte reservoir, or a mobilization reagent reservoir. In some embodiments, the cartridge comprises at least one flow restrictor. In some embodiments, the cartridge comprises at least one valve. In some embodiments, the at least one valve comprises a shear valve. In some embodiments, the shear valve comprises a valve design as illustrated in FIG. 19A. In some embodiments, the shear valve comprises a valve design as illustrated in FIG. 19B. In some embodiments, the cartridge is of a side-manifold design as illustrated in any one of FIG. 16, 17, 18, 19A, or 19B so that clearance is provided for imaging the plurality of separation channels.

Disclosed herein are systems for performing a plurality of isoelectric focusing reactions in parallel, the system comprising: a) a microfluidic device comprising a plurality of separation channels, wherein the device comprises: i) a plurality of inlet ports; ii) a substrate comprising a plurality of separation channels, wherein a proximal end of each separation channel is in fluid communication with a different inlet port; and iii) a plurality of outlet ports, wherein a distal end of each separation channel is in fluid communication with a different outlet port; wherein the channels of the plurality of separation channels are configured for whole channel imaging; and b) a programmable multiplexed power supply, wherein the multiplexed power supply is configured to independently control and monitor a current flowing through each of the plurality of separation channels in the microfluidic device while performing a plurality of isoelectric focusing reactions to separate mixtures of analytes into their individual components.

In some embodiments, the microfluidic device further comprises an integrated pair of electrodes for each separation channel, wherein one electrode of each pair is in contact with the proximal end of a separation channel, and the other electrode is in contact with the distal end of the separation channel. In some embodiments, the separation channels share a common cathode. In some embodiments, the separation channels share a common anode. In some embodiments, the microfluidic device comprises from 4 to 8 separation channels. In some embodiments, the plurality of separation channels is configured for whole channel UV absorbance imaging. In some embodiments, the plurality of separation channels is configured for whole channel fluorescence imaging. In some embodiments, at least one channel within the plurality of separation channels is configured for performing dynamic light scattering measurements. In some embodiments, there are no reservoirs or wells on the microfluidic device. In some embodiments, the inlet ports are located on one or more edges of the microfluidic device as illustrated in FIG. 1A. In some embodiments, the outlet ports are located on one or more edges of the device as illustrated in FIG. 1A. In some embodiments, the microfluidic device is a disposable component of the system. In some embodiments, the microfluidic device further comprises a cartridge which encompasses all or a portion of the substrate, the plurality of inlet ports, or the plurality of outlet ports. In some embodiments, the cartridge is a disposable component of the system. In some embodiments, one or more inlet ports or outlet ports are interfaced with a high voltage electrode using a membrane-containing high voltage electrode fixture that provides a bubble-free electrical connection. In some embodiments, the membrane-containing high voltage electrode fixture is that illustrated in FIG. 12. In some embodiments, the membrane comprises a hydrophilic membrane. In some embodiments, the membrane comprises a regenerated cellulose membrane. In some embodiments, the membrane comprises a woven polytetrafluoroethylene (PTFE) membrane that has been treated to be hydrophilic. In some embodiments, a membrane-covered fluid port within the membrane-containing high voltage electrode fixture has a diameter ranging from about 0.5 to about 2 mm. In some embodiments, an electrode reservoir within the membrane-containing high voltage electrode fixture comprises an insert positioned within and at the bottom of the electrode reservoir, wherein the insert comprises an inlet fluid path and an outlet fluid path that allow bubble-free wetting of a surface of the membrane when the electrode reservoir is filled. In some embodiments, the cartridge comprises at least one integrated membrane-containing high voltage electrode fixture. In some embodiments, the cartridge comprises at least one reagent reservoir. In some embodiments, the at least one reagent reservoir comprises an anolyte reservoir, a catholyte reservoir, or a mobilization reagent reservoir. In some embodiments, the cartridge comprises at least one flow restrictor. In some embodiments, the cartridge comprises at least one valve. In some embodiments, the at least one valve comprises a shear valve. In some embodiments, the shear valve comprises a valve design as illustrated in FIG. 19A. In some embodiments, the shear valve comprises a valve design as illustrated in FIG. 19B. In some embodiments, the cartridge is of a side-manifold design as illustrated in any one of FIG. 16, 17, 18, 19A, or 19B so that clearance is provided for imaging the plurality of separation channels. In some embodiments, the system further comprises an automated liquid handling system for loading a sample aliquot into each inlet port. In some embodiments, the automated liquid handling system is configured for introduction of sample aliquots into each separation channel that are all drawn from the same sample, and the system is configured to use a different set of experimental conditions to perform the isoelectric focusing reactions in at least two subsets of the plurality of separation channels. In some embodiments, a different set of experimental conditions is used to perform the isoelectric focusing reactions in each of the plurality of separation channels. In some embodiments, the automated liquid handling system is configured for introduction of at least two subsets of sample aliquots into the separation channels that are drawn from different samples and the same set of experimental conditions are used to perform the plurality of isoelectric focusing reactions. In some embodiments, each of the sample aliquots introduced into the separation channels is drawn from a different sample. In some embodiments, the set of experimental conditions used to perform the plurality of isoelectric focusing reactions comprises a buffer selection, a pH gradient selection, a voltage setting, a current setting, an electric field strength setting, a time course for varying a voltage setting, a current setting, or an electric field strength setting, an isoelectric focusing reaction time, or any combination thereof. In some embodiments, the analytes comprise proteins. In some embodiments, the programmable multiplexed power supply is further configured to record a current trace for each of the plurality of separation channels while the isoelectric focusing reactions are being performed. In some embodiments, the system further comprises an imaging unit configured to acquire images of, and detect separated analyte peaks in, the plurality of separation channels. In some embodiments, the imaging unit is configured to perform whole channel imaging of the plurality of separation channels. In some embodiments, the imaging unit is configured to acquire UV absorbance images. In some embodiments, the imaging unit is configured to acquire fluorescence images. In some embodiments, the fluorescence images comprise native fluorescence images. In some embodiments, the imaging unit is further configured to detect a position of one or more pI markers so that a pI value may be determined for one or more separated analyte peaks. In some embodiments, the system is configured to flush the separation channels following completion of the plurality of isoelectric focusing reactions and introduce a new sample aliquot into the separation channels in an automated fashion. In some embodiments, an automated cycle time for introducing the plurality of sample aliquots, performing the plurality of isoelectric focusing reactions, and flushing the separation channels is between 1 minute and 30 minutes. In some embodiments, detection of an isoelectric focusing reaction failure in any of the plurality of separation channels triggers an automated re-introduction and repeat of the isoelectric focusing reaction for the sample aliquot that had been introduced into that separation channel. In some embodiments, the isoelectric focusing reaction failure comprises introduction of a bubble, formation of a bubble, or any combination thereof. In some embodiments, the isoelectric focusing reaction failure comprises an improperly prepared sample. In some embodiments, the isoelectric focusing reaction failure comprises an empty or underfilled sample well. In some embodiments, the isoelectric focusing reaction failure is detected by monitoring the current flowing through a separation channel or by processing an image of the separation channel. In some embodiments, the system further comprises a dynamic light scattering measurement unit. In some embodiments, the system further comprises a fluid flow controller configured to provide independently controlled pressure-driven flow through one or more separation channels, one or more mobilizer channels, or one or more auxiliary fluid channels. In some embodiments, the pressure-driven flow through the one or more separation channels, one or more mobilizer channels, or one or more auxiliary fluid channels is pulse-less flow. In some embodiments, the system further comprises a temperature controller configured to maintain the plurality of separation channels at a constant temperature.

Also disclosed herein are methods, comprising: a) applying an electric field across a separation channel in a microfluidic device to perform a separation of an analyte mixture via isoelectric focusing; b) simultaneously and continuously imaging the separation and mobilization of the separated analyte mixture in the whole separation channel or a portion thereof and c) expelling separated and mobilized analytes via electrospray ionization from an orifice on the microfluidic device into a mass spectrometer; wherein the orientation of the microfluidic device is tilted relative to a horizontal plane such that the orifice is directed downwards towards an inlet of the mass spectrometer. In some embodiments, the method further comprises correlating separated analyte peaks detected in the separation channel with mass spectrometer data for the separated analytes. In some embodiments, the separated analyte peaks are detected by absorbance imaging. In some embodiments, the separated analyte peaks are detected by fluorescence imaging. In some embodiments, the orifice is in electrical communication with the separation channel's electric field. In some embodiments, the orifice is a recess on the microfluidic device, such that a Taylor cone formed by electrospray ionization is disposed entirely within the recess. In some embodiments, the microfluidic device comprises a first separation channel and a second separation channel. In some embodiments, the method further comprises: chromatographically-enriching the analyte mixture in the first separation channel before applying the electric field to perform the isoelectric focusing separation of the analyte mixture in the second separation channel. In some embodiments, the method further comprises introducing ampholytes into the separation channel before the separation of the analyte mixture to generate a pH gradient in the separation channel, introducing isoelectric point (pI) markers into the separation channel before the separation, and continuously imaging the separation channel while the pI markers are separated. In some embodiments, the analyte mixture comprises intact proteins. In some embodiments, the mobilization is performed by introducing an electrolyte into the separation channel using pressure. In some embodiments, the mobilization is performed by introducing an electrolyte into the separation channel by electrophoresis. In some embodiments, the mobilization is performed by introducing an electrolyte into the separation channel from an electrolyte channel in fluid communication with a confluence region downstream of the separation channel. In some embodiments, the microfluidic device comprises two electrodes to generate an electric field across an electrolyte introducing channel. In some embodiments, there are no reservoirs or wells on the microfluidic device. In some embodiments, inlet ports for the microfluidic device are located on one or more edges of the device as illustrated in FIG. 2. In some embodiments, outlet ports for the microfluidic device are located on one or more edges of the device as illustrated in FIG. 2. In some embodiments, the microfluidic device is a disposable component of a system for performing isoelectric focusing and mass spectrometric analysis. In some embodiments, the microfluidic device is a cartridge comprising the separation channel, the orifice, the electrolyte introducing channel, an anolyte introducing channel, and gas delivery channels for ionization. In some embodiments, the cartridge is a disposable component of a system for performing isoelectric focusing and mass spectrometric analysis. In some embodiments, one or more inlet ports or outlet ports of the microfluidic device are interfaced with a high voltage electrode using a membrane-containing high voltage electrode fixture that provides a bubble-free electrical connection. In some embodiments, the membrane-containing high voltage electrode fixture is that illustrated in FIG. 12. In some embodiments, the membrane comprises a hydrophilic membrane. In some embodiments, the membrane comprises a regenerated cellulose membrane. In some embodiments, the membrane comprises a woven polytetrafluoroethylene (PTFE) membrane that has been treated to be hydrophilic. In some embodiments, a membrane-covered fluid port within the membrane-containing high voltage electrode fixture has a diameter ranging from about 0.5 to about 2 mm. In some embodiments, an electrode reservoir within the membrane-containing high voltage electrode fixture comprises an insert positioned within and at the bottom of the electrode reservoir, wherein the insert comprises an inlet fluid path and an outlet fluid path that allow bubble-free wetting of a surface of the membrane when the electrode reservoir is filled. In some embodiments, the cartridge comprises at least one integrated membrane-containing high voltage electrode fixture. In some embodiments, the cartridge comprises at least one reagent reservoir. In some embodiments, the at least one reagent reservoir comprises an anolyte reservoir, a catholyte reservoir, or a mobilization reagent reservoir. In some embodiments, the cartridge comprises at least one flow restrictor. In some embodiments, the cartridge comprises at least one valve. In some embodiments, the at least one valve comprises a shear valve. In some embodiments, the shear valve comprises a valve design as illustrated in FIG. 19A. In some embodiments, the shear valve comprises a valve design as illustrated in FIG. 19B. In some embodiments, the cartridge is of a side-manifold design as illustrated in any one of FIG. 16, 17, 18, 19A, or 19B so that clearance is provided for imaging the plurality of separation channels. In some embodiments, the method further comprises providing an automated liquid handling system for loading a sample aliquot into each inlet port.

Disclosed herein are microfluidic devices comprising a substrate, wherein the substrate defines: a) one or more inlet ports; b) at least one separation channel configured to perform separation of an analyte mixture; and c) an orifice in fluid communication with an end of the separation channel, wherein the orifice is configured to perform electrospray ionization of separated analyte fractions eluted from the separation channel and expel them into a mass spectrometer.

In some embodiments, the microfluidic device further comprises an integrated pair of electrodes for the at least one separation channel, wherein one electrode of each pair is in contact with a proximal end of a separation channel, and the other electrode is in contact with a distal end of the separation channel. In some embodiments, the at least one separation channel is configured for whole channel UV absorbance imaging. In some embodiments, the at least one separation channel is configured for whole channel fluorescence imaging. In some embodiments, there are no reservoirs or wells on the device. In some embodiments, the one or more inlet ports are located on one or more edges of the device as illustrated in FIG. 2. In some embodiments, the device further comprises an auxiliary fluid channel used to deliver a calibrant solution for calibrating mass data. In some embodiments, the microfluidic device is a disposable component of a system for performing isoelectric focusing and mass spectrometric analysis of analyte mixtures. In some embodiments, the microfluidic device further comprises a cartridge which encompasses all or a portion of the substrate, the one or more inlet ports, or the orifice. In some embodiments, the cartridge is a disposable component of a system for performing isoelectric focusing and mass spectrometric analysis of analyte mixtures. In some embodiments, one or more inlet ports are interfaced with a high voltage electrode using a membrane-containing high voltage electrode fixture that provides a bubble-free electrical connection. In some embodiments, the membrane-containing high voltage electrode fixture is that illustrated in FIG. 12. In some embodiments, the membrane comprises a hydrophilic membrane. In some embodiments, the membrane comprises a regenerated cellulose membrane. In some embodiments, the membrane comprises a woven polytetrafluoroethylene (PTFE) membrane that has been treated to be hydrophilic. In some embodiments, the membrane comprises a rigid material, e.g., glass or ceramic. In some embodiments, the membrane may be treated to be hydrophilic and/or uncharged. In some embodiments, a membrane-covered fluid port within the membrane-containing high voltage electrode fixture has a diameter ranging from about 0.5 to about 2 mm. In some embodiments, an electrode reservoir within the membrane-containing high voltage electrode fixture comprises an insert positioned within and at the bottom of the electrode reservoir, wherein the insert comprises an inlet fluid path and an outlet fluid path that allow bubble-free wetting of a surface of the membrane when the electrode reservoir is filled. In some embodiments, the cartridge comprises at least one integrated membrane-containing high voltage electrode fixture. In some embodiments, the cartridge comprises at least one reagent reservoir. In some embodiments, the at least one reagent reservoir comprises an anolyte reservoir, a catholyte reservoir, or a mobilization reagent reservoir. In some embodiments, the cartridge comprises at least one flow restrictor. In some embodiments, the cartridge comprises at least one valve. In some embodiments, the at least one valve comprises a shear valve. In some embodiments, the shear valve comprises a valve design as illustrated in FIG. 19A. In some embodiments, the shear valve comprises a valve design as illustrated in FIG. 19B. In some embodiments, the cartridge comprises a mechanism to facilitate application of a vacuum to remove excess fluid build-up from an exterior surface of the orifice. In some embodiments, the cartridge comprises a nebulizer mechanism to facilitate formation of a stable Taylor cone. In some embodiments, the cartridge is of a side-manifold design as illustrated in any one of FIG. 16, 17, 18, 19A, or 19B so that clearance is provided for imaging the plurality of separation channels.

Disclosed herein are apparatus comprising: a) a microfluidic device comprising a substrate, wherein the substrate defines: i) one or more inlet ports; ii) a separation channel configured to perform separation of an analyte mixture; and iii) an orifice in fluid communication with an end of the separation channel, wherein the orifice is configured to perform electrospray ionization of separated analyte fractions eluted from the separation channel and expel them into a mass spectrometer, wherein the orientation of the microfluidic device is tilted relative to a horizontal plane such that the orifice is directed downwards towards an inlet of the mass spectrometer; and b) an imaging device configured to simultaneously and continuously image the separation and elution of the separated analyte fractions in the entire separation channel or a portion thereof.

In some embodiments, the system further comprises a mass spectrometer. In some embodiments, the apparatus is further configured to correlate separated analyte peaks detected in the separation channel with mass spectrometer data for the separated analytes. In some embodiments, the separation comprises a chromatographic separation. In some embodiments, the apparatus further comprises at least two electrodes, wherein the at least two electrodes are configured to apply an electric field across the separation channel to separate the analyte mixture via isoelectric focusing. In some embodiments, the apparatus further comprises at least two electrodes, wherein the at least two electrodes are configured to apply an electric field across the separation channel to separate the analyte mixture via electrophoresis. In some embodiments, peaks corresponding to the separated analyte fractions are detected by absorbance imaging. In some embodiments, peaks corresponding to the separated analyte fractions are detected by fluorescence imaging. In some embodiments, the orifice is in electrical communication with the separation channel's electric field. In some embodiments, the orifice is positioned in a recess on the microfluidic device, such that a Taylor cone formed by electrospray ionization is disposed entirely within the recess. In some embodiments, an external surface of the orifice comprises a hydrophobic coating to prevent excess fluid build-up during operation. In some embodiments, the microfluidic device comprises a first separation channel and a second separation channel. In some embodiments, the microfluidic device is configured to perform a chromatographic-enrichment of the analyte mixture in the first separation channel before applying the electric field to perform isoelectric focusing or electrophoretic separation of the analyte mixture in the second separation channel. In some embodiments, isoelectric point (pI) markers are introduced into the separation channel prior to performing an isoelectric focusing separation and are used to map pI ranges in the separation channel. In some embodiments, the apparatus is further configured to determine a value for the isoelectric point of at least one separated analyte fraction. In some embodiments, the analyte mixture comprises intact proteins. In some embodiments, mobilization is performed by introducing an electrolyte into the separation channel using pressure. In some embodiments, mobilization is performed by introducing an electrolyte into the separation channel using electrophoresis. In some embodiments, the microfluidic device further comprises an additional electrolyte introducing channel that intersects the separation channel at the confluence of the separation channel and orifice, and wherein the mobilization is performed by introducing an electrolyte into the separation channel from the electrolyte introducing channel. In some embodiments, the apparatus further comprises two electrodes configured to apply an electric field across the electrolyte introducing channel to introduce a mobilization electrolyte. In some embodiments, the microfluidic device further comprises an anolyte introducing channel and gas delivery channels for ionization. In some embodiments, the microfluidic device further comprises an optical slit aligned with the separation channel such that light is only transmitted through the optical slit. In some embodiments, there are no reservoirs or wells on the microfluidic device. In some embodiments, the one or more inlet ports of the microfluidic device are located on one or more edges of the device as illustrated in FIG. 2. In some embodiments, the microfluidic device is a disposable component of the apparatus. In some embodiments, the microfluidic device further comprises a cartridge which encompasses all or a portion of the substrate, the one or more inlet ports, and the orifice. In some embodiments, the cartridge is a disposable component of the apparatus. In some embodiments, one or more inlet ports are interfaced with a high voltage electrode using a membrane-containing high voltage electrode fixture that provides a bubble-free electrical connection. In some embodiments, the membrane-containing high voltage electrode fixture is that illustrated in FIG. 12. In some embodiments, the membrane comprises a hydrophilic membrane. In some embodiments, the membrane comprises a regenerated cellulose membrane. In some embodiments, the membrane comprises a woven polytetrafluoroethylene (PTFE) membrane that has been treated to be hydrophilic. In some embodiments, a membrane-covered fluid port within the membrane-containing high voltage electrode fixture has a diameter ranging from about 0.5 to about 2 mm. In some embodiments, an electrode reservoir within the membrane-containing high voltage electrode fixture comprises an insert positioned within and at the bottom of the electrode reservoir, wherein the insert comprises an inlet fluid path and an outlet fluid path that allow bubble-free wetting of a surface of the membrane when the electrode reservoir is filled. In some embodiments, the cartridge comprises at least one integrated membrane-containing high voltage electrode fixture. In some embodiments, the cartridge comprises at least one reagent reservoir. In some embodiments, the at least one reagent reservoir comprises an anolyte reservoir, a catholyte reservoir, or a mobilization reagent reservoir. In some embodiments, the cartridge comprises at least one flow restrictor. In some embodiments, the cartridge comprises at least one valve. In some embodiments, the at least one valve comprises a shear valve. In some embodiments, the shear valve comprises a valve design as illustrated in FIG. 19A. In some embodiments, the shear valve comprises a valve design as illustrated in FIG. 19B. In some embodiments, the cartridge comprises a mechanism to facilitate application of a vacuum to remove excess fluid build-up from an exterior surface of the orifice. In some embodiments, the apparatus further comprises a mechanism to facilitate application of a vacuum to remove excess fluid build-up from an exterior surface of the orifice. In some embodiments, the apparatus further comprises a wiper mechanism to remove excess fluid build-up from an exterior surface of the orifice. In some embodiments, the cartridge comprises a nebulizer mechanism to facilitate formation of a stable Taylor cone. In some embodiments, the apparatus further comprises a nebulizer mechanism to facilitate formation of a stable Taylor cone. In some embodiments, the cartridge is of a side-manifold design as illustrated in any one of FIG. 16, 17, 18, 19A, or 19B so that clearance is provided for imaging the plurality of separation channels. In some embodiments, the apparatus further comprises a fluid flow controller configured to provide independently controlled pressure-driven flow through one or more separation channels, one or more mobilizer channels, or one or more auxiliary fluid channels. In some embodiments, the pressure-driven flow through the one or more separation channels, one or more mobilizer channels, or one or more auxiliary fluid channels is pulse-less flow. In some embodiments, the apparatus further comprises a temperature controller configured to maintain the plurality of separation channels at a constant temperature. In some embodiments, the microfluidic device comprises an auxiliary fluid channel used to deliver a calibrant solution for calibrating mass data. In some embodiments, the imaging device may be configured to function as a point detector during elution of analyte fractions from the separation channel to provide improved time resolution for time-based chromatograms. In some embodiments, between 4 and 16 imaging device pixels are binned to function as a point detector. In some embodiments, intensity data from the binned pixels is read-out at a rate of at least 1 Hz.

Disclosed herein are fixtures comprising: a) an electrode reservoir; b) an inlet fluid channel and an outlet fluid channel that intersect at a plane; and c) a membrane positioned within the electrode reservoir on said plane such that it covers an opening comprising the intersection of the inlet fluid channel and the outlet fluid channel; wherein the membrane facilitates the formation of a bubble-free electrical connection between a high voltage electrode and the fluid within the inlet and outlet fluid channels.

In some embodiments, the fixture comprises a design as illustrated in FIG. 12. In some embodiments, the membrane comprises a hydrophilic membrane. In some embodiments, the membrane comprises a regenerated cellulose membrane. In some embodiments, the membrane comprises a woven polytetrafluoroethylene (PTFE) membrane that has been treated to be hydrophilic. In some embodiments, the opening covered by the membrane has a diameter ranging from about 0.5 to about 2 mm. In some embodiments, the electrode reservoir further comprises an insert positioned within and at the bottom of the electrode reservoir and on top of the membrane, wherein the insert comprises an inlet fluid path and an outlet fluid path that allow bubble-free wetting of a surface of the membrane when the electrode reservoir is filled.

Disclosed herein are shear valves comprising a design as illustrated in FIG. 19A or FIG. 19B.

INCORPORATION BY REFERENCE

All publications, patents, and patent applications mentioned in this specification are herein incorporated by reference in their entirety to the same extent as if each individual publication, patent, or patent application was specifically and individually indicated to be incorporated by reference in its entirety. In the event of a conflict between a term herein and a term in an incorporated reference, the term herein controls.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 10A: front view of a second nebulizer design. FIG. 10B: isometric view of a second nebulizer design. FIG. 10C: top cut-away view of a third nebulizer design. FIG. 10D: side cut-away view of a third nebulizer design.

FIG. 11A: partial cut-away view as mounted on microfluidic device cartridge. FIG. 11B: stand-alone partial cut-away view. FIG. 11C: cut-away side view. FIG. 11D: cut-away top view.

FIGS. 13A-F schematically illustrate a non-limiting example of a fixture comprising a membrane. FIG. 13A partial cut-away view. FIG. 13B: top view of electrode reservoir. FIG. 13C: partial cut-away view of electrode reservoir. FIG. 13D: top view of bottom of electrode reservoir.

FIG. 13E: cut-away detail of bottom of electrode reservoir. FIG. 13F: cut-away side view of bottom of electrode reservoir.

FIG. 19A: cartridge comprising a rotating shear valve. FIG. 19B: cartridge comprising a spring-loaded shear valve.

FIGS. 28 A-D show different perspective views of an example imaging system disclosed herein.

FIG. 32A: plot of UV absorbance versus pixel number of the image sensor used to image a separation channel. FIG. 32B: the mobilization chromatogram (plot of UV absorbance versus time) derived from data such as that illustrated in FIG. 32A.

DETAILED DESCRIPTION

Figure 1A:
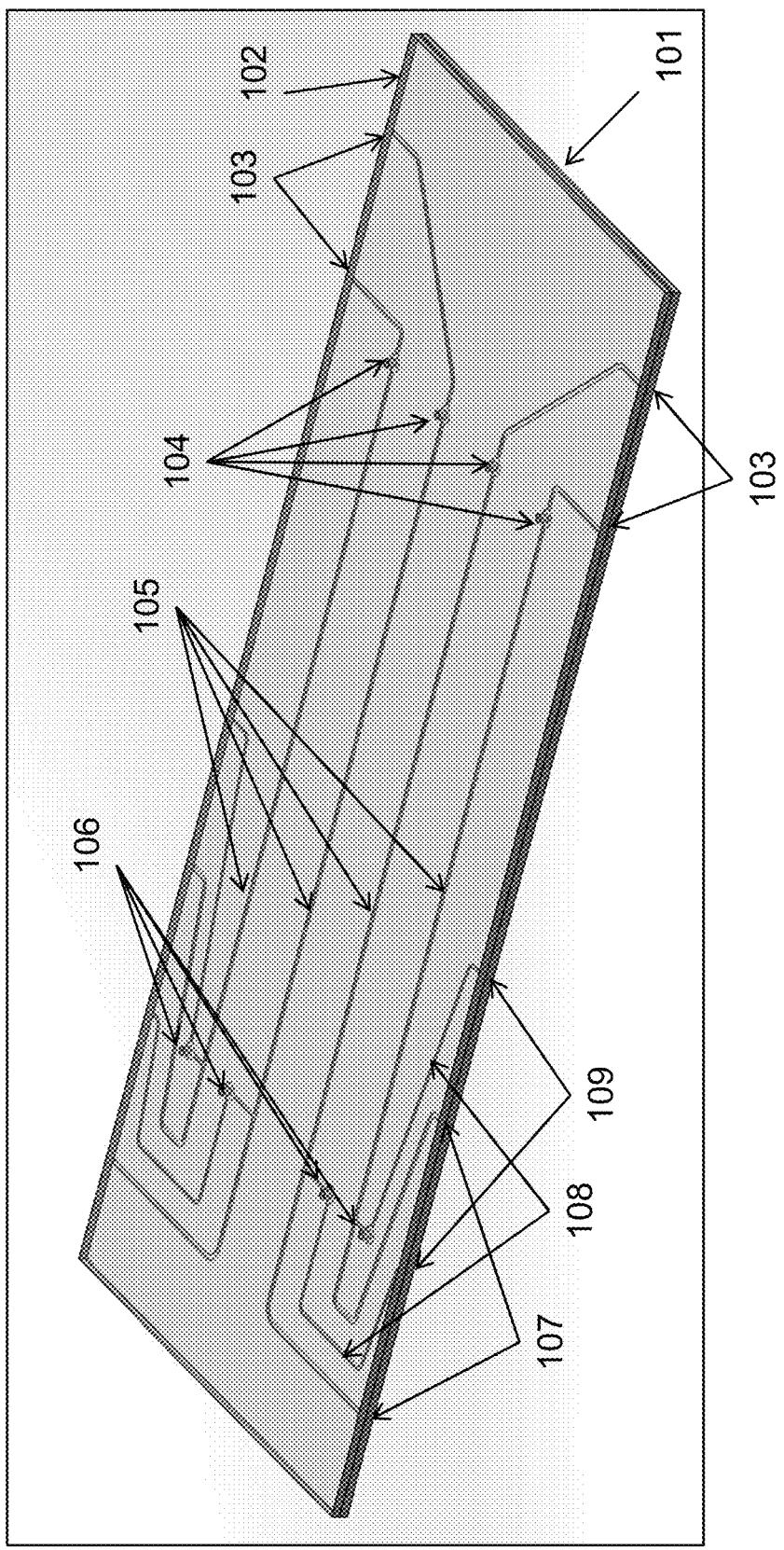
FIG. 1A provides a non-limiting schematic illustration of a microfluidic device comprising a four-channel isoelectric focusing design according to one aspect of the present disclosure.

Disclosed herein are methods, devices, and systems for performing a plurality of isoelectric focusing reactions (or other separation reactions) in parallel for fast, accurate separation and characterization of protein analyte mixtures or other biological molecules by isoelectric point (or other physicochemical properties).

In one aspect of the present disclosure, microfluidic devices comprising two or more separation channels for performing two or more separation reactions in parallel are described, where the microfluidic format enables fast, accurate separation and characterization of analyte mixtures using extremely small input sample volumes. In some embodiments, the microfluidic device comprises a planar substrate, which planar substrate comprises the two or more separation channels. In a preferred aspect, the separation reactions are isoelectric focusing reactions. In another preferred aspect, the analyte mixtures comprise protein analyte mixtures, and the performance of two or more isoelectric focusing reactions in parallel enables fast, accurate separation of the protein components in the analyte mixture and characterization of the individual protein components according to their isoelectric points (pIs). In some instances, the use of imaging, e.g., whole channel imaging, in combination with pI markers to visualize the positions of the pI markers in the pH gradient used for isoelectric focusing allows for more accurate determinations of the pIs for the separated protein components of the analyte mixture.

In another aspect of the present disclosure, methods and systems for operating said microfluidic devices are described, where the use of two or more high voltage power supplies (or a single multiplexed high voltage power supply), enables independent control of the separation reaction or experimental conditions in each separation channel of the microfluidic device. Thus, in some instances, the microfluidic device may be used to perform separation and characterization of two or more different samples under the same set of separation or experimental conditions in parallel. In some instances, the microfluidic device may be used to perform separation and characterization of two or more aliquots of the same sample under two or more different reaction or experimental conditions in parallel. In some instances, a subset of the separation channels on the device may be used to perform separations of a plurality of samples under the same set of separation or experimental conditions, and, alternatively or in addition to, a different subset of the separation channels on the device may be used to perform separation and characterization of a plurality of aliquots from the same sample under a plurality of different reaction or experimental conditions in parallel.

The experimental conditions may be the same or may differ across the separation channels of the microfluidic device and may comprise a buffer selection, an electrolyte selection, a pH gradient selection, a voltage setting, a current setting, an electric field strength setting, a time course for varying a voltage setting, a current setting, an electric field strength setting, an isoelectric focusing reaction, or a combination thereof.

In some instances, the systems of the present disclosure comprise one or more of the disclosed microfluidic devices, and two or more high voltage power supplies (or a single, multiplexed high voltage power supply that allows independent control of two or more channels). In some instances, the two or more high voltage power supplies (or single, multiplexed high voltage power supply that allows independent control of two or more channels) are configured to monitor and/or record the current flowing through each separation channel. The monitoring of a separation channel (e.g., the current of the separation channel) may, in some instances, be performed independently of the monitoring of the other separation channels. In some instances, the current flowing through each separation channel may be used, for example, to determine when an isoelectric focusing reaction is complete and/or to detect a failure (e.g., introduction or formation of a bubble in a separation channel, an incorrectly prepared sample, an underfilled reagent reservoir, or a combination thereof). In some instances, the failure may be detected by monitoring the current flowing through a separation channel or by processing an image of the separation channel. In some instances, the voltage supply may be configured to shut off the voltage applied to a separation channel following detection of a failure. In some instances, the voltage supply may be configured to restart a separation reaction following the detection of a failure.

In some instances, the system may further comprise an autosampler or fluid handling system configured for automated, independently controlled loading of sample aliquots and/or other separation reaction reagents into a plurality of sample or reagent inlet ports. In some instances, the system may further comprise a fluid flow controller configured to provide, e.g., independently controlled pressure-driven flow through two or more separation channels (e.g., for use alone or in combination with a voltage gradient applied to the two or more separation channels). In some instances, the system may further comprise an autosampler or fluid flow controller configured to flush, wash, rinse, or evacuate the two or more separation channels following a separation reaction (e.g., isoelectric focusing reaction). In some instances, following the flush, wash, rinse, or evacuation of the two or more separation channels, the autosampler or fluid flow controller may be configured to automatically introduce another sample (e.g., a different sample or another aliquot of the same sample) into the two or more separation channels. In some instances, the autosampler or fluid flow controller may be configured to automatically re-introduce a sample, reaction reagents, or a combination thereof into the one or more separation channels if a failure (e.g., bubble formation or introduction, incorrectly prepared sample, underfilled reagent reservoir, or a combination thereof) is detected (e.g., via the voltage or current monitoring). In such cases, following the detection of the failure, the autosampler or fluid flow controller may flush out the separation channel where the failure occurred, re-introduce a sample, reaction reagents, or a combination thereof, and the separation reaction may be re-initiated (e.g., via application of an electric field by one or more of the independently controlled voltage supplies).

In some instances, the system may further comprise an imaging module configured to acquire a series of one or more images of the two or more separation channels. In some instances, the field-of-view of the images may comprise all or a portion of the two or more separation channels. In some instances, the imaging may comprise continuous imaging while the separation reactions are performed. In some instances, the imaging may comprise intermittent imaging while the separation reactions are performed. In some instances, the imaging may comprise acquiring UV absorbance images. In some instances, the imaging may comprise fluorescence images, e.g., of either native fluorescence or fluorescence due to the presence of exogenous fluorescent labels attached to the analytes. In some instances, the imaging module may be configured, for example, to determine when an isoelectric focusing reaction is complete and/or to detect a failure (e.g., introduction or formation of a bubble in a separation channel).

In some instances, the system may further comprise a microplate-handling robotics module configured to transport and replace microplates that serve as sources for samples and/or reagents. In some instances, the system may further comprise a microfluidic device-handling robotics module configured to transport and replace the microfluidic devices used in the system, e.g., after a failure is detected. In some instances, the microplate-handling and the microfluidic device-handling may be handled by the same robotics module.

In another aspect of the present disclosure, systems are described that may comprise a microfluidic device designed to perform one or more separation reactions, e.g., isoelectric focusing reactions, to separate a sample comprising a mixture of analytes into its individual components, followed by electrospray ionization of the separated analytes. In some instances, the microfluidic device may be housed in a cartridge that further comprises, e.g., high-voltage electrode connections, reagent reservoirs, valves, etc. In some instances, the microfluidic device may comprise a substantially planar substrate, where the planar substrate comprises a plurality of separation channels. In some instances, a first end of one or more separation channels of the plurality of separation channels is electrically and/or fluidically coupled to an electrode (e.g., anolyte) reservoir using a fixture, which fixture may comprise a membrane. In some instances, a second end of one or more separation channels is electrically and/or fluidically coupled to an electrode (e.g., catholyte) reservoir using a fixture, which fixture may comprise a membrane. The membrane may be disposed within the electrode reservoir at or adjacent to a plane that defines or is parallel to a surface of the electrode reservoir, which plane may intersect an inlet fluid channel and outlet fluid channel. The membrane may cover all or substantially all of an opening comprising an intersection of the inlet fluid channel and outlet fluid channel. In some instances, the system may further comprise an analytical instrument such as a mass spectrometer. The disclosed methods, devices, and systems enable improvements in the reproducibility and quantitative accuracy of the separation data, and also improved correlation between the separation data and downstream analytical characterization data, e.g., that obtained using a mass spectrometer or other analytical instrument.

A key feature of the disclosed methods, devices, and systems, as indicated above, is the use of imaging to monitor separation reactions in a separation channel for the purpose of detecting the presence of analyte peaks and/or to determine when the separation reaction has reached completion. In some instances, images may be acquired for all or a portion of the separation channel. In some instances, imaging of all or a portion of the separation channel may be performed while the separation step and/or a mobilization step are performed. In some instances, the images may be used to detect the position of enriched analyte peaks within the separation channel. In some instances, the images may be used to detect the presence of one or more markers or indicators, e.g., isoelectric point (pI) standards, within the separation channel and thus determine the pIs for one or more analytes. In some instances, the images may be used to detect a failure in a separation channel (e.g. bubble formation). In some instances, data derived from such images may be used to determine when a separation reaction is complete (e.g., by monitoring peak velocities, peak positions, and/or peak widths) and subsequently trigger a mobilization step.

In some instances, the mobilization step may comprise introduction of a mobilization buffer or a mobilization electrolyte into the separation channel. In some instances, the mobilization buffer or mobilization electrolyte may be introduced using hydrodynamic pressure. In some instances, the mobilization buffer or mobilization electrolyte may be introduced by means of electrophoresis. In some instances, the mobilization buffer or mobilization electrolyte may be introduced by means of a combination of electrophoresis and hydrodynamic pressure. In some instances, the mobilization of a series of one or more separated analyte bands may comprise causing the separated analyte bands to migrate towards an outlet or distal end of the separation channel. In some instances, the mobilization of a series of one or more separated analyte bands may comprise causing the separated analyte bands to migrate towards an outlet or distal end of the separation channel that is in fluid communication with a downstream analytical instrument. In some instances, the outlet or distal end of the separation channel may be in fluid communication with an electrospray ionization (ESI) interface such that the migrating analyte peaks are injected into a mass spectrometer. In some instances, the image data used to detect analyte peak positions and determine analyte pIs may also be used to correlate analyte separation date with mass spectrometry data. In some instances, the image data used to detect analyte peak positions may be used to yield information on the mobilization reaction and/or to correlate the mobilization information with the mass spectrometry data.

In some instances, other characterization techniques may be used to monitor the one or more separation reactions. In some instances, dynamic light scattering may be used in at least one of the separation channels while performing a separation reaction (e.g., isoelectric focusing). In some instances, dynamic light scattering may be used to determine a size distribution profile, an aggregation state, or a hydrodynamic radius of one or more analytes. The one or more analytes may be separated using a separation reaction (e.g., isoelectric focusing).

In preferred aspects, the disclosed methods may be performed in a microfluidic device format, thereby allowing for processing of extremely small sample volumes and integration of two or more sample processing and separation steps. In another preferred aspect, the disclosed microfluidic devices comprise an integrated interface for coupling to a downstream analytical instrument, e.g., an ESI interface for performing mass spectrometry on the separated analytes. In some instances, the disclosed methods may be performed in a more conventional capillary format.

Various aspects of the disclosed methods, devices, and systems described herein may be applied to any of the particular applications set forth below. It shall be understood that different aspects of the disclosed methods, devices, and systems can be appreciated individually, collectively, or in combination with each other.

Definitions: Unless otherwise defined, all of the technical terms used herein have the same meaning as commonly understood by one of ordinary skill in the art in the field to which this disclosure belongs.

As used in this specification and the appended claims, the singular forms "a", "an", and "the" include plural references unless the context clearly dictates otherwise. Any reference to "or" herein is intended to encompass "and/or" unless otherwise stated. Similarly, the terms "comprise", "comprises", "comprising", "include", "includes", and "including" are not intended to be limiting.

As used herein, the phrases "including, but not limited to . . . " and "one non-limiting example is . . . " are meant to be inclusive of variations and derivatives of the given example, as commonly understood by one of ordinary skill in the art in the field to which this disclosure belongs.

As used herein, the term 'about' a number refers to that number plus or minus 10% of that number. The term 'about' when used in the context of a range refers to that range minus 10% of its lowest value and plus 10% of its greatest value.

As used herein, the terms "characterization" and "analysis" may be used interchangeably. To "characterize" or "analyze" may generally mean to assess a sample, for example, to determine one or more properties of the sample or components thereof, or to determine the identity of the sample.

As used herein, the terms "chip" and "device" may be used interchangeably herein.

As used herein, the terms "analyte" and "species" may be used interchangeably. An analyte generally means a molecule, biomolecule, chemical, macromolecule, etc., that differs from another molecule, biomolecule, chemical, macromolecule, etc. in a measurable property. For example, two species may have a slightly different mass, hydrophobicity, charge or net charge, isoelectric point, efficacy, or may differ in terms of chemical modifications, protein modifications, etc.

Samples: The disclosed methods, devices, systems, and software may be used for separation and characterization of analytes obtained from any of a variety of biological or non-biological samples. Examples include, but are not limited to, tissue samples, cell culture samples, whole blood samples (e.g., venous blood, arterial blood, or capillary blood samples), plasma, serum, saliva, interstitial fluid, urine, sweat, tears, protein samples derived from industrial enzyme or biologic drug manufacturing processes, environmental samples (e.g., air samples, water samples, soil samples, surface swipe samples), and the like. In some embodiments, the samples may be processed using any of a variety of techniques known to those of skill in the art prior to analysis using the disclosed methods and devices for integrated chemical separation and characterization. For example, in some embodiments the samples may be processed to extract proteins or nucleic acids. Samples may be collected from any of a variety of sources or subjects, e.g., bacteria, virus, plants, animals, or humans.

Sample volumes: In some instances of the disclosed methods and devices, the use of a microfluidic device format may enable the processing of very small sample volumes. In some embodiments, the sample volume loaded into the device and used for analysis may range from about 0.1 µl to about 1 ml. In some embodiments, the sample volume loaded into the device and used for analysis may be at least 0.1 µl, at least 1 µl, at least 2.5 µl, at least 5 µl, at least 7.5 µl, at least 10 µl, at least 25 µl, at least 50 µl, at least 75 µl, at least 100 µl, at least 250 µl, at least 500 µl, at least 750 µl, or at least 1 ml. In some embodiments, the sample volume loaded into the device and used for analysis may be at most 1 ml, at most 750 µl, at most 500 µl, at most 250 µl, at most 100 µl, at most 75 µl, at most 50 µl, at most 25 µl, at most 10 µl, at most 7.5 µl, at most 5 µl, at most 2.5 µl, at most 1 µl, or at most 0.1 µl. Any of the lower and upper values described in this paragraph may be combined to form a range included within the present disclosure, for example, in some embodiments the sample volume loaded into the device and used for analysis may range from about 5 µl to about 500 µl. Those of skill in the art will recognize that sample volume used for analysis may have any value within this range, e.g., about 18 µl.

Analytes: In some instances, a sample may comprise a plurality of analyte species. In some instances, all or a portion of the analyte species present in the sample may be enriched prior to or during analysis. In some instances, these analytes can be, for example, glycans, carbohydrates, nucleic acid molecules (e.g., DNA, RNA), peptides, polypeptides, recombinant proteins, intact proteins, protein isoforms, digested proteins, fusion proteins, antibody-drug conjugates, protein-drug conjugates, metabolites or other biologically relevant molecules. In some instances, these analytes can be small molecule drugs. In some instances, these analytes can be protein molecules in a protein mixture, such as a biologic protein pharmaceutical (e.g., enzyme pharmaceutical or antibody pharmaceutical) and/or a lysate collected from cells isolated from culture or in vivo.

Microfluidic devices: Disclosed herein are devices designed to perform a plurality of analyte separation reactions in parallel, i.e., within a plurality of separation channels. In some instances, the disclosed devices are microfluidic devices designed to perform a plurality of analyte separation reactions in parallel, i.e., within a plurality of separation channels within the device. In some instances, the microfluidic device may be designed to perform one or more different separation steps, i.e., a first separation reaction, a second separation reaction, a third separation reaction, and so forth, for a plurality of analyte samples in parallel in the same device, i.e., within a plurality of first separation channels, second separation channels, third separation channels, and so forth, within the device. In a preferred instance, at least one of the separation steps may comprise isoelectric focusing, and the device may be designed to perform two or more isoelectric focusing reactions in parallel, i.e., in two or more separation channels within the device. In some instance, the number of separation channels, e.g., 4, 6, or 12, may be chosen to coincide with the layout of microplate wells used as sample and/or reagent sources.

In some instances, the microfluidic devices comprises a substantially planar substrate, wherein the planar substrate comprises a plurality of fluid inlets, which fluid inlets or a portion thereof are located at one or more edges of the planar substrate, and a plurality of separation channels comprising (i) a first end that is electrically coupled to an electrode reservoir (e.g., anolyte reservoir) using a first fixture and (ii) a second end that is electrically coupled to another electrode reservoir (e.g., catholyte reservoir) using a second fixture, and wherein one of the first end or the second end of each separation channel of the plurality of separation channels is in fluid communication with a different fluid inlet of the plurality of fluid inlets. In some instances, the first fixture and/or the second fixture comprises a membrane. In some instances, the first fixture and/or the second fixture is a high voltage electrode fixture and optionally includes a membrane.

FIG. 1A provides a non-limiting schematic illustration of a microfluidic device comprising a four-channel isoelectric focusing design according to one aspect of the present disclosure, as will be discussed in more detail in Example 1 below.

Figure 1B:
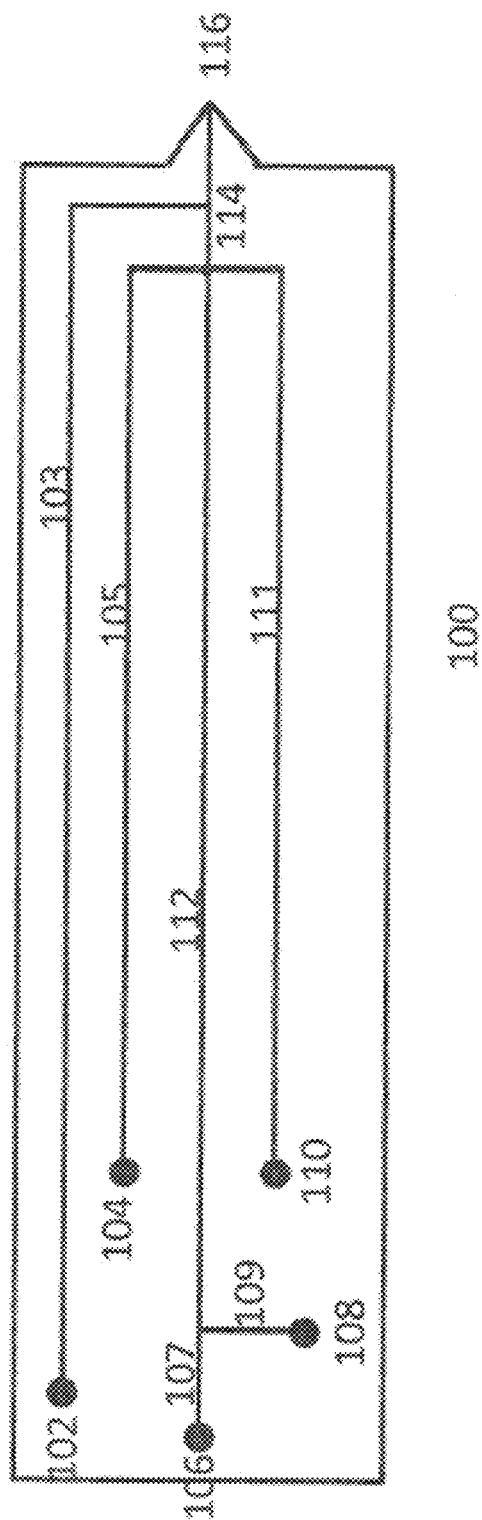
FIG. 1B provides a non-limiting schematic illustration of a fluid channel network of an exemplary microfluidic device comprising an electrospray tip of the present disclosure.

FIG. 1B provides a non-limiting schematic illustration of a fluid channel network of an exemplary microfluidic device for performing a separation reaction and comprising an electrospray tip according to a second aspect of the present disclosure, as will be described in more detail Example 14 below.

In some instances, the number of separation channels within the device that are configured for performing each separation step (e.g., an isoelectric focusing reaction) in parallel may be at least 2, at least 3, at least 4, at least 5, at least 6, at least 7, at least 8, at least 9, at least 10, at least 12, at least 14, at least 16, at least 18, at least 20, or more than 20. In some instances, the number of separation channels within the device that are configured for performing each separation step in parallel may be at most 20, at most 18, at most 16, at most 14, at most 12, at most 10, at most 9, at most 8, at most 7, at most 6, at most 5, at most 4, at most 3, or at most 2. Any of the lower and upper values described in this paragraph may be combined to form a range included within the present disclosure, for example, in some instances the number of separation channels within the device that are configured for performing each separation step in parallel may range from about 4 to about 12. Those of skill in the art will recognize that the number of separation channels within the device that are configured for performing each separation step in parallel may have any value within this range, e.g., about 5.

In some instances, a proximal end of each separation channel of the plurality of separation channels is in fluid communication with a different inlet port, so that a different sample or sample aliquot may be introduced into each separation channel. In some instances, a proximal end of each separation channel in a subset of the plurality of separation channels is in fluid communication with the same inlet port, so that the same sample or sample aliquot may be introduced into the subset of the separation channels. In some instances, a proximal end of each separation channel of the plurality of separation channels is in fluid communication with the distal or outlet end of an upstream separation channel.

In some instances, a distal end of each separation channel of the plurality of separation channels is in fluid communication with a different outlet port. In some instances, a distal end of each separation channel in a subset of the plurality of separation channels is in fluid communication with the same outlet port. Such an example of a shared outlet port among the plurality of separation channels may be useful for removal of contents therein, e.g., to facilitate waste collection. In some instances, a distal end of each separation channel of the plurality of separation channels is in fluid communication with the proximal or inlet end of a downstream separation channel.

In some instances, the disclosed microfluidic devices may comprise two or more integrated electrodes configured to apply a voltage gradient along a separation channel or interconnecting channel that intersects a separation channel. In some instances, the device comprises an integrated pair of electrodes for each separation channel, wherein one electrode of each pair is in contact with the proximal end of a separation channel, and the other electrode is in contact with the distal end of the separation channel. In some instances, the disclosed microfluidic devices may comprise at least two, at least three, at least four, at least five, or at least six integrated electrodes per separation channel. In some instances, the disclosed microfluidic devices may comprise an integrated pair of electrodes for each separation channel at each stage of separation, e.g., first separation channels, second separation channels, third separation channels, and so forth.

In addition to a plurality of separation channels (e.g., two or more first separation channels, two or more second separation channels, two or more third separation channels, and so forth), the devices or microfluidic devices of the present disclosure may comprise a plurality of inlet ports, outlet ports, sample and/or reagent introduction channels, interconnecting channels, sample and/or reagent waste channels, reservoirs (e.g., sample reservoirs, reagent reservoirs, or waste reservoirs), micropumps, microvalves, vents, traps, filters, membranes, and the like, or any combination thereof.

The disclosed devices and microfluidic devices may be fabricated using any of a variety of fabrication techniques and materials known to those of skill in the art. In some instances, the devices may be fabricated as a series of two or more separate parts, and subsequently either mechanically clamped or permanently bonded together to form the completed device. In some instances, for example, fluid channels (also sometimes referred to herein as "microchannels") may be fabricated in a first layer (e.g., by photolithographic patterning of a glass substrate and wet chemical etching of the channels to the desired depth), and then sealed by bonding a second layer to the first layer, where through holes in the second layer that intersect with the fluid channels provide external access to the fluid channels. In some instances, fluid channels may be fabricated in a first layer (e.g., by laser cutting of a channel pattern in a suitable polymer film), and then sealed by sandwiching and bonding the first layer between second and third layers, where through holes in the second layer and/or third layer that intersect with the fluid channels provide external access to the fluid channels. In the latter example, the thickness of the first layer defines the thickness (or depth) of the fluid channels.

Examples of suitable fabrication techniques include, but are not limited to, conventional machining, CNC machining, injection molding, 3D printing, alignment and lamination of one or more layers of laser- or die-cut polymer film, or any of a number of microfabrication techniques such as photolithography and wet chemical etching, dry etching, deep reactive ion etching, or laser micromachining. In some embodiments, the microfluidic structures may be 3D printed from an elastomeric material.

The disclosed devices and microfluidic devices may be fabricated using any of a variety of materials known to those of skill in the art. In general, the choice of material used will depend on the choice of fabrication technique, and vice versa. Examples of suitable materials include, but are not limited to, glass, quartz, fused-silica, silicon, any of a variety of polymers, e.g. polydimethylsiloxane (PDMS; elastomer), polymethylmethacrylate (PMMA), polycarbonate (PC), polystyrene (PS), polypropylene (PP), polyethylene (PE), polyfluorinated polyethylene, high density polyethylene (HDPE), polyether ether ketone, polyimide, cyclic olefin polymers (COP), cyclic olefin copolymers (COC), polyethylene terephthalate (PET), polyether ether ketone (PEEK), epoxy resins, a non-stick material such as teflon (polytetrafluoroethylene (PTFE)), a variety of photoresists such as SU8 or any other thick film photoresist, or any combination of these materials. In some instances, different layers in a device or microfluidic device comprising multiple layers may be fabricated from different materials. In some instances, a given single layer in a device or microfluidic device comprising one or more layers may be fabricated from two or more different materials.

In some instances, all or a portion of the device or microfluidic device may be optically transparent (e.g., transparent to ultraviolet (UV), visible, and/or near-infrared light) to facilitate imaging of the separation channels and/or other portions of the device. In some instances, all or a portion of the separation channels are configured for imaging, e.g., whole channel imaging. For example, in some instances the separation channels may be fabricated in a layer of optically opaque material that is sandwiched between two layers of optically transparent material, thereby forming an "optical slit" through which light may be transmitted and/or collected.

In general, the dimensions of fluid channels, sample and/or reagent reservoirs, etc., in the disclosed devices will be optimized to (i) provide fast, accurate, and reproducible separation of samples or sample aliquots comprising analyte mixtures, and (ii) to minimize sample and reagent consumption. In general, the width of fluid channels or reservoirs may be between about 10 μm and about 2 mm. In some instances, the width of fluid channels (or reservoirs) may be at least 10 μm, at least 25 μm, at least 50 μm at least 100 μm, at least 200 μm, at least 300 μm, at least 400 μm, at least 500 μm, at least 750 μm, at least 1 mm, at least 1.5 mm, or at least 2 mm. In some instances, the width of fluid channels (or reservoirs) may at most 2 mm, at most 1.5 mm, at most 1 mm, at most 750 μm, at most 500 μm, at most 400 μm, at most 300 μm, at most 200 μm, at most 100 μm, at most at most 25 μm, or at most 10 μm. Any of the lower and upper values described in this paragraph may be combined to form a range included within the disclosure, for example, in some instances the width of the fluid channels (or reservoirs) may range from about 100 μm to about 1 mm. Those of skill in the art will recognize that the width of the fluid channels (or reservoirs) may have any value within this range, for example, about 80 μm.

In general, the depth of the fluid channels (or reservoirs) will be between about 1 μm and about 1 mm. In some instances, the depth of the fluid channels (or reservoirs) may be at least 1 μm, at least 5 μm, at least 10 μm, at least 20 μm, at least 30 μm, at least 40 μm, at least 50 μm, at least 100 μm, at least 200 μm, at least 300 μm, at least 400 μm, at least 500 μm, at least 600 μm, at least 700 μm, at least 800 μm, at least 900 μm, or at least 1 mm. In some instances, the depth of the fluid channels (or reservoirs) may be at most 1 mm, at most 900 μm, at most 800 μm, at most 700 μm, at most 600 μm, at most 500 μm, at most 400 μm, at most 300 μm, at most 200 μm, at most 100 μm, at most 50 μm, at most 40 μm, at most 30 μm, at most 20 μm, at most 10 μm, at most 5 or at most 1 μm. Any of the lower and upper values described in this paragraph may be combined to form a range included within the disclosure, for example, in some instances the depth of the fluid channels (or reservoirs) may range from about 50 μm to about 100 μm. Those of skill in the art will recognize that the depth of the fluid channels (or reservoirs) may have any value within this range, for example, about 55 μm.

Cartridges: In some instances, the disclosed devices or systems may be configured to be coupled to one another or may be a part of an integrated unit, such as a cartridge. The cartridge may comprise the microfluidic device, a substrate comprising a plurality of separation channels, reservoirs, reagents, membranes, valves, fixtures (e.g., those described herein, such as membrane-containing high voltage electrode fixtures) securing devices or features (e.g., screws, pins (e.g., pogo pins), adhesives, levers, switches, grooves, form-fitting pairs, hooks and loops, latches, threads, clips, clamps, prongs, rings, rubber bands, rivets, grommets, ties, snaps, tapes, vacuum, seals), gaskets, o-rings, electrodes, or a combination thereof. The cartridge may be monolithically built or may be modular and comprise removable parts. For instance, the microfluidic device may be configured to couple removably to the cartridge. Similarly, the reservoirs, membranes, valves, etc. may each be removable from the cartridge. In the case where one or more components may be removable, the cartridge may be configured such that each of the individual components may be aligned in place with sufficient tolerance by a user. For example, the cartridge may comprise grooves and pins, such that the microfluidic device may be integrated by sliding the device along the cartridge until the cartridge reaches a pin for alignment. In some instances, the device may be configured to be positioned flush with the cartridge or a portion thereof. In some instances, the device may be positioned into the cartridge such that one or more inlets, outlets, etc. may be connected (e.g., fluidically and/or electrically) to a reservoir, electrode, membrane and/or other useful interfacing unit. In some instances, the interfacing of the device and the reservoirs, electrodes, etc. may be performed by a without any additional measurement or adjustment from the user. For example, the reservoirs may be configured to receive an electrode which snaps into place or is secured via a pogo pin, thereby establishing electrical and/or fluidic communication. It will be appreciated that these example configurations of the cartridge and device are not meant to be limiting, and that many different configurations of positioning the microfluidic device or other component of the cartridge may be achieved. In some instances, the cartridge may be configured to be a disposable component of the systems described herein.

In a preferred embodiment, the cartridge may comprise one or more reservoirs that is configured to contain a desired volume of fluid. In some instances, the reservoir may be capable of containing at least about 200 microliters (μL), at least about 300 μL, at least about 400 μL, at least about 500 μL, at least about 600 μL, at least about 700 μL, at least about 800 μL, at least about 900 μL, at least about 1 milliliter (mL), at least about 1.5 mL, at least about 2 mL, at least about 2.5 mL, at least about 3 mL, at least about 3.5 mL, at least about 4 mL, at least about 4.5 mL, or at least about 5 mL. In some instances, the reservoir may be capable of containing at most about 5 mL, at most about 4.5 mL, at most about 4 mL, at most about 3.5 mL, at most about 3 mL, at most about 2.5 mL, at most about 2 mL, at most about 1.5 mL, at most about 1 mL, at most about 900 μL, at most about 800 μL, at most about 700 μL, at most about 600 μL, at most about 500 μL, at most about 400 μL, at most about 300 μL, or at most about 200 μL. Any of the lower and upper values described in this paragraph may be combined to form a range included within the present disclosure, for example, in some instances the reservoir may contain a volume of fluid that may range from about 200 μL to about 2 mL. Those of skill in the art will recognize that the reservoir fluid volume capacity may have any value within this range, e.g., about 1.8 mL.

In some embodiments, one or more kits may be provided, which may comprise the cartridge, one or more reagents, and in some instances, instructions for using the kit. The reagents may be stored in the reservoir as a liquid. In some embodiments, the reagents may be dry, e.g., lyophilized, and able to be reconstituted in a solution or buffer. In some cases, the reagents may be separate from the cartridge and may be provided in the kit.

In some instances, the reservoirs may be controllably coupled (e.g., electrically, fluidically) to the microfluidic device. For example, the cartridge may comprise one or more valves, which may be used to control the flow volumes or rate in the device. In some cases, the cartridge may comprise a stop-cock valve or a shear valve (e.g., sliding valve or rotating shear valve), which may allow for controlled flow rate during delivery of one or more liquid reagents (e.g., mobilization reagents). In some cases, the cartridge may be integrated or interfaced with a syringe pump, which may be used to control the flow rate of liquid into the device. In some cases, the flow rate may be controlled using a piston, a spring-loaded device, or other mechanical approaches.

In some instances, the cartridge may be configured to accommodate different types or models of devices. For instance, the cartridge may be configured to accommodate at least 1, 2, 3, 4, 5, 6, 7, 8, 9, 10, 20, 30, 40, 50, 60, 70, 80, 90, or 100 different types or models of devices. In some cases, the cartridge may comprise ports or connections that can interface with the channels of the chip (e.g., interface with the inlets and/or outlets of the chip).

Separation and enrichment of analytes: In some instances, the disclosed devices or systems may be configured to perform one or more separation or enrichment steps in which a plurality of analytes in a mixture are separated and/or concentrated in individual fractions. For example, in some instances the disclosed devices may be configured to perform a first enrichment step, in which a mixture of analytes in a sample are separated into and/or enriched as analyte fractions (e.g., analyte peaks or analyte bands) containing a subset of the analyte molecules from the original sample. In some instances, these separated analyte fractions may be mobilized and/or eluted, and in some instances, may then be subjected to another downstream separation and/or enrichment step. In some instances, e.g., following a final separation and/or enrichment step, the separated/enriched analyte fractions may be expelled from the device for further analysis.

In some instances, the disclosed devices and systems may be configured to perform one, two, three, four, or five or more separation and/or enrichment steps. In some instances, one or more of the separation or enrichment steps may comprise a solid-phase separation technique, e.g., reverse-phase HPLC. In some instances, one or more of the separation or enrichment steps may comprise a solution-phase separation and/or enrichment technique, e.g., capillary zone electrophoresis (CZE) or isoelectric focusing (IEF).

The disclosed devices and systems may be configured to perform any of a variety of analyte separation and/or enrichment techniques known to those of skill in the art, where the separation or enrichment step(s) are performed in at least a first separation channel that is configured to be imaged in whole or in part so that the separation process may be monitored as it is performed. For example, in some instances the imaged separation may be an electrophoretic separation comprising, e.g., isoelectric focusing, capillary gel electrophoresis, capillary zone electrophoresis, isotachophoresis, capillary electrokinetic chromatography, micellar electrokinetic chromatography, flow counterbalanced capillary electrophoresis, electric field gradient focusing, dynamic field gradient focusing, and the like, that produces one or more separated analyte fractions from an analyte mixture. In some instances, a separation and mobilization step may be performed in at least a first separation channel that is configured to be imaged in whole or in part so that the separation and mobilization processes may be monitored as they are performed. In any of these instances, the imaging of the separation channel in whole or in part may be performed continuously or intermittently and may be performed prior to, during, or following the separation and/or enrichment process.

In some instances, the use of a microfluidic device format may provide for fast separation times and accurate, reproducible separation data. For example, in instances where the microfluidic device is configured to perform electrophoretic separations and/or isoelectric focusing reactions, the high surface area-to-volume ratios of microfluidic channels may allow one to use high electric field strengths without incurring significant Joule heating, thereby enabling very fast separation reactions without substantial dispersion and loss of separation resolution. In some instances, the precise control of fluid channel geometries provides for accurate and reproducible control of sample injection volumes, electric field strengths, etc., thereby enabling very accurate determinations of one or more parameters of the assay, e.g., separation resolution and/or pI determinations.

The one or more parameters of the assay may comprise a characteristic of the separation. For example, the one or more parameters may be selected from the group consisting of separation resolution, peak width, peak capacity, linearity of the pH gradient, and minimum resolvable pI difference.

In general, the separation time required to achieve complete separation will vary depending on the specific separation technique and operational parameters utilized (e.g., separation channel length, microfluidic device design, buffer compositions, applied voltages, etc.). In some instances, the separation times achieved using the disclosed devices and systems may range from about 0.1 minutes to about 30 minutes. In some instances, the separation time may be at least 0.1 minutes, at least 0.5 minutes, at least 1 minute, at least 5 minutes, at least 10 minutes, at least 15 minutes, at least 20 minutes, at least 25 minutes, or at least 30 minutes. In some instances, the separation time may be at most 30 minutes, at most 25 minutes, at most 20 minutes, at most 15 minutes, at most 10 minutes, at most 5 minutes, at most 1 minute, at most 0.5 minutes, or at most 0.1 minutes. Any of the lower and upper values described in this paragraph may be combined to form a range included within the present disclosure, for example, in some instances the separation time may range from about 1 minute to about 20 minutes. Those of skill in the art will recognize that the separation time may have any value within this range, e.g., about 11.2 minutes.

Similarly, the separation efficiency and resolution achieved using the disclosed devices and systems may vary depending on the specific separation technique and operational parameters utilized (e.g., separation channel length, microfluidic device design, buffer compositions, applied voltages, etc.), as well as whether one or two dimensions of separation are utilized. In some instances, for example when performing isoelectric focusing, the use of switchable electrodes to trigger electrophoretic introduction of a mobilization electrolyte into the separation channel may result in improved separation resolution. For example, in some instances, the separation resolution of IEF performed using the disclosed methods and devices may provide for a resolution of analyte bands differing in pI ranging from about 0.1 to about 0.0001 pH units. In some instances, the IEF separation resolution may allow for resolution of analyte bands differing in pI by less than 0.1, less than 0.05, less than 0.01, less than 0.005, less than 0.001, less than 0.0005, or less than 0.0001 pH units.

Accordingly, in some instances, e.g., when using imaging of all or a portion of a separation channel to identify the positions of pI markers in an isoelectric focusing reaction and determine a pI value for separated analytes, the accuracy with which the pI value may be determined may be less than ±0.1 pH unit, less than ±0.05 pH units, less than ±0.01 pH units, less than ±0.005 pH units, less than ±0.001 pH units, less than ±0.0005 pH units, or less than ±0.0001 pH units.

In some instances, the peak capacity achieved using the disclosed devices may range from about 100 to about 20,000. In some instances, the peak capacity may be at least 100, at least 200, at least 300, at least 400, at least 500, at least 600, at least 700, at least 800, at least 900, at least 1,000, at least 2,000, at least 3,000, at least 4,000, at least 5,000, at least 10,000, at least 15,000, or at least 20,000. In some instances, the peak capacity may be at most 20,000, at most 15,000, at most 10,000, a most 5,000, at most 4,000, at most 3,000, at most 2,000, at most 1,000, at most 900, at most 800, at most 700, at most 600, at most 500, at most 400, at most 300, at most 200, or at most 100. Any of the lower and upper values described in this paragraph may be combined to form a range included within the present disclosure, for example, in some instances the peak capacity may range from about 400 to about 2,000. Those of skill in the art will recognize that the peak capacity may have any value within this range, e.g., about 285.

Capillary isoelectric focusing (CIEF): In some embodiments, the separation technique may comprise isoelectric focusing (IEF), e.g., capillary isoelectric focusing (CIEF). Isoelectric focusing (or "electrofocusing") is a technique for separating molecules by differences in their isoelectric point (pI), i.e., the pH at which the molecules have a net zero charge. CIEF involves adding ampholyte (amphoteric electrolyte) solutions to a sample channel between reagent reservoirs containing an anode or a cathode to generate a pH gradient within a separation channel (i.e., the fluid channel connecting the electrode-containing wells, e.g., the lumen of a capillary or a channel in a microfluidic device) across which a separation voltage is applied. The ampholytes can be solution phase or immobilized on the surface of the channel wall. Negatively charged molecules migrate through the pH gradient in the medium toward the positive electrode while positively charged molecules move toward the negative electrode. A protein (or other molecule) that is in a pH region below its isoelectric point (pI) will be positively charged and so will migrate towards the cathode (i.e., the negatively charged electrode). The protein's overall net charge will decrease as it migrates through a gradient of increasing pH (due, for example, to protonation of carboxyl groups or other negatively charged functional groups) until it reaches the pH region that corresponds to its pI, at which point it has no net charge and so migration ceases. As a result, a mixture of proteins separates based on their relative content of acidic and basic residues and becomes focused into sharp stationary bands with each protein positioned at a point in the pH gradient corresponding to its pI. The technique is capable of extremely high resolution, with proteins differing by a single charge being fractionated into separate bands. In some embodiments, isoelectric focusing may be performed in a separation channel that has been permanently or dynamically coated, e.g., with a neutral and hydrophilic polymer coating, to eliminate electroosmotic flow (EOF). Examples of suitable coatings include, but are not limited to, amino modifiers, hydroxypropylcellulose (HPC) and polyvinylalcohol (PVA), Guarant® (Alcor Bioseparations), linear polyacrylamide, polyacrylamide, dimethyl acrylamide, polyvinylpyrrolidine (PVP), methylcellulose, hydroxyethylcellulose (HEC), hydroxyprpylmethylcellulose (HPMC), triethylamine, proylamine, morpholine, diethanolamine, triethanolamine, diaminopropane, ethylenediamine, chitosan, polyethyleneimine, cadaverine, putrescine, spermidine, diethylenetriamine, tetraethylenepentamine, cellulose, dextran, polyethylene oxide (PEO), cellulose acetate, amylopectin, ethylpyrrolidine methacrylate, dimethyl methacrylate, didodecyldimethylammonium bromide, Brij 35, sulfobetains, 1,2-dilauryloylsn-phosphatidylcholine, 1,4-didecyl-1,4-diazoniabicyclo[2,2,2]octane dibromide, agarose, poly(Nhydroxyethylacrylamide), pole-323, hyperbranched polyamino esters, pullalan, glycerol, adsorbed coatings, covalent coatings, dynamic coatings, etc. In some embodiments, isoelectric focusing may be performed (e.g., in uncoated separation channel) using additives such as methylcellulose, glycerol, urea, formamide, surfactants (e.g., Triton-X 100, CHAPS, digitonin) in the separation medium to significantly decrease the electroosmotic flow, allow better protein solubilization, and limit diffusion inside the capillary (e.g., in the lumen of the capillary) or fluid channel by increasing the viscosity of the electrolyte.

As noted above, the pH gradient used for capillary isoelectric focusing techniques is generated through the use of ampholytes, i.e., amphoteric molecules that contain both acidic and basic groups and that exist mostly as zwitterions within a certain range of pH. The portion of the electrolyte solution on the anode side of the separation channel is known as an "anolyte". That portion of the electrolyte solution on the cathode side of the separation channel is known as a "catholyte". A variety of electrolytes may be used in the disclosed methods and devices including, but not limited to, phosphoric acid, sodium hydroxide, ammonium hydroxide, glutamic acid, lysine, formic acid, dimethylamine, triethylamine, acetic acid, piperidine, diethylamine, and/or any combination thereof. The electrolytes may be used at any suitable concentration, such as 0.0001%, 0.001%, 0.01%, 0.1%, 1%, 10%, 20%, 30%, 40%, 50%, 60%, 70%, 80%, 90%, etc. The concentration of the electrolytes may be at least 0.0001%, 0.001%, 0.01%, 0.1%, 1%, 10%, 20%, 30%, 40%, 50%, 60%, 70%, 80%, 90%. The concentration of the electrolytes may be at most 90%, 80%, 70%, 60%, 50%, 40%, 30%, 20%, 10%, 1%, 0.1%, 0.01%, 0.001%, 0.0001%. A range of concentrations of the electrolytes may be used, e.g., 0.1%-2%. Ampholytes can be selected from any commercial or non-commercial carrier ampholytes mixtures (e.g., Servalyt pH 4-9 (Serva, Heildelberg, Germany), Beckman pH 3-10 (Beckman Instruments, Fullerton, Calif., USA), Ampholine 3.5-9.5 and Pharmalyte 3-10 (both from General Electric Healthcare, Orsay, France), AESlytes (AES), FLUKA ampholyte (Thomas Scientific, Swedesboro, N.J.), Biolyte (Bio-Rad, Hercules, Calif.)), and the like. Carrier ampholyte mixtures may comprise mixtures of small molecules (about 300-1,000 Da) containing multiple aliphatic amino and carboxylate groups that have closely spaced pI values and good buffering capacity. In the presence of an applied electric field, carrier ampholytes partition into smooth linear or non-linear pH gradients that increase progressively from the anode to the cathode.

Any of a variety of pI standards may be used in the disclosed methods and devices for calculating the isoelectric point for separated analyte peaks. For example, pI markers generally used in CLEF applications, e.g., protein pI markers and synthetic small molecule pI markers, may be used. In some instances, protein pI markers may be specific proteins with commonly accepted pI values. In some instances, the pI markers may be detectable, e.g., via imaging. A variety or combination of protein pI markers or synthetic small molecule pI markers that are commercially available, e.g., the small molecule pI markers available from Advanced Electrophoresis Solutions, Ltd. (Cambridge, Ontario, Canada), ProteinSimple, the peptide library designed by Shimura, and Slais dyes (Alcor Biosepartions), may be used.

Capillary zone electrophoresis (CZE): In some instances, the separation or enrichment technique may comprise capillary zone electrophoresis, a method for separation of charged analytes in solution in an applied electric field. The net velocity of charged analyte molecules is influenced both by the electroosmotic flow (EOF), $\mu EOF$, exhibited by the separation system and the electrophoretic mobility, $\mu EP$, for the individual analyte (dependent on the molecule's size, shape, and charge), such that analyte molecules exhibiting different size, shape, or charge exhibit differential migration velocities and separate into bands. In contrast to other capillary electrophoresis methods, CZE uses "simple" buffer, or background electrolyte, solutions for separation.

Capillary gel electrophoresis (CGE): In some instances, the separation or enrichment technique may comprise capillary gel electrophoresis, a method for separation and analysis of macromolecules (e.g., DNA, RNA and proteins) and their fragments based on their size and charge. The method comprises use of a gel-filled separation channel, where the gel acts as an anti-convective and/or sieving medium during electrophoretic movement of charged analyte molecules in an applied electric field. The gel functions to suppress thermal convection caused by application of the electric field, and also acts as a sieving medium that retards the passage of molecules, thereby resulting in a differential migration velocity for molecules of different size or charge.

Capillary isotachophoresis (CITP): In some instances, the separation technique may comprise capillary isotachophoresis, a method for separation of charged analytes that uses a discontinuous system of two electrolytes (known as the leading electrolyte and the terminating electrolyte) within a capillary or fluid channel of suitable dimensions. The leading electrolyte contains ions with the highest electrophoretic mobility, while the terminating electrolyte contains ion with the lowest electrophoretic mobility. The analyte mixture (i.e., the sample) to be separated is sandwiched between these two electrolytes, and application of an electric field results in partitioning of the charged analyte molecules within the capillary or fluid channel into closely contiguous zones in order of decreasing electrophoretic mobility. The zones move with constant velocity in the applied electric field such that a detector, e.g., a conductivity detector, photodetector, or imaging device, may be utilized record their passage along the separation channel. Unlike capillary zone electrophoresis, simultaneous determination or detection of anionic and cationic analytes is not feasible in a single analysis performed using capillary isotachophoresis.

Capillary electrokinetic chromatography (CEC): In some instances, the separation technique may comprise capillary electrokinetic chromatography, a method for separation of analyte mixtures based on a combination of liquid chromatographic and electrophoretic separation methods. CEC offers both the efficiency of capillary electrophoresis (CE) and the selectivity and sample capacity of packed capillary high-performance liquid chromatography (HPLC). Because the capillaries used in CEC are packed with HPLC packing materials, the wide variety of analyte selectivity's available in HPLC are also available in CEC. The high surface area of these packing materials enables CEC capillaries to accommodate relatively large amounts of sample, making detection of the subsequently eluted analytes a somewhat simpler task than it is in capillary zone electrophoresis (CZE).

Micellar electrokinetic chromatography (MEKC): In some instances, the separation technique may comprise capillary electrokinetic chromatography, a method for separation of analyte mixtures based on differential partitioning between surfactant micelles (a pseudo-stationary phase) and a surrounding aqueous buffer solution (a mobile phase). The basic set-up and detection methods used for MEKC are the same as those used in CZE. The difference is that the buffer solution contains a surfactant at a concentration that is greater than the critical micelle concentration (CMC), such that surfactant monomers are in equilibrium with micelles. MEKC is typically performed in open capillaries or fluid channels using alkaline conditions to generate a strong electroosmotic flow. Sodium dodecyl sulfate (SDS) is one example of a commonly used surfactant in MEKC applications. The anionic character of the sulfate groups of SDS cause the surfactant and micelles to have electrophoretic mobility that is counter to the direction of the strong electroosmotic flow. As a result, the surfactant monomers and micelles migrate quite slowly, though their net movement is still in the direction of the electroosmotic flow, i.e., toward the cathode. During MEKC separations, analytes distribute themselves between the hydrophobic interior of the micelle and hydrophilic buffer solution. Hydrophilic analytes that are insoluble in the micelle interior migrate at the electroosmotic flow velocity, $u_o$, and will be detected at the retention time of the buffer, $t_M$. Hydrophobic analytes that solubilize completely within the micelles migrate at the micelle velocity, $u_c$, and elute at the final elution time, $t_c$.

Flow counterbalanced capillary electrophoresis (FCCE): In some instances, the separation technique may comprise flow counterbalanced capillary electrophoresis, a method for increasing the efficiency and resolving power of capillary electrophoresis that utilizes a pressure-induced counter-flow to actively retard, halt, or reverse the electrokinetic migration of an analyte through a capillary. By retarding, halting, or moving the analytes back and forth across a detection window, the analytes of interest are effectively confined to the separation channel for much longer periods of time than under normal separation conditions, thereby increasing both the efficiency and the resolving power of the separation.

Chromatography: In some instances, the separation technique may comprise a chromatographic technique in which the analyte mixture in the sample fluid (the mobile phase) is passed through a column or channel-packing material (the stationary phase) which differentially retains the various constituents of the mixture, thereby causing them to travel at different speeds and separate. In some instances, a subsequent step of elution or mobilization may be required to displace analytes that have a high binding affinity for the stationary phase. Examples of chromatographic techniques the may be incorporated into the disclosed methods include, but are not limited to, ion exchange chromatography, size-exclusion chromatography, and reverse-phase chromatography.

Mobilization of separated analyte species: In some instances, provided herein are devices and systems configured to perform, e.g., a chromatographic separation technique such as reverse-phase chromatography. The method implemented by the device or system may further comprise elution of the analyte species retained on the stationary phase in each of a plurality of separation channels (e.g., by simultaneously or independently changing a buffer that flows through each a plurality of separation channels), which may be referred to as a "mobilization" step or reaction. In some instances, the method implemented by the device or system may further comprise simultaneously or independently applying pressure to each of a plurality of separation channels, or simultaneously or independently introducing an electrolyte into each of a plurality of separation channels to disrupt the pH gradient used for isoelectric focusing, and thus trigger migration of the separated analyte peaks out of the separation channels, which may also be referred to as a "mobilization" step. In some instances, the force used to drive the separation reactions (e.g., pressure for reverse-phase chromatography, or an electric field for electrokinetic separation or isoelectric focusing reactions) may be turned off during the mobilization step. In some instances, the force used to drive the separation reactions may be left on during the mobilization step. In some instances of the disclosed methods, e.g., those comprising an isoelectric focusing step, the separated analyte bands may be mobilized (e.g., using hydrodynamic pressure and/or a chemical mobilization technique) such that the separated analyte bands migrate towards an end of each of a plurality of separation channels that is connected to another fluid channel (which may be, e.g., an outlet, a waste reservoir, or a second separation channel). In some instances, e.g., in those instances where capillary gel electrophoresis, capillary zone electrophoresis, isotachophoresis, capillary electrokinetic chromatography, micellar electrokinetic chromatography, flow counterbalanced capillary electrophoresis, or any other separation technique that separates components of an analyte mixture by differential velocity is employed, the separation step itself may be viewed as a mobilization step.

In some instances, mobilization of the analyte bands may be implemented by simultaneously or independently applying hydrodynamic pressure to one end of each the plurality of separation channels. In some instances, mobilization of the analyte bands may be implemented by orienting the device such that the plurality of separation channels is in a vertical position so that gravity may be employed. In some instances, mobilization of the analyte bands may be implemented using EOF-assisted mobilization. In some instances, mobilization of the analyte bands may be implemented using chemical mobilization, e.g., by simultaneously or independently introducing a mobilization electrolyte into each of the plurality of separation channels that shifts the local pH in a pH gradient used for isoelectric focusing. In some instances, any combination of these mobilization techniques may be employed.

In one preferred instance, the mobilization step for isoelectrically-focused analyte bands comprises chemical mobilization. Compared with pressure-based mobilization, chemical mobilization has the advantage of exhibiting minimal band broadening by overcoming the hydrodynamic parabolic flow profile induced through the use of pressure. Chemical mobilization may be implemented by introducing an electrolyte (i.e., a "mobilization electrolyte") into the separation channel to alter the local pH and/or net charge on separated analyte bands (or zwitterionic buffer components) such that they (or the zwitterionic buffer components and associated hydration shells) migrate in an applied electric field. In some instances, the polarity of the applied electric field used to mobilize separated analyte bands may be such that analytes migrate towards an anode that is in electrical communication with the outlet or distal end of the separation channel (anodic mobilization). In some instances, the polarity of the applied electric field used to mobilize separated analyte bands may be such that analytes migrate towards a cathode that is in electrical communication with the outlet or distal end of the separation channel (cathodic mobilization). Mobilization electrolytes comprise either anions or cations that compete with hydroxyls (cathodic mobilization) or hydronium ions (anodic mobilization) for introduction into the separation channel or capillary. Examples of bases that may be used as catholytes for anodic mobilization include, but are not limited to, sodium hydroxide, ammonium hydroxide ("ammonia"), diethylamine, dimethyl amine, piperidine, etc. Examples of acids that may be used as anolytes in cathodic mobilization include, but are not limited to, phosphoric acid, acetic acid, formic acid, and carbonic acid, etc. In some instances, mobilization may be initiated by the addition of salts (e.g., sodium chloride) to the anolyte or catholyte. In some instances, an anode may be held at ground, and a negative voltage is applied to the cathode. In some instances, a cathode may be held at ground, and a positive voltage is applied to the anode. In some instances, a non-zero negative voltage may be applied to the cathode, and a non-zero positive voltage may be applied to the anode. In some instances, a non-zero positive voltage may be applied to both the anode and the cathode. In some instances, a non-zero negative voltage may be applied to both the anode and the cathode.

In some instances, mobilization of separated analyte bands may be initiated at a user-specified time point that triggers switchable electrodes (e.g., a cathode in electrical communication with the distal end of each of the plurality of separation channels, and a cathode in electrical communication with a proximal end of each of a plurality of mobilization channels (e.g., fluid channels that intersects the separation channels near the outlet or distal end of each separation channel)) between on and off states to control the electrophoretic introduction of a mobilization buffer or electrolyte into a separation channel.

In some instances, a user-specified time for independently triggering a transition of one, two, or three or more switchable electrodes between on and off states for each of the plurality of separation channels may range from about 30 seconds, to about 30 minutes for any of the mobilization schemes. In some instances, the user-specified time may be at least 30 second, at least 1 minute, at least 2 minutes, at least 3 minutes, at least 4 minutes, at least 5 minutes, at least 10 minutes, at least 15 minutes, at least 20 minutes, at least 25 minutes, or at least 30 minutes. In some instances, the user-specified time may be at most 30 minutes, at most 25 minutes, at most 20 minutes, at most 15 minutes, at most 10 minutes, at most 5 minutes, at most 4 minutes, at most 3 minutes, at most 2 minutes, at most 1 minute, or at most 30 seconds. Any of the lower and upper values described in this paragraph may be combined to form a range included within the present disclosure, for example, in some instances the user-specified time may range from about 2 minutes to about 25 minutes. Those of skill in the art will recognize that the user-specified time may have any value within this range, e.g., about 8.5 minutes.

In some instances, the electric field used to effect mobilization in any of the mobilization scenarios disclosed herein (or to perform electrokinetic separation or isoelectric focusing reactions in those instances where such separation techniques are performed) may range from about 0 V/cm to about 1,000 V/cm. In some instances, the electric field strength may be at least 0 V/cm, at least 20 V/cm, at least 40 V/cm, at least 60 V/cm, at least 80 V/cm, at least 100 V/cm, at least 150 V/cm, at least 200 V/cm, at least 250 V/cm, at least 300 V/cm, at least 350 V/cm, at least 400 V/cm, at least 450 V/cm, at least 500 V/cm, at least 600 V/cm, at least 700 V/cm, at least 800 V/cm, at least 900 V/cm, or at least 1,000 V/cm. In some instances, the electric field strength may be at most 1,000 V/cm, at most 900 V/cm, at most 800 V/cm, at most 700 V/cm, at most 600 V/cm, at most 500 V/cm, at most 450 V/cm, at most 400 V/cm, at most 350 V/cm, at most 300 V/cm, at most 250 V/cm, at most 200 V/cm, at most 150 V/cm, at most 100 V/cm, at most 80 V/cm, at most 60 V/cm, at most 40 V/cm, at most 20 V/cm, or at most 0 V/cm. Any of the lower and upper values described in this paragraph may be combined to form a range included within the present disclosure, for example, in some instances the electric field strength time may range from about 40 V/cm to about 650 V/cm. Those of skill in the art will recognize that the electric field strength may have any value within this range, e.g., about 575 V/cm.

In some instances, mobilization of separated analyte bands may be initiated based on data derived from independently monitoring the current (or conductivity) for each of the plurality of separation channels where, for example, in the case of isoelectric focusing the current passing through a separation channel may reach a minimum value. In some instances, the detection of a minimum current value, or a current value that remains constant or below a specified threshold for a specified period of time, may be used to determine if an isoelectric focusing reaction has reached completion and may thus be used to trigger the initiation of a chemical mobilization step.

In some instances, the minimum current value or threshold current value may range from about 0 µA to about 100 µA. In some instances, the minimum current value or threshold current value may be at least 0 µA, at least 1 µA, at least 2 µA, at least 3 µA, at least 4 µA, at least 5 µA, at least 10 µA, at least 20 µA, at least 30 µA, at least 40 µA, at least 50 µA, at least 60 µA, at least 70 µA, at least 80 µA, at least 90 µA, or at least 100 µA. In some instances, the minimum current value or threshold current value may be at most 100 µA, at most 90 µA, at most 80 µA, at most 70 µA, at most 60 µA, at most 50 µA, at most 40 µA, at most 30 µA, at most 20 µA, at most 10 µA, at most 5 µA, at most 4 µA, at most 3 µA, at most 2 µA, at most 1 µA, or at most 0 µA. Any of the lower and upper values described in this paragraph may be combined to form a range included within the present disclosure, for example, in some instances the minimum current value or threshold current value may range from about 10 µA to about 90 µA. Those of skill in the art will recognize that the minimum current value or threshold current value may have any value within this range, e.g., about 16 µA.

In some instances, the specified period of time may be at least 5 seconds, at least 10 seconds, at least 15 seconds, at least 20 seconds, at least 25 seconds, at least 30 seconds, at least 35 seconds, at least 40 seconds, at least 45 seconds, at least 50 seconds, at least 55 seconds, or at least 60 seconds. In some instances, the specified period of time may be at most about 60 seconds, at most about 55 seconds, at most about 50 seconds, at most about 45 seconds, at most about 40 seconds, at most about 35 seconds, at most about 30 seconds, at most about 25 seconds, at most about 20 seconds, at most about 15 seconds, at most about 10 seconds, or at most about 5 seconds. Amy of the lower and upper values described herein may be combined to form a range included within the present disclosure, in some instances the specified period of time may range from about 5 seconds to about 30 seconds. Those of skill in the art will recognize that the specified period of time may have any value within this range, e.g., about 32 seconds.

In some instances, mobilization of separated analyte bands may be initiated based on data derived from images (e.g., by performing automated image processing) of the plurality of separation channels as separation reactions are performed. The image-derived data may be used to monitor the presence or absence of one or more analyte peaks, the positions of one or more analyte peaks, the widths of one or more analyte peaks, the velocities of one or more analyte peaks, separation resolution, a rate of change or lack thereof in the presence, position, width, or velocity of one or more analyte peaks, or any combination thereof, and may be used to determine whether a separation reaction is complete and/or to trigger the initiation of a mobilization step in a given separation channel. In some cases, completion of a separation step may be determined by monitoring the rate of change of a separation performance parameter (e.g., peak position or peak width) over a period of time (e.g., over a period of 10 to 60 seconds).

In one preferred aspect of the disclosed methods, a chemical mobilization step may be initiated within a microfluidic device designed to integrate CIEF with ESI-MS by changing an electric field within the device to electrophorese a mobilization electrolyte into the separation channel. In some instances, the initiation of the mobilization step may be triggered based on data derived from images of all or a portion of the separation channel. In some instances, the change in electric field may be implemented by connecting or disconnecting one or more electrodes attached to one or more power supplies, wherein the one or more electrodes are positioned in reagent wells on the device or integrated with fluid channels of the device. In some instances, the connecting or disconnecting of one or more electrodes may be controlled using a computer-implemented method and programmable switches, such that the timing and duration of the mobilization step may be coordinated with the separation step. In some instances, changing an electric field within the device may be used to electrophoretically or electro-osmotically flow a mobilization buffer into a separation channel comprising a stationary phase such that retained analytes are released from the stationary phase.

In some instances, three or more electrodes for each separation channel may be connected to or integrated into the device. For example, a first electrode may be coupled electrically to a proximal end of the separation channel. Similarly, a second electrode may then be coupled to the distal end of the separation channel, and a third electrode may be coupled with a mobilization channel that intersects with the separation channel, e.g., at a distal end of the separation channel, and that connects to or comprises a reservoir containing mobilization buffers. Upon completion of the separation step, as determined by image-based methods, the electric coupling of the second or third electrodes with their respective channels may be switchable between "on" and "off" states. In one such an example, the second electrode that forms the anode or cathode of the separation circuit may switch to an "off" mode, and the third electrode, which may be off during the separation, may switch to an "on" mode, to initiate introduction of mobilization buffer into the channel (e.g., via electrophoresis). In some instances, "on" and "off" states may comprise complete connection or disconnection of the electrical coupling between an electrode and a fluid channel respectively. In some instances, "on" and "off" states may comprise clamping the current passing through a specified electrode to non-zero or zero microamperes respectively.

In some instances, triggering or initiation of a mobilization step may comprise detecting no change or a change of less than a specified threshold for one or more image-derived separation parameters as described above. For example, in some instances a change of less than 20%, 15%, 10%, or 5% in one or more image-derived parameters (e.g., peak position, peak width, peak velocity, etc.) may be used to trigger the mobilization step.

In some instances, triggering or initiation of a mobilization step may comprise detecting no change or a rate of change of less than a specified threshold for one or more image-derived separation parameters as described above. For example, in some instances a change of less than 20%, 15%, 10%, or 5% in one or more image-derived parameters (e.g., peak position, peak width, peak velocity, etc.) over a time period of at least 10 seconds, 15 seconds, 20 seconds, 25 seconds, 30 seconds, 35 seconds, 40 seconds, 45 seconds, 50 seconds, 55 seconds, or 60 seconds (or any combination of these percentage changes and time periods) may be used to trigger the mobilization step.

In some instances, a calibrant may be used during the mobilization step to correlate and/or calibrate information from the mass spectrometer. In some instances, the calibrant may comprise a peptide, a polypeptide, a protein, or other molecule (either natural or synthetic) with a known mass. In some instances, the calibrant will be mixed with the mobilizer solution. The calibrant may be used to calibrate the mass spectrometer. In some instances, the calibrant may be used to correlate information from the mass spectrometer to the mobilization process or the separation process. For example, the calibrant may be monitored during the separation (e.g., isoelectric focusing) or mobilization.

Altering high and low separation/mobilization voltage to keep ESI tip voltage constant: In some embodiments, the ESI ion source on the mass spectrometer will have an adjustable power supply capable of setting a negative voltage on the mass spectrometer. In some embodiments, the ESI ion source on the mass spectrometer will have an adjustable power supply capable of setting a positive voltage on the mass spectrometer. In some embodiments, the ESI ion source on the mass spectrometer will be held at ground. In some embodiments, the ESI tip on the capillary or microfluidic device will be held at or close to ground to generate an electric field between the ESI tip and the charged ESI ion source on the mass spectrometer. In some embodiments, the ESI tip on the capillary or microfluidic device will be held at a positive or negative voltage to generate an electric field between the ESI tip and the grounded ESI ion source on the mass spectrometer.

Figure 36:
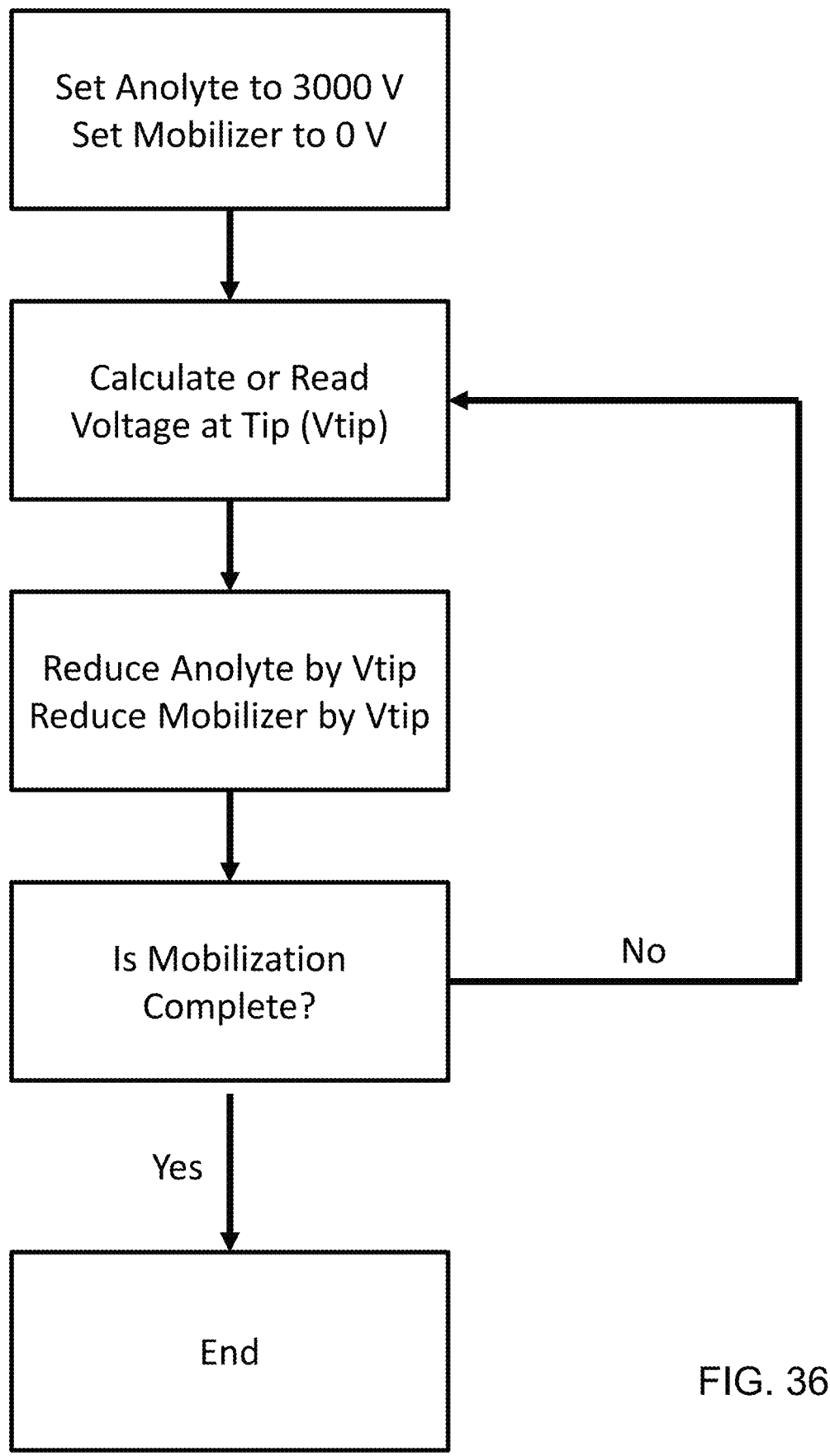
FIG. 36 provides an exemplary flowchart of a computer-controlled voltage feedback loop where the ESI tip is held at 0V.

FIG. 36 provides an exemplary flowchart of a computer-controlled feedback loop to maintain a constant voltage drop of 3000V between the anode and cathode while keeping the ESI tip voltage at 0V during mobilization. In some embodiments, this feedback loop may be implemented when the mass spectrometer ESI ion source is set at a positive or negative voltage relative to ground (for example, −3500V). In this example, ΔV between anolyte port 108 and mobilizer port 104 is kept at 3000V by initially setting anolyte port 108 at +3000V and mobilizer port 104 at 0V in FIG. 1B. In some embodiments, a different ΔV may be set by setting anolyte port 108 to a different value. In some embodiments, anodic mobilization may be used, and port 108 would be a catholyte port, set to, for example, −3000V. In the example outlined in FIG. 36, during mobilization, the resistance in separation channel 112 is dropping due to analyte and ampholytes in the separation regaining charge. This causes the voltage drop across channel 112 to drop, leading to an increase in voltage at ESI tip 116, according to equation 1:

$$V_{116}=(\Delta V_{108\text{-}104})*(R_{105})/(R_{109}+R_{112}+R_{105})$$

However, by measuring or calculating ESI tip voltage 116, the voltage settings at anolyte port 108 and mobilizer port 104 can be adjusted. By subtracting ESI tip voltage 116 from both anolyte port 108 and mobilizer port 104 settings, $\Delta V_{110\text{-}104}$ remains 3000V so the mobilization is unaffected, but ESI tip 116 voltage is set to 0 according to equation 2:

$$V_{116}=(\Delta V_{108\text{-}104})*(R_{105})/(R_{109}+R_{112}+R_{105})+V_{104}$$

This feedback loop continues to operate until the mobilization is complete, adjusting ESI tip 116 voltage to 0 at a regular frequency, e.g., the Nyquist rate, or about 0.2 Hz. In some instances, the voltage at ESI tip 116 may be adjusted to 0 at a rate of at least 0.01 Hz, 0.1 Hz, 0.2 Hz, 0.3 Hz, 0.4 Hz, 0.5 Hz, 0.6 Hz, 0.7 Hz, 0.8 Hz, 0.9 Hz, 1 Hz, 10 Hz, 100 Hz, or 1,000 Hz. Maintaining a constant stable voltage at ESI tip 116 can be critical to maintaining stable electrospray during the mobilization process.

In some instances, the feedback loop operates to maintain the voltage at the ESI tip to within a specified percentage of a pre-set value. For example, in some instances, the feedback loop operates to maintain the voltage at the ESI tip to within 10%, 9%, 8%, 7%, 6%, 5%, 4%, 3%, 2%, 1%, 0.5%, or 0.1% of a pre-set value.

Figure 37:
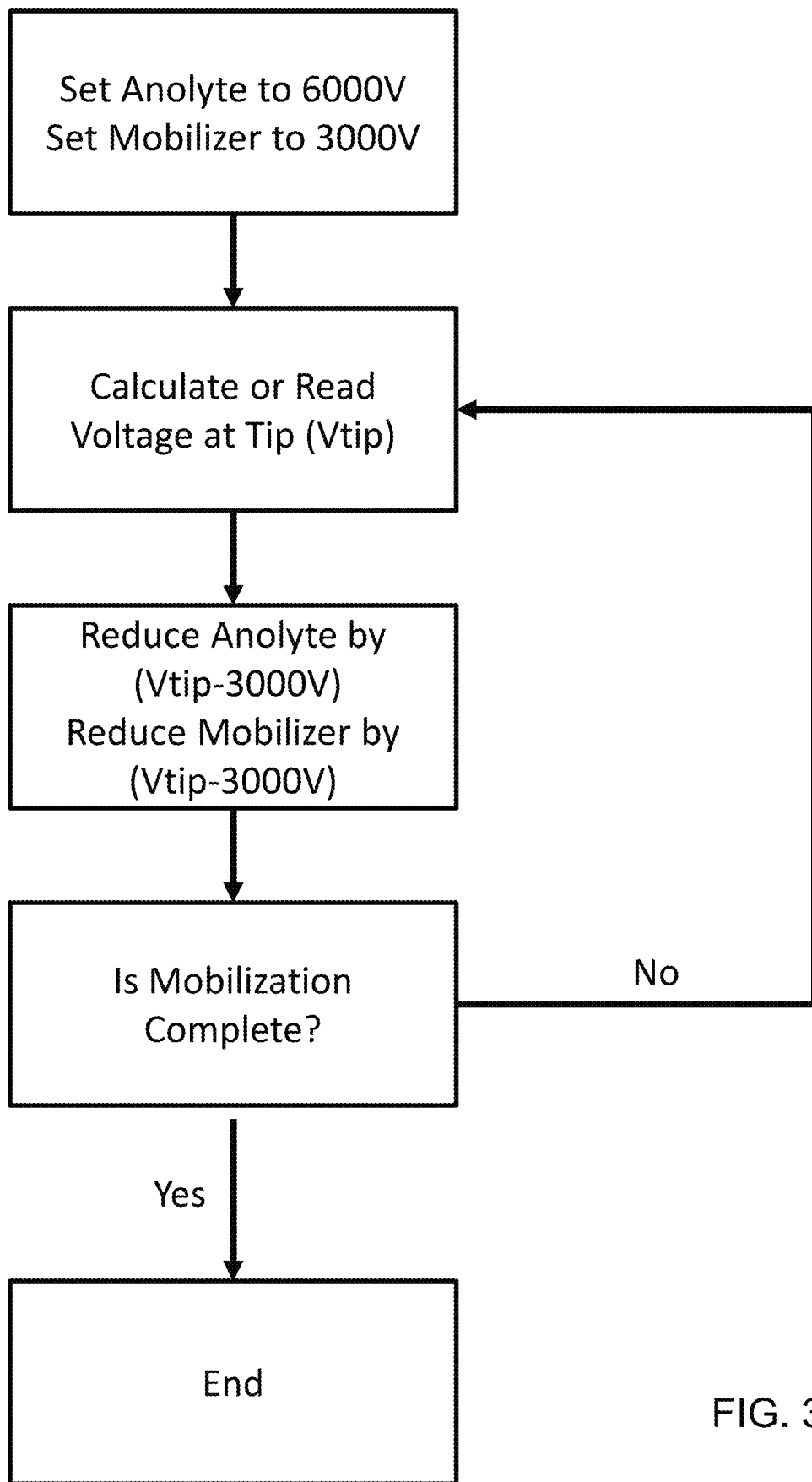
FIG. 37 provides an example flowchart of voltage feedback loop where the ESI tip is held at +3000V.

In some embodiments, the mass spectrometer ESI ion source is held at ground, and ESI tip 116 will need to be kept at a constant positive or negative voltage in order to create an electric field between ESI tip 116 and the mass spectrometer. In some embodiments, ESI tip voltage (e.g., the pre-set value) may be around +5000V, around +4000V, around +3500V, around +3000V, around +2500V, around +2000V, around +1500V around +1000V, around +500V, or around −5000V, around −4000V, around −3500V, around −3000V, around −2500V, around −2000V, around −1500V, around −1000V, or around −500V. FIG. 37 provides an example flowchart of a computer-controlled feedback loop to maintain a constant voltage drop of 3000V between the anode and cathode while keeping the ESI tip voltage potential at 3000V during mobilization. Operation of the computer-controlled feedback loop is the same as in FIG. 36, except voltages at anolyte port 108 and mobilizer port 104 are offset by +3000V, which offsets the voltage at ESI tip 116 to +3000V, still obeying equation 2. In some embodiments control of the electric field strength can be accomplished using analog circuitry. In some embodiments, the control of voltages at one or more electrodes in contact with the capillary-based or microfluidic device-based separation system may be provided by using one, two, three, or four or more independent high-voltage power supplies. In some instance, the control of voltages at one or more electrodes in contact with the capillary-based or microfluidic device-based separation system may be provided, e.g., by using a single, multiplexed high-voltage power supply.

In some instances, the feedback loop operates to maintain the electric field strength within the separation channel, or the voltage drop between the anode and cathode, to within a specified percentage of a pre-set value. For example, in some instances, the feedback loop operates to maintain the electric field strength within the separation channel, or the voltage drop between the anode and cathode, to within 10%, 9%, 8%, 7%, 6%, 5%, 4%, 3%, 2%, 1%, 0.5%, 0.1%, or 0.01% of a pre-set value. In some instances, the feedback loop operates to maintain the ESI tip voltage to within 1000V, 500V, 100V, 75V, 50V, 25V, 10V, 5V, or 1V of a pre-set value.

In some embodiments, an alternating current (AC) signal generator such as a lock-in amplifier, function generator, oscillator, or other AC signal generator may be electrically coupled to a pair of electrodes. In some embodiments, the AC signal generator may be a SR8-30 (Stanford Research Systems) lock-in amplifier. In some embodiments, a plurality of AC signal generators may be electrically coupled to multiple pairs of electrodes. In some embodiments, the AC signal generator may be configured to superimpose an AC voltage on a DC voltage set between two electrodes. In some embodiments, the AC current created by the AC signal generator may be measured. In some embodiments, the AC current created by the AC signal generator may be used to calculate the resistance in a microfluidic channel. In some embodiments, the resistance of the microfluidic channel may be changing over time. In some embodiments, the resistance of the microfluidic channel may be changing over time due to isoelectric focusing. In some embodiments, the resistance of the microfluidic channel may be changing over time due to chemical mobilization. In some embodiments, the resistance of the microfluidic channel may be changing over time due to introduction of new reagent into a channel network between a pair of electrodes. In some embodiments, the AC signal generator may be connected to an electrode in electrical communication with a distal end of a separation channel and an electrode in electrical communication with a proximal end of the same separation channel. In some embodiments, a change in resistance in a microfluidic channel may be measured. In some embodiments, a measured change in resistance in a microfluidic channel may be used to maintain a constant voltage potential within the fluidic network. In some embodiments, the frequency of the AC signal generated may be at least 0.05 Hz, at least 0.1 Hz, at least 0.5 Hz, at least 1 Hz, at least 5 Hz, at least 10 Hz, at least 50 Hz, at least 100 Hz, at least 500 Hz, at least 1000 Hz, at least 5 kHz, at least 10 kHz, at least 50 kHz or at least 100 kHz. In some embodiments, the frequency of the lock-in amplifier AC voltage may be at most 0.05 Hz, at most 0.1 Hz, at most 0.5 Hz, at most 1 Hz, at most 5 Hz, at most 10 Hz, at most 50 Hz, at most 100 Hz, at most 500 Hz, at most 1 kHz, at most 5 kHz, at most 10 kHz, at most 50 kHz or at most 100 kHz.

In some embodiments, the voltage of the AC signal generated may be at least 0.1V, at least 0.5V, at least 1V, at least 5V, at least 10V, at least 20V, at least 50V, at least 100V, at least 500V, at least 1000V, at least 5 kV or at least 10 kV. In some embodiments, the voltage of the lock-in amplifier signal may be at most 0.1V, at most 0.5V, at most 1V, at most 5V, at most 10V, at most 50V, at most 100V, at most 500V at most 1000V, at most 5 kV or at most 10 kV.

Imaging of separation channels: In some instances, the disclosed devices and systems may be configured to perform imaging of all or a portion of at least one separation channel to monitor a separation and/or mobilization reaction while it is performed. In some instances, the disclosed devices and systems may be configured to perform imaging of all or a portion of a plurality of separation channels to monitor a plurality of separation and/or mobilization reactions in parallel while they are performed. In some instances, separation and/or mobilization reactions may be imaged using any of a variety of imaging techniques known to those of skill in the art. Examples include, but are not limited to, ultraviolet (UV) light absorbance, visible light absorbance, fluorescence (e.g., native fluorescence or fluorescence resulting from having labeled one or more analytes with fluorophores), Fourier transform infrared spectroscopy, Fourier transform near infrared spectroscopy, Raman spectroscopy, optical spectroscopy, and the like. In some instances the plurality of separation (or enrichment) channels may be the lumens of a plurality of capillaries. In some instances, the plurality of separation (or enrichment) channels may be a plurality of fluid channels within a microfluidic device. In some instances, all or a portion of a separation (or enrichment) channel, a junction or connecting channel that connects an end of the separation channel and a downstream analytical instrument or an electrospray orifice or tip, the electrospray orifice or tip itself, or any combination thereof may be imaged. In some instances, the separation (or enrichment) channel may be the lumen of a capillary. In some instances, the separation (or enrichment) channel may be a fluid channel within a microfluidic device.

The wavelength range(s) used for imaging and detection of separated analyte bands will typically depend on the choice of imaging technique and the material(s) out of which the device or portion thereof are fabricated. For example, in the case that UV light absorbance is used for imaging all or a portion of the separation channel or other part of the microfluidic device, detection at about 220 nm (due to a native absorbance of peptide bonds) and/or at about 280 nm (due to a native absorbance of aromatic amino acid residues) may allow one to visualize protein bands during separation and/or mobilization provided that at least a portion of the device, e.g., the separation channel or a portion thereof, is transparent to light at these wavelengths. In some instances, the analytes to be separated may be labeled prior to separation with, e.g., a fluorophore, chromophore, chemiluminescent tag, or other suitable label, such that they may be imaged using fluorescence imaging, UV absorbance imaging, or other suitable imaging techniques. In some instances, e.g., wherein the analytes comprise proteins produced by a commercial manufacturing process, the proteins may be genetically-engineered to incorporate a green fluorescence protein (GFP) domain or variant thereof, so that they may be imaged using fluorescence. In some instances, labeling proteins or other analyte molecules may be performed using an approach to ensure that the label itself doesn't interfere with or perturb the analyte property on which the chosen separation technique is based.

In some instances, imaging (or data derived therefrom) may be used to trigger, e.g., a mobilization step or other transfer of separated analyte fractions or portions thereof from a first plurality of separation channels to another plurality of separation channels, or from a first plurality of separation channels to a plurality of channels that are in fluid communication with the outlet ends of the first plurality of separation channels. For example, in some instances the disclosed methods may comprise injecting analyte mixtures into a microfluidic device containing a first plurality of separation channels and a second plurality of separation channels. The first plurality of separation channels may contain a medium configured to bind an analyte from the sample analyte mixture. Accordingly, when the sample analyte mixtures are loaded or injected into the device, e.g., a microfluidic device, at least a fraction of the analyte in each sample analyte mixture may be bound to the matrix and/or impeded from flowing through the first plurality of separation channels. For example, injecting the analyte mixtures into the microfluidic device can effect a chromatographic separation in the first plurality of separation channels. An eluent can then be injected into the microfluidic device such that at least a fraction of the analyte, if present, is mobilized from the media in each separation channel. In some instances, the first plurality of separation channels may be imaged while the analyte is mobilized. In some instances, imaging of the first plurality of separation reactions may comprise whole column (e.g., whole channel) imaging and/or imaging a portion of the separation channels. In some instances, an electric field may be applied to the second plurality of separation channels when the imaging detects that an analyte fraction is disposed at intersections of the first plurality of separation channels and the second plurality of separation channels such that the analyte fractions are electro-kinetically injected into the second plurality of separation channels. For example, in some instances, the first plurality of separation channels and the second plurality of separation channels may form a series of T-junctions. In some instances, imaging may be used to detect when an analyte fraction (e.g., a fraction of interest) is at one or more of the series of T-junctions. Applying the electric field can electro-kinetically inject the analyte fraction of interest (and, optionally, not other analyte fractions that are not located at the series of T-junctions) into the second plurality of separation channel for a second stage of separation. In some instances, the electric field may be applied independently to one or more of the second plurality of separation channels depending on whether or not an analyte fraction of interest is detected at one or more of the T-junctions.

In some instances, imaging may be performed during mobilization to monitor the mobilization reaction. In some instances, the imaging system used to monitor the separation reaction may also be used to monitor the mobilization reaction. In some instances, only a portion of the channel or plurality of channels may be imaged to monitor the mobilization reaction. In some instances, the entire channel or plurality of channels may be imaged, and only a portion of the imaged channel or plurality of channels may be used to monitor the mobilization reaction. For example, the channels may be imaged at a given sampling rate, and for each image generated, the portion of the image corresponding to the distal end of the channel or channels may be used to generate a mobility chromatogram. The mobility chromatogram may provide information on, for example, the average absorbance of a certain pixel width (e.g., 8 pixels) as a function of time. In some instances, the pixel width of the image used to generate the mobility chromatogram (e.g., corresponding to the distal end of the channel) may comprise at least 1 pixel, at least 2 pixels, at least 3 pixels, at least 4 pixels, at least 5 pixels, at least 6 pixels, at least 7 pixels, at least 8 pixels, at least 9 pixels, at least 10 pixels, at least 15 pixels, at least 20 pixels, at least 25 pixels, at least 30 pixels, at least 35 pixels, at least 40 pixels, at least 50 pixels, at least 60 pixels, at least 70 pixels, at least 80 pixels, at least 90 pixels, at least 100 pixels.

The mobility chromatogram may be used to determine a parameter of the mobilization reaction. For example, the mobility chromatogram may be used to calibrate the mass spectrometer, to determine the time-of-flight information, peak width, peak velocity, peak mobility, peak position, etc. of one or more analytes. In some instances, the mobility chromatogram may be generated in real-time. In some instances, the mobility chromatogram may be generated at a sampling rate (e.g., Nyquist sampling rate, 1-2 Hz, or a frequency that matches the sampling rate of the mass spectrometer). In some instances, the chromatogram may be used to yield information on the absorbance of a segment of the channel as a function of time.

Dynamic light scattering: In some instances, the systems and methods of the present disclosure comprise one or more detection methods comprising dynamic light scattering (DLS). In some instances, DLS may be used to provide information of the analytes, e.g., determine the size distribution profile of the separated analytes, the aggregation of the analytes, the hydrodynamic radius of the analytes, etc. in at least one separation channel. DLS may be performed prior to, during, or following the separation of the analytes. DLS may be used in conjunction with one or more of the methods described herein, e.g., for interlaced detection of sample separation, mobilization, and/or analyte size profile. For example, DLS may be used in addition to imaging of the channel or channels during one or more processes described herein (e.g. separation, mobilization, ejection).

System and system components: In some instances, the systems of the present disclosure may comprise one or more of the disclosed devices (e.g., microfluidic devices), one, two, three, four, or more high voltage power supplies (or a single, multiplexed high voltage power supply that allows independent control of two or more channels), an autosampler and/or fluid handling system, a fluid flow controller, an imaging module, a dynamic light scattering module, a microplate-handling robotics module, a waste management module (e.g., to remove or prevent accumulation of fluid droplets from accumulating on the exterior of an electrospray tip), an electrode interfacing unit, a processor or computer, or any combination thereof.

High voltage power supplies: In some instances, the two or more high voltage power supplies of the disclosed systems (or a single, multiplexed high voltage power supply that allows independent control of two or more channels) are configured to provide simultaneous, independent electrical control of a plurality of separation channels, e.g., to simultaneously and independently apply a specified voltage or current to each of a plurality of separation channels or auxiliary fluid channels (e.g., mobilization channels used to deliver a chemical mobilization agent to a separation channel following completion of an isoelectric focusing reaction). In some instances, the two or more high voltage power supplies of the disclosed systems (or a single, multiplexed high voltage power supply that allows independent control of two or more channels) are configured to monitor and/or record the current flowing through each separation channel of a plurality of separation channels (not just the total current). As described herein, the separation channels may comprise different samples or the same sample (e.g., aliquots of a sample). In some instances, the current flowing through each separation channel may be used, for example, to determine when an isoelectric focusing reaction is complete and/or to detect a failure (e.g., introduction or formation of a bubble in a separation channel).

In some instances, the system may comprise two independent high voltage power supplies, three independent high voltage power supplies, four independent high voltage power supplies, five independent high voltage power supplies, six independent high voltage power supplies, seven independent high voltage power supplies, eight independent high voltage power supplies, nine independent high voltage power supplies, ten independent high voltage power supplies, eleven independent high voltage power supplies, twelve independent high voltage power supplies, thirteen independent high voltage power supplies, fourteen independent high voltage power supplies, fifteen independent high voltage power supplies, sixteen independent high voltage power supplies, seventeen independent high voltage power supplies, eighteen independent high voltage power supplies, nineteen independent high voltage power supplies, or twenty independent high voltage power supplies. In some instances, the two or more high voltage power supplies may be integrated or packaged as a single multiplexed high voltage power supply that provides for simultaneous and independent control of voltage and/or current for each of a plurality of separation channels or auxiliary fluid channels (e.g., mobilization channels used to deliver a chemical mobilization agent to a separation channel following completion of an isoelectric focusing reaction).

In some instances, the two or more high voltage power supplies of the disclosed systems are programmable, e.g., they may comprise an internal microprocessor and/or memory that allow the voltage and/or current applied to each of a plurality of separation channels or auxiliary channels to be controlled by software downloaded to the high voltage power supplies. In some instances, the two or more high voltage power supplies of the disclosed systems may be configured for control by an external processor or computer.

In some instances, the two or more high voltage power supplies may be programmed or otherwise configured to run in constant voltage mode, e.g., where the voltage applied across each of a plurality of separation channels and/or auxiliary channels is held fixed for the duration of a separation reaction or for a specified period of time. In some instances, the two or more high voltage power supplies may be programmed or otherwise configured to make stepwise changes in the voltage applied across each of a plurality of separation channels and/or auxiliary channels from a first specified voltage to at least a second specified voltage at one or more specified times. In some instances, the two or more high voltage power supplies may be programmed or otherwise configured to make two, three, four, five, or more than five stepwise changes in voltage over the course of a separation reaction.

In some instances, the two or more high voltage power supplies may be programmed or otherwise configured to run in constant power mode, e.g., to raise the voltage applied to a given separation channel as the current drops during a separation reaction due to conductivity changes, thereby allowing one to increase the voltage to minimize separation time without inducing excess Joule heating.

As noted above, in some instances the electric field used to perform electrophoretic separation or isoelectric focusing reactions (or other electrokinetic injection or separation processes) may range from about 0 V/cm to about 1,000 V/cm. Accordingly, in some instances, the two or more high voltage power supplies of the disclosed systems may be configured to provide an adjustable voltage ranging from about 0 volts to about 5,000 volts (e.g., for a 5 cm long separation channel). In some instances, the two or more high voltage power supplies may be configured to provide an adjustable voltage of at least 0, at least 5, at least 10, at least 50, at least 100, at least 500, at least 1,000, or at least 5,000 volts. In some instances, the two or more high voltage power supplies may be configured to provide an adjustable voltage of at most 5,000, at most 1,000, at most 500, at most 100, at most 50, at most 10, or at most 5 volts. Any of the lower and upper values described in this paragraph may be combined to form a range included within the present disclosure, for example, in some instances the two or more high voltage power supplies may be configured to provide an adjustable voltage ranging from about 100 volts to about 1,000 volts. Those of skill in the art will recognize that the two or more high voltage power supplies may be configured to provide an adjustable voltage of any value within this range, e.g., about 1,250 volts.

Electrode interfacing unit/fixture: In some instances, the disclosed systems may comprise one or more fixtures, which may include electrode interfacing units (e.g., high voltage electrode interface units or fixtures) that are configured to interface the one or more electrodes with one or more components of the system (e.g., one or more inlets of the microfluidic device). As described herein, the disclosed microfluidic devices may comprise two or more integrated electrodes configured to apply a voltage gradient along a separation channel or interconnecting channel that intersects a separation channel. The electrodes may be integrated with or configured to interface with a plurality of inlet ports, outlet ports, sample and/or reagent introduction channels, interconnecting channels, sample and/or reagent waste channels, reservoirs (e.g., sample reservoirs, reagent reservoirs, or waste reservoirs), micropumps, microvalves, vents, traps, filters, membranes, and the like, or any combination thereof. In some instances, the fixture may comprise one or more membranes that allow for electrical and/or fluidic communication of the electrode and the microfluidic device. In some cases, the membrane may be in fluid and/or electrical communication with one or more reservoirs (e.g., the anolyte reservoir or catholyte reservoir) and/or the microfluidic device. In some instances, the membrane may be coupled to the microfluidic device. In some instances, the membrane may be used to prevent the introduction of bubbles to the microfluidic device (e.g., channels or inlets) when establishing fluidic communication of the device with the one or more reservoirs. Alternatively, or additionally, the membrane may be used to prevent further introduction of bubbles, e.g., bubbles formed by electrolysis at the electrodes, into the microfluidic device. In some instances, the volume of an electrode reservoir (e.g., any reservoir with which an electrode makes electrical contact) within the fixture may be sufficiently large to minimize or eliminate pH changes in the buffer contained therein due to electrolysis at the electrode. In some instances, the geometry of the fixtures may be configured to position the membrane to establish fluidic and/or electrical communication with the microfluidic device. The membrane and/or electrode reservoir may be positioned adjacent (e.g., on, next to, coupled to, orthogonal to, etc.) to the microfluidic device. In some cases, the membrane may be coupled to the microfluidic device (e.g., via a fitting mechanism). In some instances, the geometries of the fixture may be employed to prevent bending, folding, or nonplanar movement or configurations of the membrane, e.g., to prevent the formation of bubbles or application of hydrodynamic pressure upon interfacing of the membrane with the device. For example, the fixture may comprise an insert, e.g., U-shaped structure, where the membrane may be placed at the bottom (e.g., flat portion) of the U-shaped structure. In such an example, the U-shaped structure may be coupled to the reservoir (e.g., an electrode reservoir, which can interface with the electrodes) and allow fluid communication with the membrane and the microfluidic device. The arms of the U-shaped structure may comprise an inlet fluid path and an outlet fluid path. In another example, the fixture may comprise an insert, e.g., a Y-shaped structure, where the membrane may be placed at the top of the Y-shaped structure. In such an example, the Y-shaped structure may comprise the reservoir (e.g., electrode reservoir) and allow fluid communication with the membrane and the microfluidic device.

In some instances, the membranes interface with the device via the outlet fluid path and a port (e.g., the flat portion of the U-shaped structure). At least one dimension of the port may take on a variety of geometries and be configured to prevent bending, folding, etc. of the membrane. For example, the port may be circular and may have a diameter of at most about 5 mm, at most about 4 mm, at most about 3 mm, at most about 2 mm, at most about 1 mm, or at most about 500 µm. The membrane may cover all or a portion of the port and may comprise any useful dimension; for instance, the membrane may have a cross-sectional area that is about 0.001 square millimeters (mm$^2$), about 0.005 mm$^2$, about 0.01 mm$^2$, about 0.05 mm$^2$, about 0.1 mm$^2$, about 0.5 mm$^2$, about 1 mm$^2$, about 5 mm$^2$, about 10 mm$^2$, about 50 mm$^2$, about 100 mm$^2$, or about 500 mm$^2$. The membrane may comprise a cross-sectional area that is at least 0.001 (mm$^2$), at least 0.005 mm$^2$, at least 0.01 mm$^2$, at least 0.05 mm$^2$, at least 0.1 mm$^2$, at least 0.5 mm$^2$, at least 1 mm$^2$, at least 5 mm$^2$, at least 10 mm$^2$, at least 50 mm$^2$, at least 100 mm$^2$, or at least 500 mm$^2$. In some instances, the membrane may comprise a cross-sectional area that is at most 500 mm$^2$, at most 100 mm$^2$, at most 50 mm$^2$, at most 10 mm$^2$, at most 5 mm$^2$, at most 1 mm$^2$, at most 0.5 mm$^2$, at most 0.1 mm$^2$, at most 0.05 mm$^2$, at most 0.01 mm$^2$, at most 0.005 mm$^2$, or at most 0.001 mm$^2$. The membrane may comprise a cross-sectional area that is in a range of areas, e.g., between about 0.001 mm$^2$ and about 100 mm$^2$.

In some instances, the fixture may comprise an electrode reservoir, an inlet fluid channel comprising a first end and a second end, an outlet fluid channel comprising a first end that is fluidically coupled to the second end of the inlet fluid channel, and a second end that is fluidically coupled to a separation channel (e.g., in a microfluidic device), which inlet fluid channel and the outlet fluid channel intersect with and are fluidically coupled to each other at a plane that defines or is parallel to a surface of the electrode reservoir. The membrane may be disposed within the electrode reservoir at or adjacent to the plane at which the inlet fluid channel and outlet fluid channel intersect, such that the membrane covers all or substantially all of an opening comprising the intersection of the inlet fluid channel and the outlet fluid channel (see, e.g., FIGS. 13A-F). In instances where the fixture comprises an insert comprising an inlet fluid path and an outlet fluid path, the membrane and/or inlet fluid path and outlet fluid path may be configured to facilitate substantially bubble-free wetting of a surface of the membrane when the electrode reservoir is filled (e.g., with strong electrolytes, buffers, reagents, etc.).

The membrane may be selected by desired material properties. For example, the membrane may be selected for a desired pore size, hydrophilicity, hydrophobicity, amphophilicity, oleophilicity, charged or uncharged, inertness, mechanical properties (e.g., rigidity, compliance, flexibility, toughness), etc. In some cases, the membrane may comprise natural or synthetic materials. The membrane may comprise one or more polymers. In a preferred embodiment, the membrane comprises cellulose or regenerated cellulose and is hydrophilic. In another preferred embodiment, the membrane comprises a polymer, e.g., polytetrafluoroethylene (PTFE). In cases where a polymer is used, the polymer (e.g., PTFE) may be manufactured or treated to obtain useful properties (e.g., woven, treated to render a surface hydrophilic, etc.). In another preferred embodiment, the membrane comprises a rigid material, e.g., glass or ceramic. In some embodiments, the membrane may be treated to be hydrophilic and/or uncharged.

In some instances, the membrane provides a high hydrodynamic resistance and low electrical resistance connection between a high voltage electrode positioned within the electrode reservoir and a fluid (e.g., liquid, buffer, etc.) contained within the inlet fluid channel and the outlet fluid channel. The hydrodynamic resistance between the reservoir and the intersection of the inlet fluid channel and outlet fluid channel may be about 0.01 $((N/mm^2)/(mm^3/sec))$, about 0.1 $((N/mm^2)/(mm^3/sec))$, about 1 $((N/mm^2)/(mm^3/sec))$, about 10 $((N/mm^2)/(mm^3/sec))$, about 100 $((N/mm^2)/(mm^3/sec))$, about 1,000 $((N/mm^2)/(mm^3/sec))$, about 10,000 $((N/mm^2)/(mm^3/sec))$, about 100,000 $((N/mm^2)/(mm^3/sec))$, or about 1,000,000 $((N/mm^2)/(mm^3/sec))$. The hydrodynamic resistance between the reservoir and the intersection of the inlet fluid channel and outlet fluid channel may be at least 0.01 $((N/mm^2)/(mm^3/sec))$, at least 0.1 $((N/mm^2)/(mm^3/sec))$, at least 1 $((N/mm^2)/(mm^3/sec))$, at least 10 $((N/mm^2)/(mm^3/sec))$, at least 100 $((N/mm^2)/(mm^3/sec))$, at least 1,000 $((N/mm^2)/(mm^3/sec))$, at least 10,000 $((N/mm^2)/(mm^3/sec))$, at least 100,000 $((N/mm^2)/(mm^3/sec))$, or at least 1,000,000 $((N/mm^2)/(mm^3/sec))$. The hydrodynamic resistance between the reservoir and the intersection of the inlet fluid channel and outlet fluid channel may be at most 1,000,000 $((N/mm^2)/(mm^3/sec))$, at most 100,000 $((N/mm^2)/(mm^3/sec))$, at most 10,000 $((N/mm^2)/(mm^3/sec))$, at most 1,000 $((N/mm^2)/(mm^3/sec))$, at most 100 $((N/mm^2)/(mm^3/sec))$, at most 10 $((N/mm^2)/(mm^3/sec))$, at most 1 $((N/mm^2)/(mm^3/sec))$, at most 0.1 $((N/mm^2)/(mm^3/sec))$, or at most 0.01 $((N/mm^2)/(mm^3/sec))$. The hydrodynamic resistance between the reservoir and the intersection of the inlet fluid channel and outlet fluid channel may be in a range of the values, e.g., between 1 $((N/mm^2)/(mm^3/sec))$ and 10,000 $((N/mm^2)/(mm^3/sec))$.

The electrical resistance between the electrode reservoir and the intersection of the inlet fluid channel and outlet fluid channel may be about 10,000,000 ohms, about 1,000,000 ohms, about 100,000 ohms, about 10,000 ohms, about 1,000 ohms, about 100 ohms, about 10 ohms, about 1 ohm, about 0.1 ohm, or about 0.01 ohm. The electrical resistance between the electrode reservoir and the intersection of the inlet fluid channel and outlet fluid channel may be at most 10,000,000 ohms, at most 1,000,000 ohms, at most 100,000 ohms, at most 10,000 ohms, at most 1,000 ohms, at most 100 ohms, at most 10 ohms, at most 1 ohm, at most 0.1 ohm, or at most 0.01 ohm. The electrical resistance between the electrode reservoir and the intersection of the inlet fluid channel and outlet fluid channel may be in a range of values, e.g., between about 100,000 ohms and 10,000,000 ohms.

In some instances, the ratio of the hydrodynamic resistance to the electrical resistance between the electrode reservoir and the intersection of the inlet fluid channel and outlet fluid channel may be about 0.001 $((N/mm^2)/(mm^3/sec))$/Ohm, about 0.01 $((N/mm^2)/(mm^3/sec))$/Ohm, about 0.1 $((N/mm^2)/(mm^3/sec))$/Ohm, about 1 $((N/mm^2)/(mm^3/sec))$/Ohm, about 10 $((N/mm^2)/(mm^3/sec))$/Ohm, about 100 $((N/mm^2)/(mm^3/sec))$/Ohm, about 1000 $((N/mm^2)/(mm^3/sec))$/Ohm, about 10000 $((N/mm^2)/(mm^3/sec))$/Ohm. In some instances, the ratio of the hydrodynamic resistance to the electrical resistance between the electrode reservoir and the intersection of the inlet fluid channel and outlet fluid channel may be at least 0.001 $((N/mm^2)/(mm^3/sec))$/Ohm, at least 0.01 $((N/mm^2)/(mm^3/sec))$/Ohm, at least 0.1 $((N/mm^2)/(mm^3/sec))$/Ohm, at least 1 $((N/mm^2)/(mm^3/sec))$/Ohm, at least 10 $((N/mm^2)/(mm^3/sec))$/Ohm, at least 100 $((N/mm^2)/(mm^3/sec))$/Ohm, at least 1000 $((N/mm^2)/(mm^3/sec))$/Ohm, at least 10000 $((N/mm^2)/(mm^3/sec))$/Ohm, or more. In some instances, the ratio of the hydrodynamic resistance to the electrical resistance between the electrode reservoir and the intersection of the inlet fluid channel and outlet fluid channel may be in a range of values, e.g., between 1000 $((N/mm^2)/(mm^3/sec))$/Ohm and 1,000,000 $((N/mm^2)/(mm^3/sec))$/Ohm.

In some instances, the electrode reservoir may be filled with the electrolyte solution at a concentration of about 0.1 millimolar (mM), about 0.5 mM, about 1 mM, about 5 mM, about 10 mM, about 50 mM, about 100 mM, about 500 mM, or about 1 molar (M). The electrolyte solution concentration may be at least 0.1 millimolar (mM), at least 0.5 mM, at least 1 mM, at least 5 mM, at least 10 mM, at least 50 mM, at least 100 mM, at least 500 mM, or at least 1 molar (M). The electrolyte solution concentration may be at most about 1M, at most about 500 mM, at most about 100 mM, at most about 50 mM, at most about 10 mM, at most about 5 mM, at most about 1 mM, at most about 0.5 mM, or at most about 0.1 mM. The electrolyte solution concentration may be in a range of concentrations, e.g., between about 1 millimolar (mM) to about 500 mM. In some instances, during operation, the electrode reservoir is filled with the electrolyte solution at a concentration between about 10 mM to about 150 mM.

In some instances, during operation, the electrode reservoirs are filled with the electrolyte solutions with a pH range between about 2 and about 11. For instance, one electrode reservoir at a proximal end of a separation channel may comprise an electrode solution of about 2 pH units, and another electrode reservoir at a distal end of a separation channel may comprise an electrode solution of about 11 pH units, or one electrode reservoir at a distal end of a separation channel may comprise an electrode solution of about 2 pH units, and another electrode reservoir at a proximal end of a separation channel may comprise an electrode solution of about 11 pH units. It will be appreciated that the pH range or difference in pH between the electrode reservoirs can be tuned based on a pH range that is useful for separating the analyte species. For instance, if a mixture of analytes comprises expected pI values in a narrow pH range, the pH range or difference of the electrode reservoirs may be adjusted to be narrower in order to achieve higher separation resolution for the given analyte mixture.

In some instances, the electrolyte solution comprises a strong acid, a strong base, or a highly soluble salt. Examples of strong acids include, but are not limited to, perchloric acid, hydrochloric acid, sulfuric acid, and the like. Examples of strong bases include, but are not limited to, sodium hydroxide, potassium hydroxide, calcium hydroxide, and the like. Examples of highly soluble salts include, but are not limited to, sodium chloride, potassium nitrate, magnesium chloride, and the like. In some instances, a weak acid or weak base may be used as the electrolyte solution. Examples of weak acids include, but are not limited to, phosphoric acid, formic acid, acetic acid, carbonic acid, and the like. Examples of weak bases include, but are not limited to, ammonium hydroxide, diethylamine, dimethylamine, piperidine, and the like. In some cases, the pH of the electrolyte solutions can be about 1.5 pH units and about 14 pH units. In some cases, the pH of the electrolyte solutions can be about 2 pH units and about 11 pH units. In some cases, the pH of the electrolyte solutions can be about 3 pH units and about 9 pH units. In some cases, the pH of the electrolyte solutions can be about 5 pH units and about 8 pH units.

Fluid flow controllers: In some instances, the disclosed systems may comprise one or more programmable fluid flow controllers configured to provide, e.g., independently-controlled, pressure-driven flow through two or more separation channels (e.g., for use alone or in combination with a voltage gradient applied to the two or more separation channels) or auxiliary channels that intersect with the separation channels. In some instances, pressure-driven flow may be used for mobilizing separated analyte peaks out of a separation channel. In some instances, pressure-driven flow may be used, e.g., for introducing a chemical mobilization agent into a separation channel (e.g., an electrolyte that disrupts the pH gradient used for isoelectric focusing), thereby mobilizing separated analyte peaks out of the separation channel. In some instances, pressure-driven flow may be used, e.g., for introducing a chemical mobilization agent into a separation channel (e.g., an elution buffer for eluting analytes from a stationary phase confined within a separation channel), thereby mobilizing separated analyte peaks out of the separation channel. In some instances, the flow may be controlled by integration of flow restrictors into the device, e.g., long capillary or channel lengths to increase the hydrodynamic resistance and provide uniform flow profiles and electrospray performance.

Control of pressure-driven fluid flow through the disclosed devices and systems will typically be performed through the use of pumps (or other fluid actuation mechanisms) and valves. Examples of suitable pumps include, but are not limited to, syringe pumps, programmable syringe pumps, peristaltic pumps, diaphragm pumps, piston pumps and the like. In some embodiments, fluid flow through the system may be controlled by means of applying positive pneumatic pressure at the one or more fluid inlets or sample or reagent reservoirs on the device. In some embodiments, fluid flow through the system may be controlled by means of drawing a vacuum at the one or more fluid outlets or waste reservoirs. Examples of suitable valves include, but are not limited to, check valves, electromechanical two-way or three-way valves, pneumatic two-way and three-way valves, and the like. In some instances, one or more micropumps or (e.g. peristaltic pumps, piezo pumps), microvalves (e.g., metered injection valves, piezo valves, stopcock valves, slide valves) may be integrated within the device. In certain cases, control or pressure-driven fluid flow through the disclosed devices and systems may be performed using a bladder, blister pack, pistons, screws, glass frits, or a combination thereof. In some instances, the pressure-driven fluid flow may be pulse-less.

In some embodiments, fluid flow through the system may be controlled using one or more device or system parameters. In some instances, flow may be generated in the device by altering the temperature of the system (e.g., to change the gas pressure in an area of the device) or by introducing a temperature gradient. In some instances, the reservoir height may be changed to drive flow through one or more channels of the device (e.g., via hydrostatic pressure). In some instances, a portion of the device (e.g., an inlet or outlet) may be exposed and allowed to evaporate, thereby driving fluid flow through the channels. In some instances, the fluid flow may be pulse-less.

In some instances, fluid flow through the disclosed devices and systems may be performed electrically. For instance, electroosmotic flow in one or more of the channels of the device or outside the channel may be performed using, for example, an electroosmotic pump.

Different modes of fluid flow control may be utilized at different points during the performance of the disclosed analyte separation methods, e.g. forward flow (relative to the inlets and outlets for a given device or separation channel), reverse flow, oscillating or pulsatile flow, or combinations thereof, may all be used. For example, in some instances, oscillating or pulsatile flow may be used, for example, during device priming steps to facilitate dislodgement of any bubbles that may be trapped within the device. In some instances, the devices may be subjected to vacuum (e.g., degassed) for device priming, e.g., to facilitate bubble-free introduction of a fluid or reagent.

Different fluid flow rates may be utilized at different points during the performance of the disclosed analyte separation methods. For example, in some instances of the disclosed devices and system, the volumetric flow rate may vary from −100 ml/sec to +100 ml/sec. In some instances, the absolute value of the volumetric flow rate may be at least 0.001 ml/sec, at least 0.01 ml/sec, at least 0.1 ml/sec, at least 1 ml/sec, at least 10 ml/sec, or at least 100 ml/sec. In some instances, the absolute value of the volumetric flow rate may be at most 100 ml/sec, at most 10 ml/sec, at most 1 ml/sec, at most 0.1 ml/sec, at most 0.01 ml/sec, or at most 0.001 ml/sec. The volumetric flow rate at a given point in time may have any value within this range, e.g. a forward flow rate of 2.5 ml/sec, a reverse flow rate of −0.05 ml/sec, or a value of 0 ml/sec (i.e., stopped flow). In some instances, the pressure-driven fluid flow mode and/or fluid flow velocities through each separation channel and/or auxiliary fluid channels may be programmed independently of each other to follow a specified time-course.

Autosamplers and fluid handling systems: In some instances, the disclosed systems may further comprise an autosampler or fluid handling system configured for automated, independently controlled loading of sample aliquots and/or other separation reaction reagents into a plurality of sample or reagent inlet ports to the separation channels. In some instances, a custom-built autosampler or fluid handling module may be incorporated into the disclosed systems. In some instances, a commercially-available autosampler or fluid handling module may be integrated into the disclosed systems. Examples of suitable commercially-available autosamplers include, but are not limited to, the Agilent 1260 Infinity Dual Loop Autosampler and 1260 Infinity High Performance Micro Autosampler (Agilent Technologies, Santa Clara, Calif.), the HT1500L HPLC Autosampler (HTA, Brescia, Italy), the Spark Holland Alias (Spark-Holland, Emmen, Netherlands), and the SIL-20A/AC HPLC Autosampler (Shimadzu, Columbia, Md.). Examples of suitable commercially-available fluid handling systems (or liquid handling systems) include, but are not limited to, the Tecan Fluent® system (Tecan Trading AG, Switzerland), the Hamilton Microlab STAR and Microlab NIMBUS systems (Hamilton, Reno, Nev.), and the Agilent Bravo Automated Liquid Handling Platform and Agilent Vertical Pipetting Station (Agilent Technologies, Santa Clara, Calif.).

In some instances, one or more fluid flow controllers or fluid handling systems may be used for filling or replenishing one or more reservoirs. As described herein, the reservoirs may be in fluid communication with a membrane (e.g., comprised in a fixture and/or an electrode interfacing unit), which may interface with the microfluidic device and prevent bubble formation at the device-membrane interface. The reservoirs may be filled using a variety of fluid controller or fluid handling systems. For example, a fluid controller may be used to distribute buffers or reagents to each reservoir. In some instances, the fluid controller may comprise a pipette tip (e.g., a 1000 microliter pipette tip), and the reservoir may be configured to receive the pipette tip. In some instances, the reservoir may comprise an access port to fill the reservoir from the bottom. In some instances, the reservoir may comprise a side port for access of the pipette tip without bubble formation. In some instances, the reservoir may comprise a flange, which may aid in the integration or interfacing of the fluid flow controller.

Waste management: In some embodiments, the system may further comprise waste management modules, which may be integrated with (i.e., attached to) or be separate from the microfluidic device. The waste management module may be used to collect a waste product from the microfluidic device. In some instances, the waste management module may additionally or alternatively be used to manage droplet formation at an outlet or surface of the microfluidic device. For example, the waste management module may be used to prevent droplets from forming at the outlet (e.g., electrospray tip) of the device and/or wicking of the droplets to a different segment or portion of the device (e.g., the inlets, interfaced electrodes, etc.). In some instances, the waste management module may comprise application of positive or negative pressure (e.g., vacuum). In such cases, a vacuum may be applied to a part of the microfluidic device (e.g., the outlet or electrospray tip). For example, a flange or adaptor may be applied to the chip, thereby allowing the vacuum to be interfaced with the device with minimal disruption to the placement of the device or to any downstream analysis units (e.g., mass spectrometer). The vacuum may then be used to aspirate droplets or waste products as they are expelled from the outlet or electrospray tip.

The vacuum may be applied through a variety of apparatus, which may be formed in one or more shapes. For example, the apparatus through which the vacuum is applied may be shaped like a horn or funnel. The horn or funnel may be configured to apply a vacuum to the tip. In some instances, the apparatus may be configured to swivel or move into a different position. In another embodiment, the vacuum may be applied through a tube-shaped apparatus. The tube may be conical, cylindrical, or any other shape. In some instances, the tube may further comprise an opening module, which may be used to apply the vacuum and direct the waste products to a waste receptacle. For example, the tube may be placed between the chip (e.g., interfaced using a flange) and a mass spectrometer, and the tube may comprise an opening module, e.g., vacuum tunnel that directs waste products from the electrospray tip, such that the waste product does not reach the mass spectrometer. In some cases, the tube may be oriented at an angle, e.g., perpendicularly, to the outlet or electrospray tip. In such cases, the vacuum may be applied to the tube and may aspirate droplets as the droplets exit the device. In some instances, the tube may be transparent, such that one or more imaging systems, as described herein, may be used to image the electrospray tip. In another embodiment, the vacuum may be applied through a modular device that may be configured to attach to a vacuum. For example, the modular device may be configured to clamp or attach to a portion of the device. Once the modular device is secured to the device, a vacuum may be applied to the modular device, thereby directing waste products away from the microfluidic device.

In some instances, the waste management module may comprise the use of positive pressure. For example, an air knife may be used to direct droplets away from the electrospray tip. In such an example, the air knife may be connected to an air or nitrogen gas source and/or pressurizer to generate air (or nitrogen gas) pressure to eject the droplets or direct the droplets away from the device or portion thereof (e.g., electrospray tip). In some instances, the waste management module may comprise a nebulizing unit. For example a nebulizer may be configured to secure to the chip. The nebulizer may comprise geometries necessary to direct air towards the chip such that the droplets or waste products are directed away from the electrospray tip or outlet (e.g., to a waste receptacle). The nebulizer may comprise sealing mechanisms and may be connected to an air source and/or pressurizer to generate air pressure to eject the droplets or direct the droplets away from the electrospray tip. In some instances, the nebulizer may comprise a nozzle. The nebulizer may be comprised of a polymer, metal, or ceramic material.

In some instances, the waste management module may comprise the use of mechanical approaches to remove waste and/or droplets from the outlet or electrospray tip. For example, one or more wipers may be used to mechanically move (e.g., sweep) the droplets from the device. Alternatively, or additionally, an absorbent material may be integrated into the waste management module, to absorb or wick away waste material from the outlet or electrospray tip.

In some instances, the waste management module may be used in conjunction with other approaches for waste management. For example, the device may comprise a geometry or chemical/material properties that allow for control of droplet formation at the outlet and/or to minimize wicking of droplets and fluids to a different segment or portion of the device (e.g., electrodes or inlets). In some instances, a coating may be used to allow for droplet formation at the tip or outlet of the device and may aid in the prevention of the wicking of fluids to other segments or portions of the device. In some cases, the coating may be a hydrophobic coating.

In some instances, the geometry or orientation of the device may be used to control droplet formation at the outlet and/or to minimize wicking of droplets to a different segment or portion of the device. For example, the outlet or electrospray tip may be formed into a triangular tip to allow for optimal droplet formation. In some instances, the spatial orientation of the device may be used to control waste management. For example, the device may be angled such that an outlet (e.g., tip) is oriented downward, and the waste may be driven by gravity flow out of the microfluidic device. Any suitable angle may be used to direct the gravity flow out of the microfluidic device. For example, the angle may be about 30°, 31°, 32°, 33°, 34°, 35°, 36°, 37°, 38°, 39°, 40°, 41°, 42°, 43°, 44°, 45°, 46°, 47°, 48°, 49°, 50°, 51°, 52°, 53°, 54°, 55°, 56°, 57°, 58°, 59°, 60°, etc. In some instances, the system further comprises a waste receptacle separate from the device for collecting the waste product.

In some instances, the waste management module may obviate the need for a waste reservoir on the device. For example, the waste may be ejected out of the device as droplets or a stream and may be removed, e.g., via aspiration using a vacuum.

Imaging module: In some instances, the system may further comprise an imaging module configured to acquire a series of one or more images of the two or more separation channels, or a portion thereof. In some instances, the field-of-view of the images may comprise all or a portion of the two or more separation channels. In some instances, the imaging may comprise continuous imaging of all or a portion of the two or more separation channels while separation and/or mobilization reactions are performed. In some instances, the imaging may comprise intermittent or periodic imaging of all or a portion of the two or more separation channels while separation and/or mobilization reactions are performed. In some instances, the imaging may comprise acquiring UV absorbance images. In some instances, the imaging may comprise acquiring fluorescence images, e.g., of native fluorescence or fluorescence due to the presence of exogenous fluorescent labels attached to the analytes. In some instances, the imaging module may be configured, for example, to determine when an isoelectric focusing reaction is complete and/or to detect a failure (e.g., the introduction or formation of a bubble in a separation channel).

Any of a variety of imaging systems or system components may be utilized for the purpose of implementing the disclosed methods, devices, and systems. Examples include, but are not limited to, one or more light sources (e.g., light emitting diodes (LEDs), diode lasers, fiber lasers, gas lasers, halogen lamps, arc lamps, etc.), condenser lenses, objective lenses, mirrors, filters, beam splitters, prisms, image sensors (e.g., CCD image sensors or cameras, CMOS image sensors or cameras), and the like, or any combination thereof. In some instances, the one or more light sources may comprise an array of light sources. For example, a LED array may be used to illuminate one or more regions of the device. Depending on the imaging mode utilized, the light source and image sensor may be positioned on opposite sides of the microfluidic device, e.g., so that absorbance-based images may be acquired. In some instances, the light source and image sensor may be positioned on the same side of the microfluidic device, e.g., so that epifluorescence images may be acquired.

As noted above, images may be acquired continuously during the separation and/or mobilization steps or may be acquired at random or specified time intervals. In some instances, a series of one or more images are acquired continuously or at random or specified time intervals. In some instances, a series of short exposure images (e.g., 10-20 images) are acquired on a fast (e.g., millisecond timescale) and are then averaged to provide a "single image" having improved signal-to-noise ratio. In some instances, a "single image" is acquired every 1 second, 5 seconds, 10 seconds, 20 seconds, 30 seconds, or at longer time intervals. In some instances, longer exposure times may be used to improve signal-to-noise ratio. In some instances, the series of one or more images may comprise video images.

Image processing: In some instances, as noted above, the system may comprise processors, controllers, or computers configured to run image processing software for detecting the presence of analyte peaks, determining the positions of pI markers or separated analyte bands, determining peak width, determining peak shapes (e.g., Gaussian fitting or other curve-fitting algorithms), or changes in any of these parameters over time. In some instances, image processing may be used for detection of a failure, e.g., introduction or formation of a bubble in one of the two or more separation channels. Any of a variety of image processing algorithms may be utilized for image pre-processing or image processing in implementing the disclosed methods and systems. Examples include, but are not limited to, Canny edge detection methods, Canny-Deriche edge detection methods, first-order gradient edge detection methods (e.g., the Sobel operator), second order differential edge detection methods, phase congruency (phase coherence) edge detection methods, other image segmentation algorithms (e.g., intensity thresholding, intensity clustering methods, intensity histogram-based methods, etc.), feature and pattern recognition algorithms (e.g., the generalized Hough transform for detecting arbitrary shapes, the circular Hough transform, etc.), and mathematical analysis algorithms (e.g., Fourier transform, fast Fourier transform, wavelet analysis, autocorrelation, Savitzky-Golay smoothing, Eigen analysis, etc.), or any combination thereof.

Microplate-handling robotics: In some instances, the system may further comprise a microplate-handling robotics module configured to transport and replace microplates that serve as sources for samples and/or reagents. In some instances, the system may further comprise a microfluidic device-handling robotics module configured to transport and replace the microfluidic devices used in the system, e.g., after a failure is detected. In some instances, the microplate-handling and the microfluidic device-handling may be handled by the same robotics module. In some instances, custom robotics may be incorporated into the disclosed systems to perform these functions. In some instances, commercially-available robotics systems may be adapted and/or integrated into the disclosed systems to perform these functions. Examples of suitable microplate handling robotics systems include, but are not limited to, Tecan Robotic Gripper Arms (Tecan Trading AG, Switzerland) and the Agilent Direct Drive and BenchBot Robots (Agilent Technologies, Santa Clara, Calif.).

Failure mode detection and recovery: In some instances, the disclosed systems may be configured for automated detection of system failures, e.g., current loss due to bubble introduction during sample loading or bubble formation during separation runs, incorrect current profile due to incorrectly prepared samples, no current due to empty or underfilled wells in the sample plate. In some instances, the disclosed systems may be configured to flag failures and automatically re-run samples for which a failure was detected in a corresponding separation channel. In some instances, for example, the disclosed systems may be configured to re-load a specific sample from microtiter plate or other sample source and re-run the separation reaction.

Temperature control: In some instances, the disclosed systems and methods may be subjected to temperature control. In some instances, a portion of system (e.g., a portion of the device) may be subjected to temperature control. In some instances, the system or one or more components of the system may be cooled using, for example a Peltier, a fan or other heat dissipater, an air knife. In some instances, the cooling system may be integrated with the waste management system (e.g., air knife). In some instances, the cooling system may comprise a compressor for cooling. In some instances, the system may comprise an environmental or temperature-controlled chamber. In some instances, cooling blocks or pre-cooled blocks may be used (e.g., coupled to the stage or cartridge). In some instances, the system of component thereof may be constructed from materials that allow for heat exchange with the environment. In some instances, the system may comprise a liquid heat exchanger.

Applications: The disclosed methods, devices, and systems have potential application in a variety of fields including, but not limited to, proteomics research, cellular research, drug discovery and development, and clinical diagnostics. For example, the improved reproducibility and quantitation that may be achieved for separation-based characterization of analyte samples using the disclosed methods may be of great benefit for the characterization of biologic and biosimilar pharmaceuticals during development and/or manufacturing.

Biologics and biosimilars are a class of drugs which include, for example, recombinant proteins, antibodies, live virus vaccines, human plasma-derived proteins, cell-based medicines, naturally-sourced proteins, antibody-drug conjugates, protein-drug conjugates and other protein drugs. The FDA and other regulatory agencies require the use of a stepwise approach to demonstrating biosimilarity, which may include a comparison of the proposed product and a reference product with respect to structure, function, animal toxicity, human pharmacokinetics (PK) and pharmacodynamics (PD), clinical immunogenicity, and clinical safety and effectiveness (see "Scientific Considerations in Demonstrating Biosimilarity to a Reference Product: Guidance for Industry", U.S. Department of Health and Human Services, Food and Drug Administration, April 2015). Examples of the structural characterization data that may be required for protein products include primary structure (i.e., amino acid sequence), secondary structure (i.e., the degree of folding to form alpha helix or beta sheet structures), tertiary structure (i.e., the three dimensional shape of the protein produced by folding of the polypeptide backbone and secondary structural domains), and quaternary structure (e.g., the number of subunits required to form an active protein complex, or the protein's aggregation state)). In many cases, this information may not be available without employing laborious, time-intensive, and costly techniques such as x-ray crystallography. Thus there is a need for experimental techniques that allow for convenient, real-time, and relatively high-throughput characterization of protein structure for the purposes of establishing biosimilarity between candidate biological drugs and reference drugs.

In some instances, the disclosed methods, devices, and systems may be used to provide structural comparison data for biological drug candidates (e.g., monoclonal antibodies (mAb)) and reference biological drugs for the purpose of establishing biosimilarity. For example, in some instances, determination of the isoelectric point for a drug candidate and a reference drug may provide important evidence in support of a demonstration of biosimilarity. In some embodiments, isoelectric point data for a drug candidate and a reference drug that have both been treated with a site-specific protease under identical reaction conditions may provide important evidence in support of a demonstration of biosimilarity. In some embodiments, the disclosed methods, devices, and systems may be used to monitor a biologic drug manufacturing process (e.g., to monitor bioreactor processes in real time) to ensure the quality and consistency of the product by analyzing samples drawn at different points in the production process, or samples drawn from different production runs.

The disclosed devices and systems for performing multiple, independently-controlled separation reactions in parallel provide a number of advantages over currently available technologies, for example, the ability to perform different isoelectric focusing reactions (or other separation reactions) in different channels (e.g., using different pH gradients, different focusing times, different focusing voltages, etc.) for more detailed and accurate sample characterization (e.g., more accurate determination of pIs), or the ability to simultaneously process a plurality of samples in parallel using the same set of separation reaction conditions for higher throughput sample characterization. Furthermore, the independent monitoring and/or recording of current traces and/or voltage settings used for each separation channel may be advantageous in meeting the data tracking requirements for FDA submissions when attempting to demonstrate biosimilarity, etc. As noted, in some instances, the disclosed devices and systems may be configured to identify sample run failures, e.g., the presence or formation of bubbles in the microfluidic device, and to initiate recovery steps, e.g., by automatically re-loading samples from a microtiter plate or other sample source and repeating the separation reaction.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

EXAMPLES

These examples are provided for illustrative purposes only and not to limit the scope of the claims provided herein.

Example 1—Microfluidic Device Comprising Four Separation Channels

FIG. 1A provides a drawing of one non-limiting example of a microfluidic device for performing a plurality of separation reactions, e.g., isoelectric focusing reactions. The device comprises a lower substrate 101, which may be substantially planar, comprising fused silica in which fluid channels measuring 210 microns wide and 100 microns in depth are fabricated using, e.g., embossing, laser micromachining, or photolithography and wet chemical etching. The fluid channels are sealed by bonding substrate 101 to a transparent coverslip 102. In some instances, e.g., in cases where UV absorbance imaging is used to monitor separation and/or mobilization reactions, substrate 101 may be fabricated from an optically transparent material. In some instances, e.g., where epifluorescence imaging is used to monitor separation and/or mobilization reactions, substrate 101 may be fabricated from an optically opaque material. Although illustrated as a rectangular shape, it will be appreciated that the device may take any useful shape. In some embodiments, the microfluidic device may comprise a tip (e.g., at the distal end), which may allow for fluid to be directed away from the device (e.g., to a waste receptacle or analysis unit, e.g., mass spectrometer).

Access to the fluid channels within the device is provided through sample inlet ports 103, anode wells 104, cathode wells 106, sample outlet ports 107, and chemical mobilization agent inlet ports 109. One anode well 104 and cathode well 106 are in fluid- and electrical communication with a proximal end and distal end of each separation channel 105, respectively (four separation channels are shown in this non-limiting example). The electrodes can, in some instances, be placed in contact with the anode well 104 and cathode well 106. The separation channels extend beyond the cathode wells 106 to sample outlet ports 107 (only labeled for two of the four separation channels shown in the figure). Chemical mobilization agent inlet ports 109 are connected to the distal ends of separation channels 105 via chemical mobilization channels 108 (only labeled for two of the four separation channels shown in the figure). As illustrated in FIG. 1A, the inlet ports 109 and outlet ports 107 may be configured to be loaded through the side of the device, which may facilitate whole-channel or whole-device imaging.

For use in performing a plurality of isoelectric focusing reactions to separate mixtures of proteins, protein samples are pre-mixed with ampholyte pH gradient and pI markers before placing into vials and loading onto an autosampler. The samples are serially loaded into the device by the autosampler via the sample inlet ports 103 onto the microfluidic device, through the separation channels 105, and out of the device to waste through the sample outlet ports 107.

A catholyte fluid (e.g., 1% $N_4OH$ in $H_2O$) is loaded into cathode wells 106, anolyte (e.g., 10 mM $H_3PO_4$) is loaded into the anode wells 104, and a mobilizer solution (e.g., 49% MeOH, 49% $H_2O$, 1% Acetic Acid) is connected to mobilization agent inlet ports 109.

After all reagents are loaded, an electric field of, e.g., +600V/cm is applied from one or more of the anode wells 104 to the corresponding cathode wells 106 by connecting electrodes to the anode wells 104 and cathode wells 106 to initiate isoelectric focusing. As noted above, the voltages and/or currents applied to each of the separation channels 105 may be controlled independently and may also be recorded as a function of time. In some instances, the electrodes used for anodes and cathodes may be integrated with the devices. For UV absorbance imaging, a collimated beam of light provided by a UV light source is aligned with the separation channels 105, and an image sensor (e.g., a CCD camera or CMOS camera) is placed on the other side of the separation channels 105 to measure the amount of light transmitted through each of the separation channels 105, thereby imaging and detecting the focused proteins (or other separated analytes) by means of their absorbance. In some instances, the focused protein may be unlabeled and detected through native absorbance at 220 nm, 280 nm, or any other wavelength at which the proteins will absorb light. For fluorescence imaging, i.e., epifluorescence imaging, excitation light of a suitable wavelength is delivered to the separation channels 105 by means of an optical assembly comprising suitable dichroic reflectors and bandpass filters, and emitted fluorescence is collected from the separation channels 105 by the same optical assembly and imaged onto the image sensor. In some instances, focused proteins (or other separated analytes) may be imaged and detected using native fluorescence. In some instances, the focused proteins may be detected using non-covalently bound fluorogenic, chromogenic, fluorescent, or chromophoric labels, such as SYPRO® Ruby, Coomassie Blue, and the like. In some instances, portions of the device may be constructed of an optically opaque material such that light may only be transmitted through the separation channels 105, thereby block any stray light from reaching the image sensor without having passed through the separation channels 105 and increasing the sensitivity of UV absorbance measurements.

Images of the focusing proteins in all or a portion of the separation channels 105 can be captured continuously and/or periodically as the isoelectric focusing reactions are performed in the plurality of separation channels 105. In some instances, detection of the positions of the pI markers in the images of the separation channels 105 may be used to determine the local pH as a function of position along the separation channels and, by extrapolation, make more accurate determinations of pI for the separated proteins (or other analytes). In some instances, when focusing is complete a positive pressure is applied at sample inlet ports 103 and/or anode wells 104 to mobilize the separated protein (or other analyte) mixture towards sample outlets 107. In some instances, when focusing is complete the electrodes connected to cathode wells 106 are disconnected, and electrodes in electrical communication with mobilizer channels 108 are used to apply an electric field of 600V/cm from anode wells 104 to the chemical mobilization agent inlets 109 to electrophoretically introduce the mobilization agent into separation channels 105. In some instances, mild positive pressure applied to mobilization agent inlets 109 may be used instead of, or in addition to, electrophoretic introduction of a chemical mobilization agent.

In the case of electrophoretic introduction of the mobilization agent, the acetic acid in the mobilizer solution is drawn by the electric field into the separation channels 105, where it ionizes the proteins and ampholytes and disrupts the pH gradient used for isoelectric focusing. The ionization of the enriched protein fractions causes them to migrate out of the separation channels 105 toward sample outlets 107. Continuing to image the separation channels 105 during the mobilization process can be used to refine the determination of pI for each separated protein.

Example 2—Prophetic Example of the Use of the Disclosed Devices and Systems for Demonstration of Biosimilarity One non-limiting example of the utility of the disclosed devices and systems is in the field of biologics and the demonstration of biosimilarity. As noted above, the FDA and other regulatory agencies require the use of a stepwise approach to demonstrating biosimilarity, which may include a comparison of the proposed product and a reference product with respect to structure, function, animal toxicity, human pharmacokinetics (PK) and pharmacodynamics (PD), clinical immunogenicity, and clinical safety and effectiveness. Examples of the structural characterization data that may be required for protein products include primary structure (i.e., amino acid sequence), secondary structure (i.e., the degree of folding to form alpha helix or beta sheet structures), tertiary structure (i.e., the three dimensional shape of the protein produced by folding of the polypeptide backbone and secondary structural domains), and quaternary structure (e.g., the number of subunits required to form an active protein complex, or the protein's aggregation state)). Accurate determination of protein isoelectric points may provide an important datum for comparison of biologic drug candidates to a reference drug in order to demonstrate biosimilarity. Sample aliquots of a manufactured biosimilar candidate and a reference drug may be loaded into the disclosed devices or systems and characterized under one or more sets of isoelectric focusing reaction conditions (e.g., using different buffers, pH gradients, applied voltages and/or currents, etc.) to determine accurate pI values under the one or more sets of reaction conditions and provide valuable comparison data for the biosimilar drug candidate and reference drug. Furthermore, the monitoring and recording of current traces for each individual separation reaction (and other operating parameters used for performing the isoelectric focusing reactions) facilitates compliance with FDA data submission requirements.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in any combination in practicing the invention. It is intended that the following claims define the scope of the invention and that methods and structures within the scope of these claims and their equivalents be covered thereby.

Example 3—Microfluidic Device Comprising Side Ports

Figure 2:
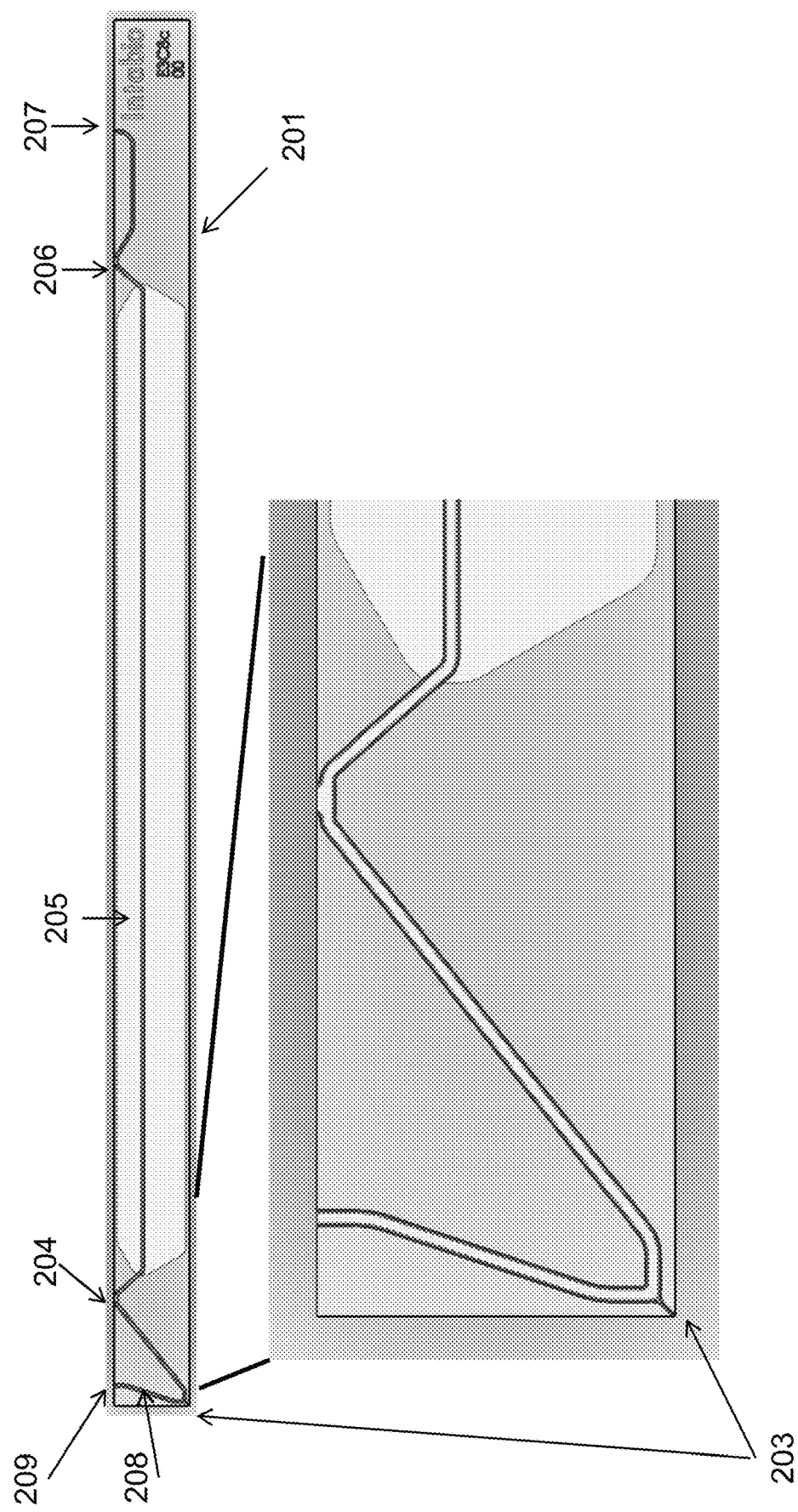
FIG. 2 provides a schematic top-down view of one non-limiting example of a microfluidic device for performing one or more separation reactions, e.g., isoelectric focusing reactions, followed by electrospray ionization.

FIG. 2 provides a schematic top-down view of one non-limiting example of a microfluidic device for performing one or more separation reactions, e.g., isoelectric focusing reaction. The device comprises a substrate 201, which may be substantially planar, in which fluid channels measuring 210 microns wide and 100 microns in depth are fabricated using, e.g., embossing, laser micromachining, or photolithography and wet chemical etching. The fluid channels can be sealed by bonding the substrate 201 to a transparent coverslip (not shown). In some instances, e.g., in cases where UV absorbance imaging is used to monitor separation and/or mobilization reactions, substrate 201 may be fabricated from an optically transparent material. In some instances, e.g., where epifluorescence imaging is used to monitor separation and/or mobilization reactions, substrate 201 may be fabricated from an optically opaque material.

Access to the fluid channels within the device is provided through sample inlet ports 207, which may be located on the side of the chip. The chip may also comprise electrode reservoirs (e.g., anode wells 206, cathode wells 204), sample outlet ports 203, and chemical mobilization agent inlet ports 209. One anode well 206 and cathode well 204 are in fluid- and electrical communication with a proximal end and distal end, respectively, of the separation channel 205. Chemical mobilization agent inlet ports 209 are connected to the distal ends of separation channels 205 via chemical mobilization channels.

For use in performing a plurality of isoelectric focusing reactions to separate mixtures of proteins, protein samples are pre-mixed with ampholyte pH gradient and pI markers before placing into vials and loading onto an autosampler. The samples are serially loaded into the device by the autosampler via the sample inlet ports 207 onto the microfluidic device, through the separation channels 205, and out of the device to waste through the sample outlet ports 203.

Figure 3:
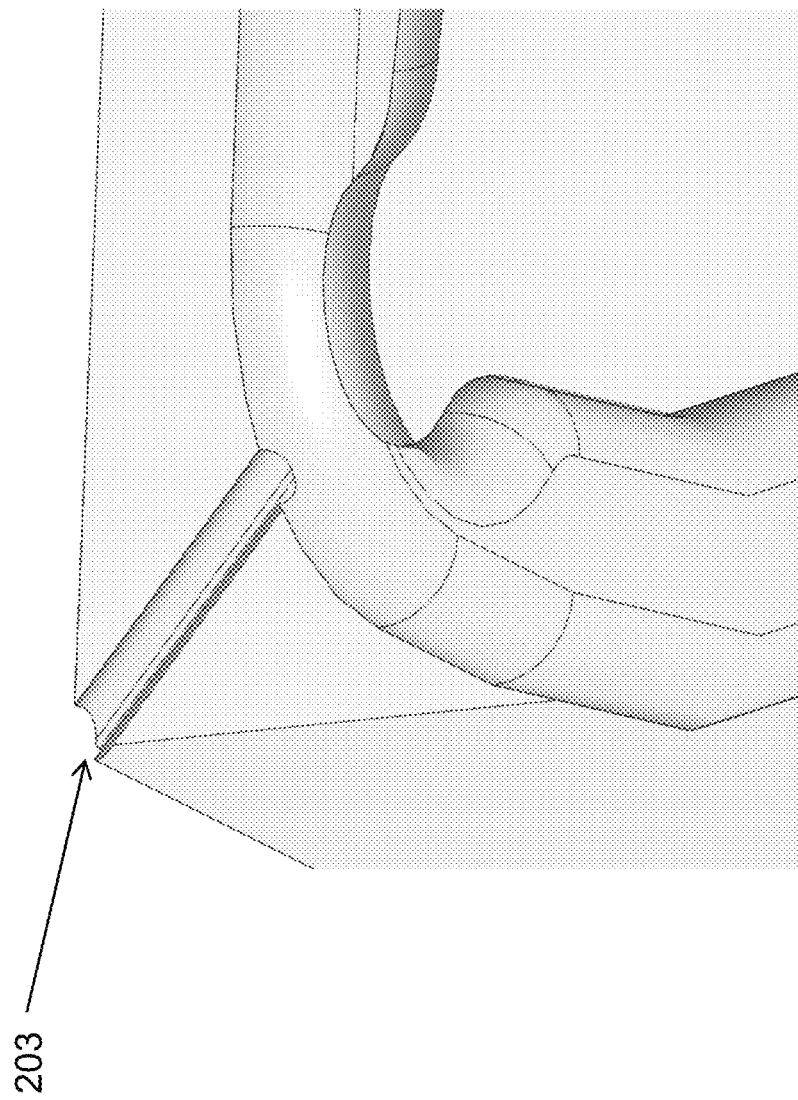
FIG. 3 provides a cross-section view of one non-limiting example of a microfluidic device for performing one or more separation reactions, e.g., isoelectric focusing reaction, followed by electrospray ionization.

A catholyte fluid (e.g., 1% $N_4OH$ in $H_2O$) is loaded into cathode wells 204, anolyte (e.g., 10 mM $H_3PO_4$) is loaded into the anode wells 206, and a mobilizer solution (e.g., 49% MeOH, 49% $H_2O$, 1% Acetic Acid) is connected to mobilization agent inlet ports 209. A membrane (not shown) may be interfaced with any of the anode or cathode wells (206 and 204) to provide electrical and fluid communication of the device with the electrodes. An isometric cross-sectional schematic of the sample outlet or ESI tip 203 is shown in FIG. 3.

Referring to FIG. 2, after all reagents are loaded, an electric field of, e.g., +600V/cm is applied from one or more of the anode wells 206 to the corresponding cathode wells 204 by connecting electrodes to the electrode reservoirs (anode wells 206 and cathode wells 204) to initiate isoelectric focusing. As noted above, the voltages and/or currents applied to each of the separation channels 205 may be controlled independently and may also be recorded as a function of time. In some instances, the electrodes used for anodes and cathodes may be integrated with the devices. For UV absorbance imaging, a collimated beam of light provided by a UV light source is aligned with the separation channels 205, and an image sensor (e.g., a CCD camera or CMOS camera) is placed on the other side of the separation channels 205 to measure the amount of light transmitted through each of the separation channels 205, thereby imaging and detecting the focused proteins (or other separated analytes) by means of their absorbance. In some instances, the focused protein may be unlabeled and detected through native absorbance at 220 nm, 280 nm, or any other wavelength at which the proteins will absorb light. For fluorescence imaging, i.e., epifluorescence imaging, excitation light of a suitable wavelength is delivered to the separation channels 205 by means of an optical assembly comprising suitable dichroic reflectors and bandpass filters, and emitted fluorescence is collected from the separation channels 205 by the same optical assembly and imaged onto the image sensor. In some instances, focused proteins (or other separated analytes) may be imaged and detected using native fluorescence. In some instances, the focused proteins may be detected using non-covalently bound fluorogenic, chromogenic, fluorescent, or chromophoric labels, such as SYPRO® Ruby, Coomassie Blue, and the like. In some instances, portions of the device may be constructed of an optically opaque material such that light may only be transmitted through the separation channels 205, thereby block any stray light from reaching the image sensor without having passed through the separation channels 205 and increasing the sensitivity of UV absorbance measurements.

Images of the focusing proteins in all or a portion of the separation channels 205 can be captured continuously and/or periodically as the isoelectric focusing reactions are performed in the plurality of separation channels 205. In some instances, detection of the positions of the pI markers in the images of the separation channels 205 may be used to determine the local pH as a function of position along the separation channels and, by extrapolation, make more accurate determinations of pI for the separated proteins (or other analytes). In some instances, when focusing is complete a positive pressure is applied at sample inlet ports 207 and/or anode wells 206 to mobilize the separated protein (or other analyte) mixture towards sample outlets 203. In some instances, when focusing is complete the electrodes connected to cathode wells 204 are disconnected, and electrodes in electrical communication with mobilizer channels 208 are used to apply an electric field of 600V/cm from anode wells 206 to the chemical mobilization agent inlets 209 to electrophoretically introduce the mobilization agent into separation channels 205. In some instances, mild positive pressure applied to mobilization agent inlets 209 may be used instead of, or in addition to, electrophoretic introduction of a chemical mobilization agent.

In the case of electrophoretic introduction of the mobilization agent, the acetic acid in the mobilizer solution is drawn by the electric field into the separation channels 205, where it ionizes the proteins and ampholytes and disrupts the pH gradient used for isoelectric focusing. The ionization of the enriched protein fractions causes them to migrate out of the separation channels 205. Continuing to image the separation channels 205 during the mobilization process can be used to refine the determination of pI for each separated protein.

Example 4—Waste Management Using a Vacuum Apparatus

Figure 4:
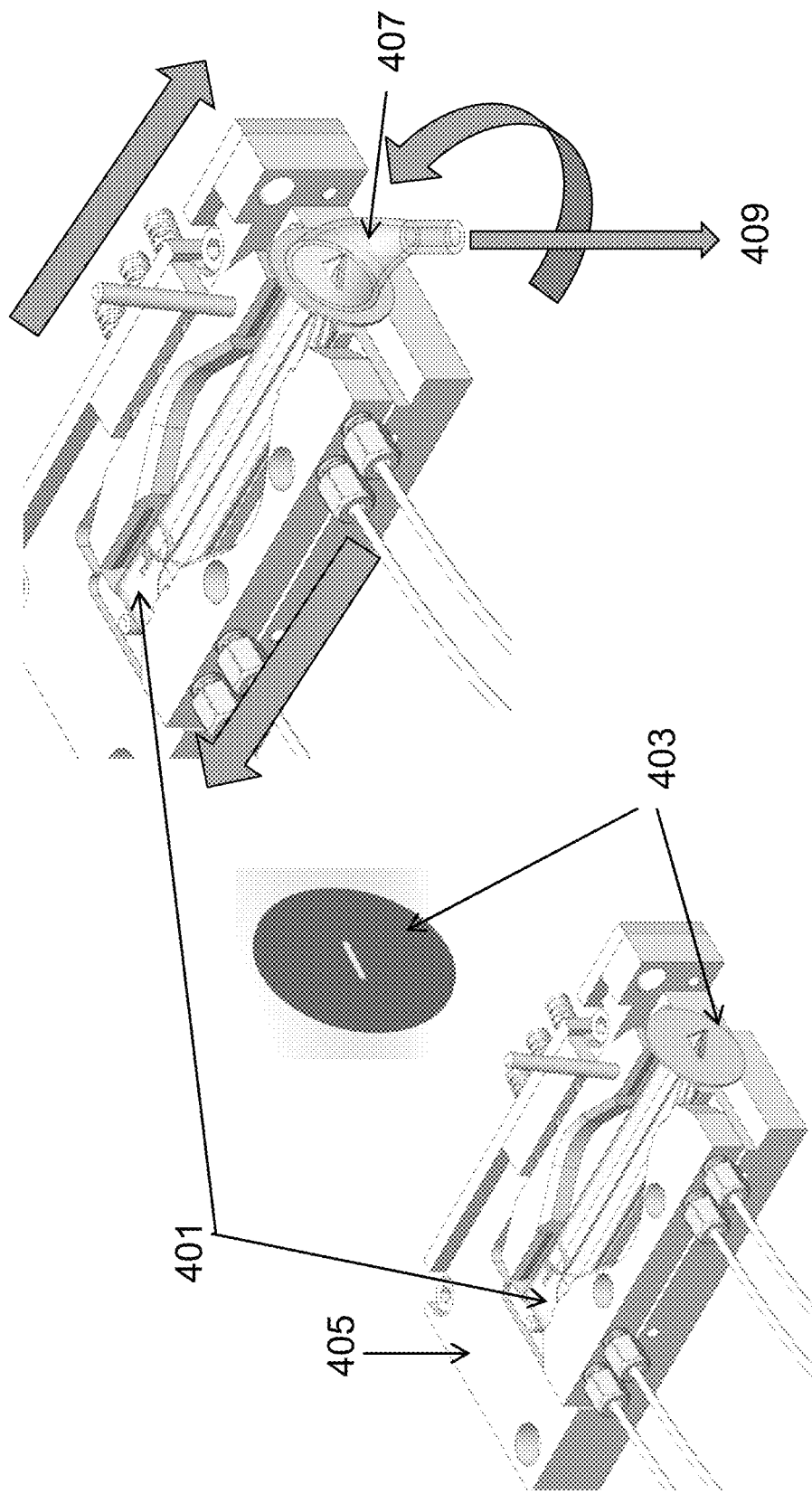
FIG. 4 provides a schematic of an example waste management system.

FIG. 4 provides a schematic of an example waste management system. In some instances, the waste management system may be used to direct waste away from the microfluidic device 401. In some instances, the waste management system may also be used to prevent wicking of droplets to another portion of the device 401. As shown in FIG. 4, the device 401 may be coupled to a stage 405. In some cases the microfluidic device 401 may be inserted into a cartridge, which may then couple to the stage 405. The stage and/or cartridge may comprise tubing and attachments to connect fluidically and/or electrically to the device 401. The waste management system may comprise a vacuum apparatus 407. The vacuum apparatus 407 may be shaped like a horn and may be configured to apply a vacuum to the tip of the device 401. In some instances, the apparatus 407 may be configured to attach to a portion of the device 401 using an adaptor, such as a flange 403. The flange 403 may comprise a slit through which a portion of the device 401 (schematically illustrated as a pointed tip) may fit. The vacuum apparatus 407 may be configured to swivel or move into a different position. For example, in a first configuration, the apparatus 407 may be directed toward a waste receptacle, thereby directing waste products to the waste receptacle upon application of the vacuum 409. In a second configuration, the apparatus 407 may be rotated, such that the sample or analyte may be directed, for example, to a separate analysis unit, e.g., a mass spectrometer.

In some instances, the stage 405 may be configured to move the device 401. For example, the stage may allow for translation of the device 401 in a direction that may be substantially parallel to one or more channels of the device 401. In some instances, the stage 405 may allow for translation of the device 401 in one or more directions. For example, the stage 405 may allow for translation of the device 401 in a direction that is substantially parallel to one or more channels of the device 401 as well as in a direction that is substantially perpendicular or orthogonal to one or more channels of the device 401. The stage 405 may be configured to adjust the position of the device 401 such that the device 401 may be integrated with a downstream analysis unit (e.g., mass spectrometer).

Figure 5:
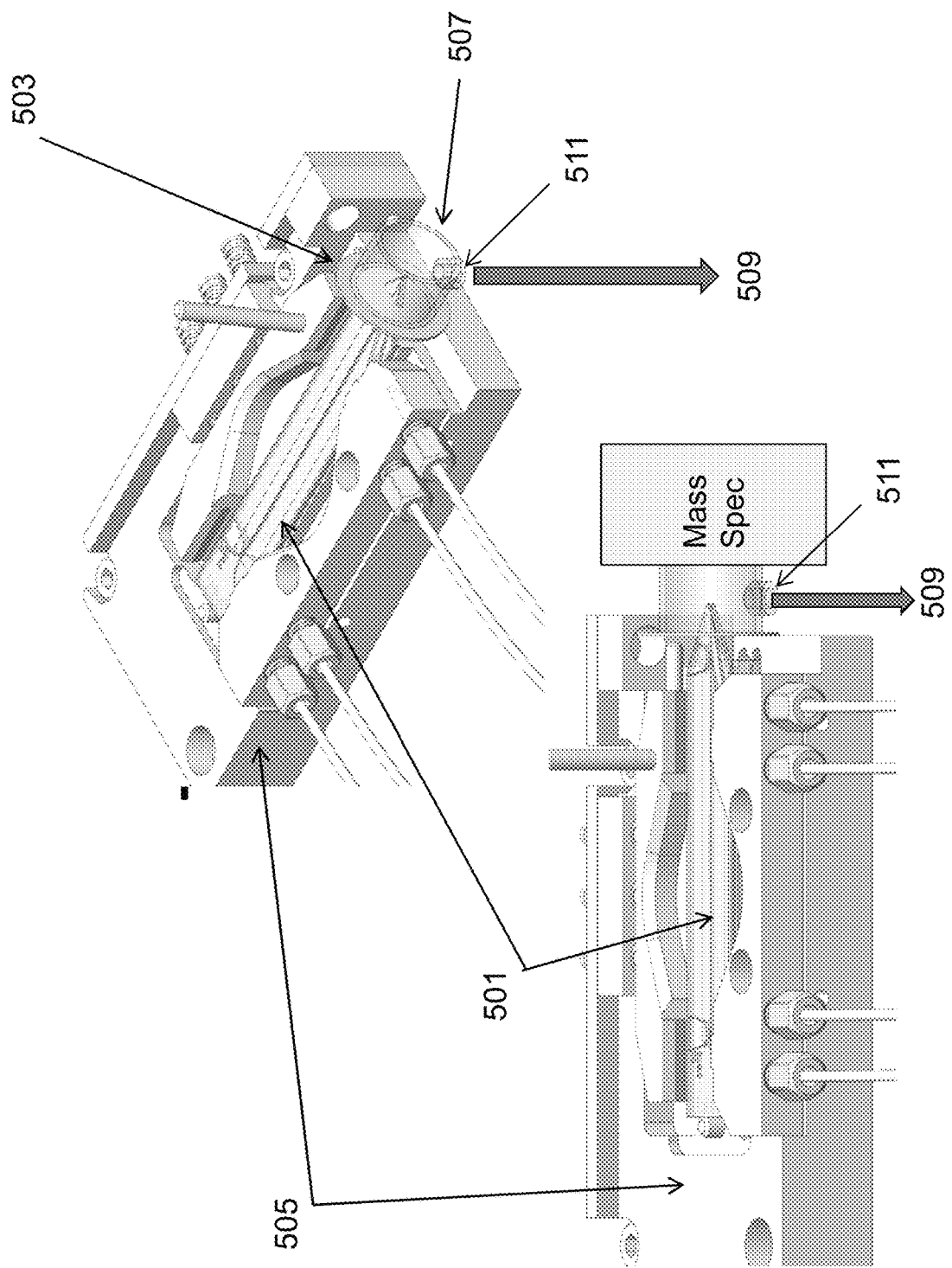
FIG. 5 provides a schematic of another example waste management system.

FIG. 5 provides a schematic of another example waste management system. Similar to the example shown in FIG. 4, the waste management system may be used to direct waste away from the microfluidic device 501 and/or to prevent wicking of droplets to another portion of the device 501. The device 501 may be coupled to a stage 505. In some cases, the microfluidic device 501 may be inserted into a cartridge, which may then couple to the stage 505. The stage and/or cartridge may comprise tubing and attachments to connect fluidically and/or electrically to the device 501. The waste management system may comprise a vacuum apparatus 507. The vacuum apparatus 507 may be shaped like a cylinder and may be configured to apply a vacuum to the tip of the device 501. In some instances, the apparatus 507 may be configured to attach to a portion of the device 501 using an adaptor, such as a flange 503. The flange 503 may comprise a slit through which a portion of the device 501 (schematically illustrated as a pointed tip) may fit. The vacuum apparatus 507 may be used to apply the vacuum 509 and direct the waste products to a waste receptacle. For example, the vacuum apparatus 507 may be placed between the chip (e.g., interfaced using a flange 503) and a mass spectrometer, and the vacuum apparatus 507 may comprise an opening module, e.g., vacuum tunnel 511 that directs waste products away from the device 501, such that the waste product does not reach the mass spectrometer. The vacuum 509 may be applied to the vacuum apparatus 507 and may aspirate droplets as the droplets exit the device 501. In some instances, the vacuum apparatus 507 may be transparent, such that one or more imaging systems, as described herein, may be used to image the electrospray tip.

Figure 6:
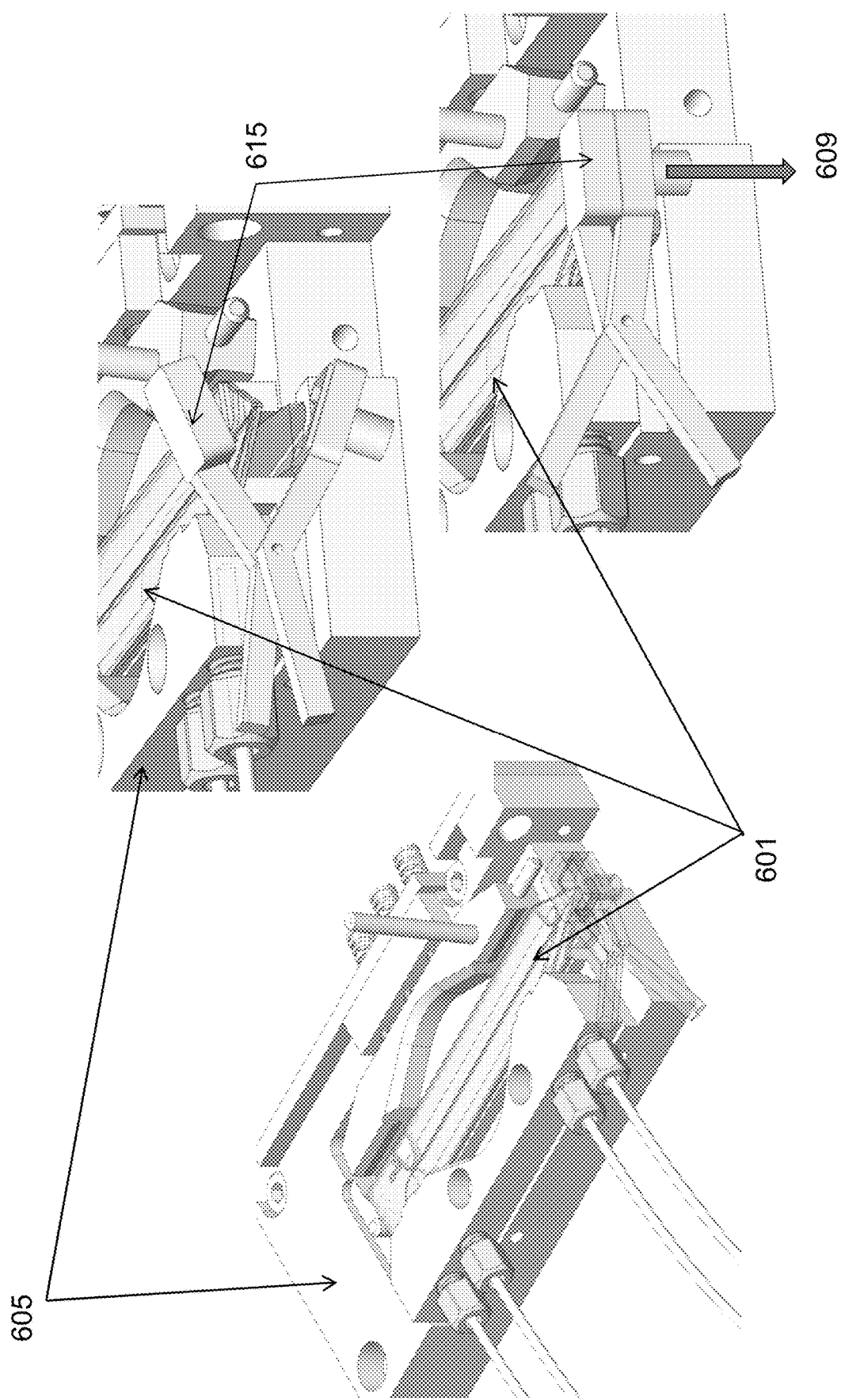
FIG. 6 schematically shows another example of a waste management system comprising a clamp module.
Figure 7:
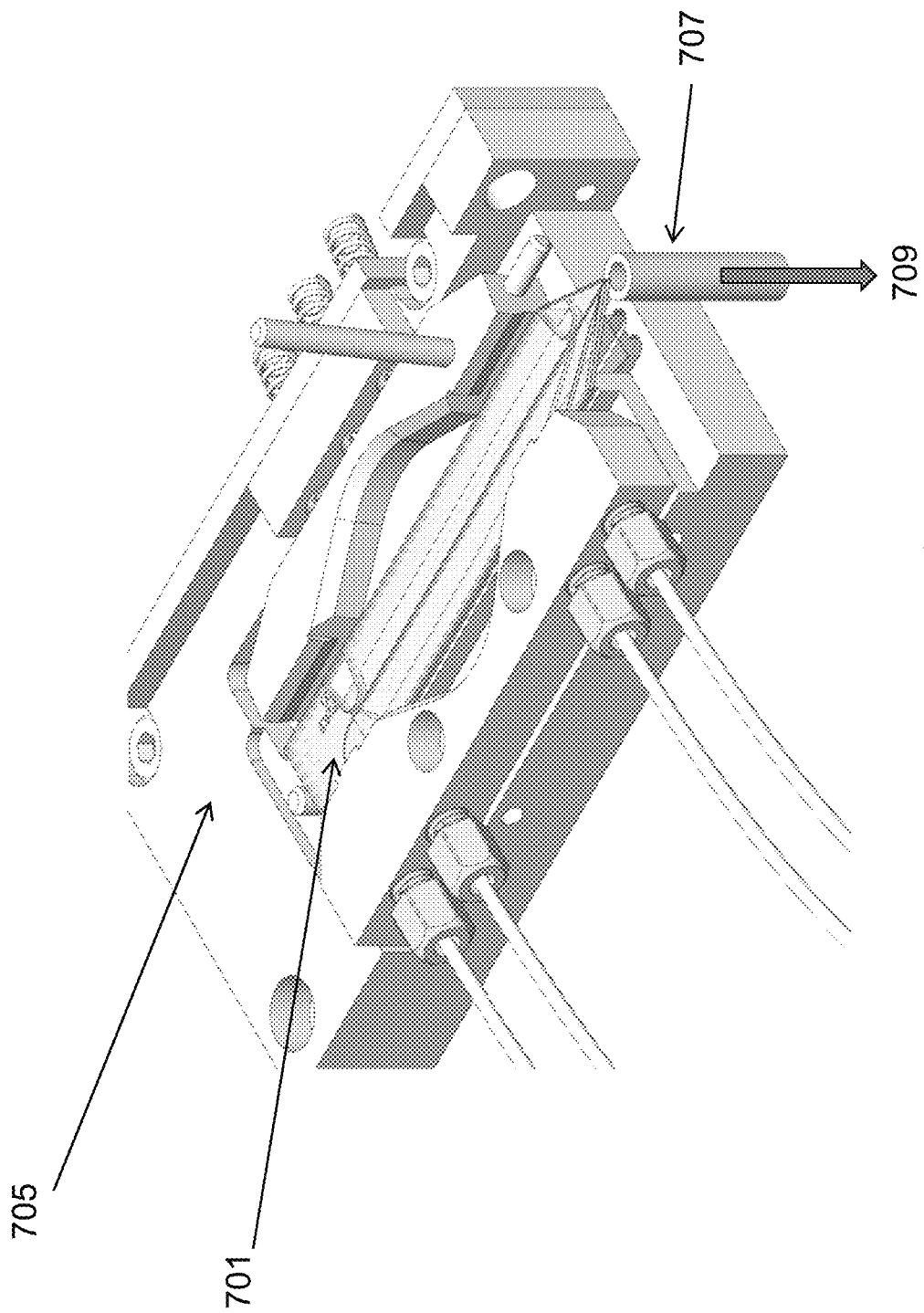
FIG. 7 schematically shows another example of a waste management system comprising a tube vacuum apparatus.

In another embodiment, the vacuum may be applied through a modular device that may be configured to attach to a vacuum. For example, FIG. 6 schematically shows another example of a waste management system comprising a clamp module 615. The clamp may be secured to the device 601, and a vacuum 609 may be applied to the clamp device 615, thereby directing waste products away from the microfluidic device. In some instances, the device 601 may be coupled to the stage 605 or inserted into a cartridge which may couple to the stage 605. In another example, FIG. 7 schematically shows another example of a waste management system comprising a tube vacuum apparatus 707. The tube may be positioned near the device 701, thereby directing waste products away from the microfluidic device 701. A vacuum 709 may be applied to the tube vacuum apparatus 707 to direct the waste products away from the microfluidic device. In some instances, the tube may be positioned substantially orthogonal to the device 701, such that waste products can be directed away from the microfluidic device without interfering with a downstream analysis unit, e.g., mass spectrometer. The device 701 may be coupled to or positioned on a stage 705.

Example 5—Waste Management Using Positive Pressure

Figure 8:
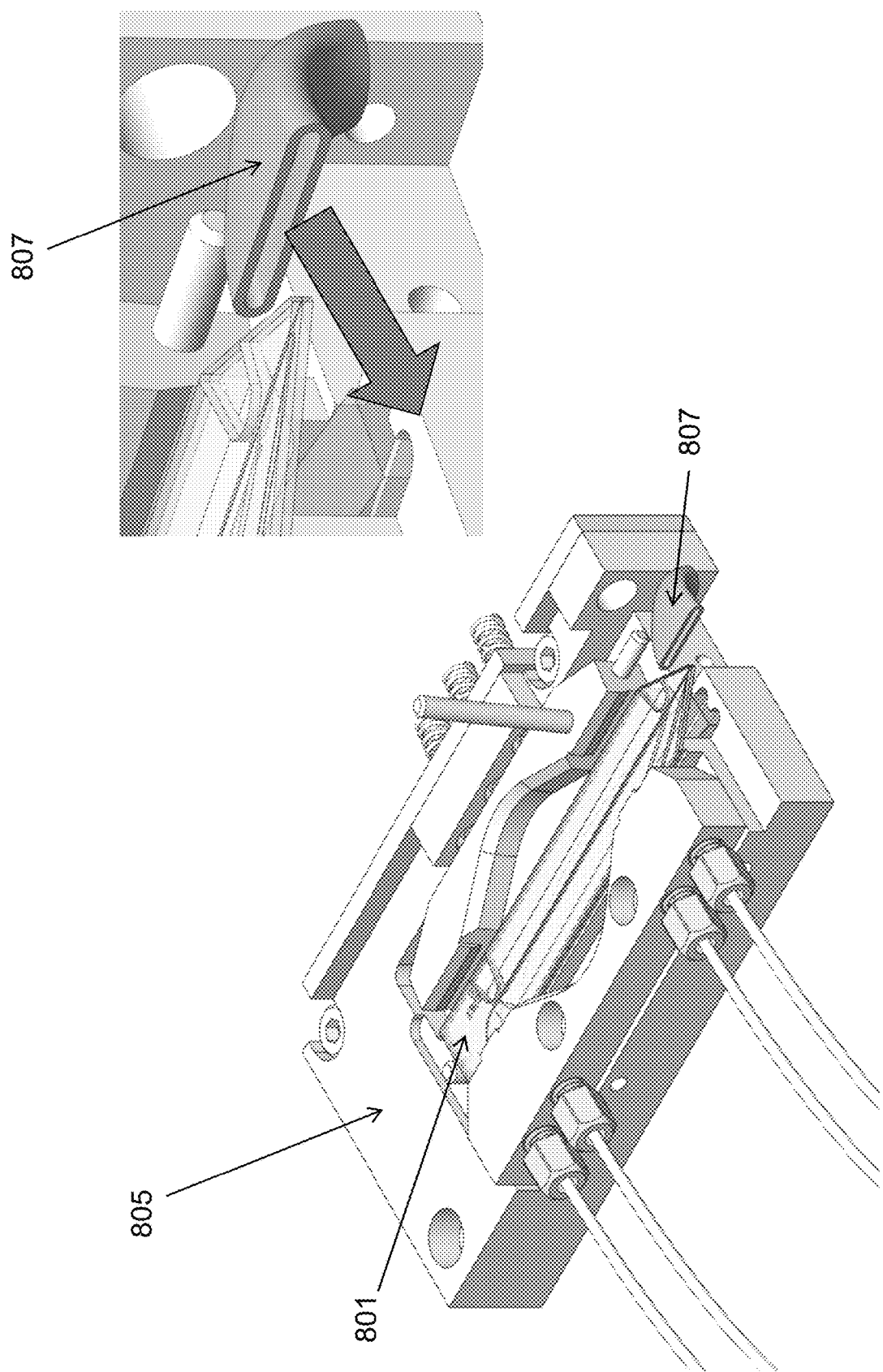
FIG. 8 schematically shows another example of a waste management system using positive pressure.
Figure 9:
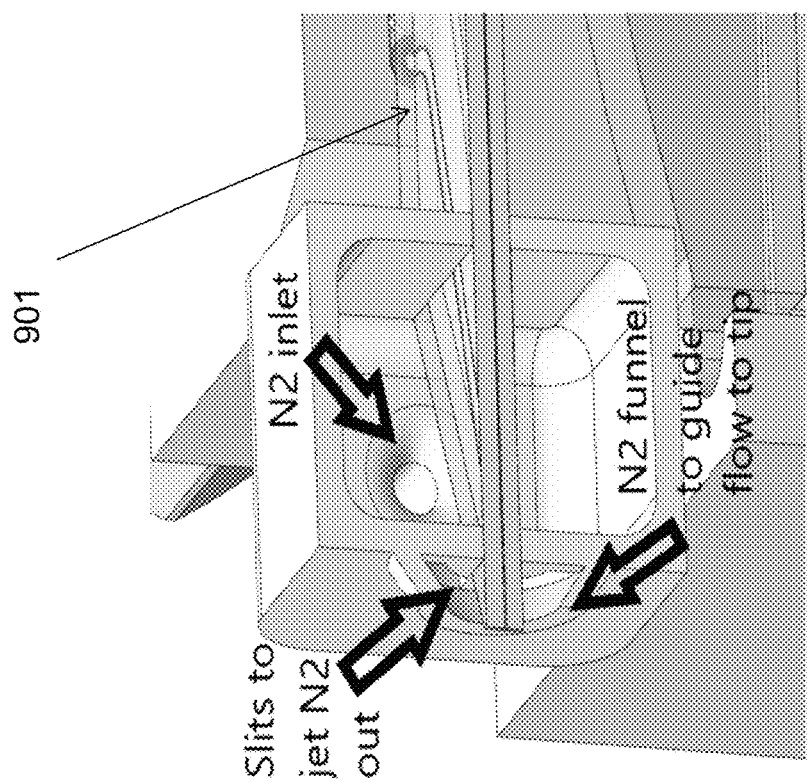
FIG. 9 schematically illustrates an example nebulizer.
Figure 9:
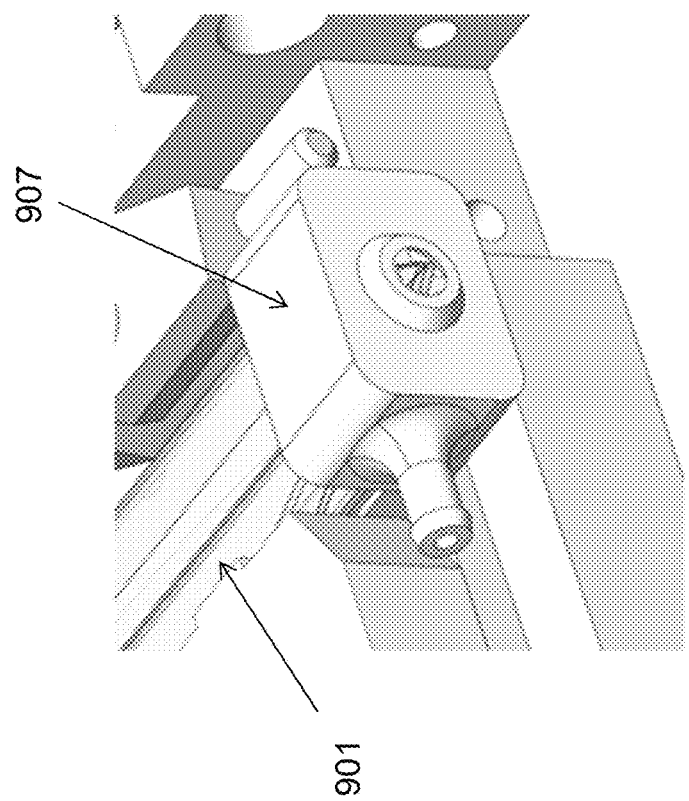
Figure 10B:
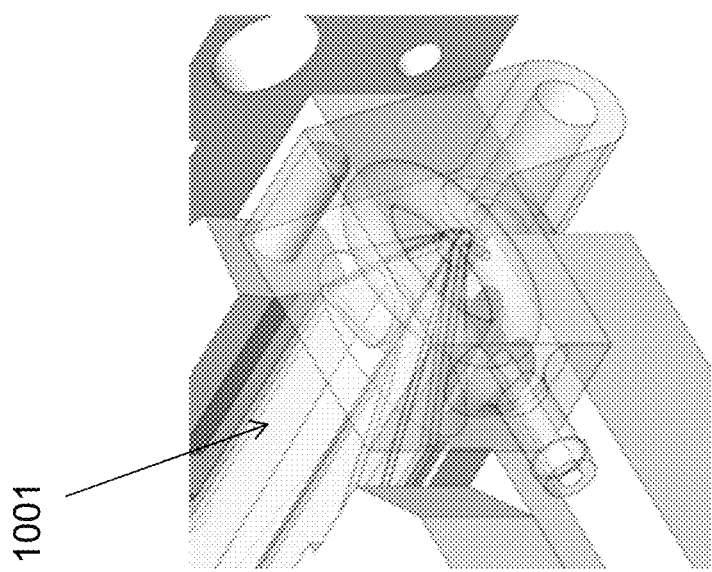
FIGS. 10A-D schematically illustrate additional non-limiting examples of a nebulizer.
Figure 10A:
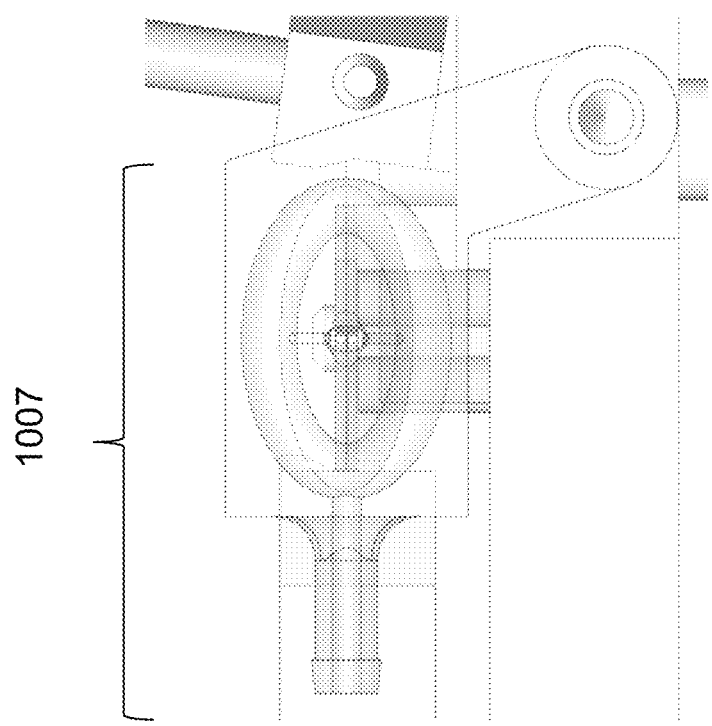
Figure 10D:
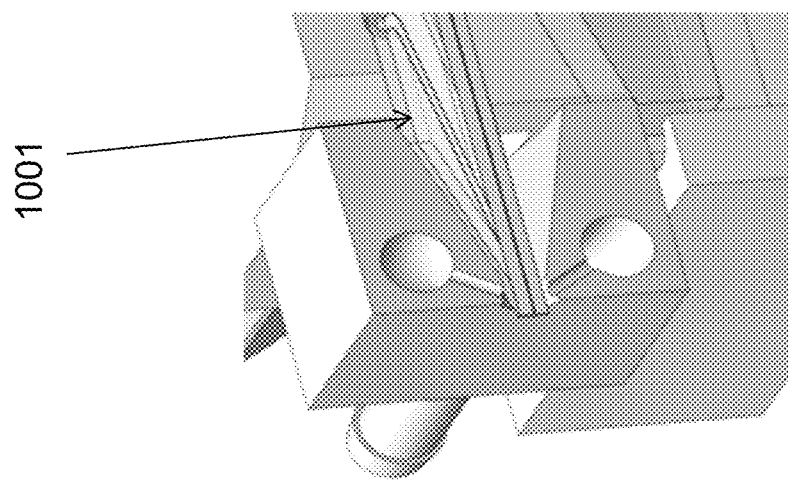
Figure 10C:
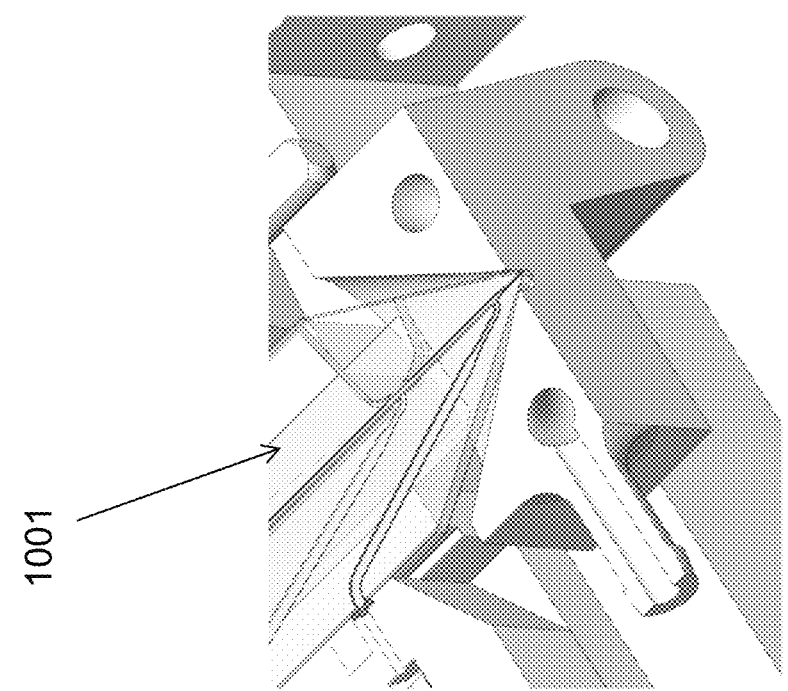
Figure 11B:
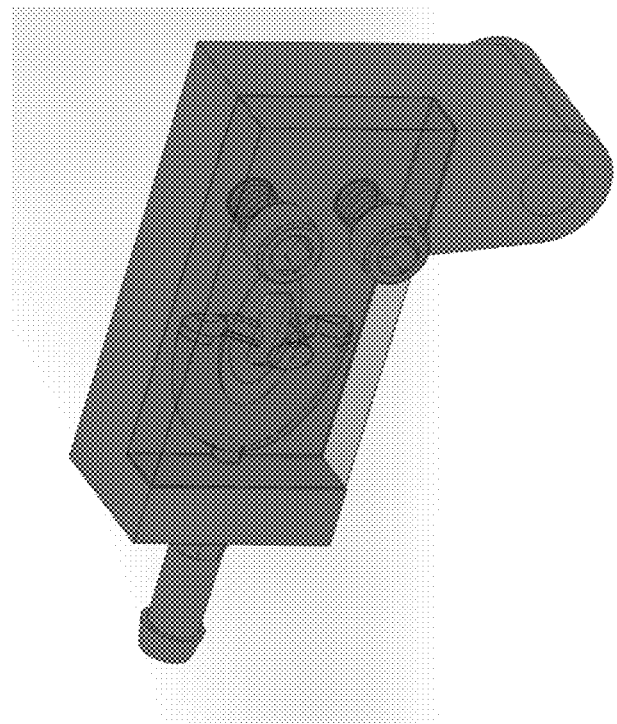
FIGS. 11A-D schematically illustrate a fourth example of a nebulizer design.
Figure 11A:
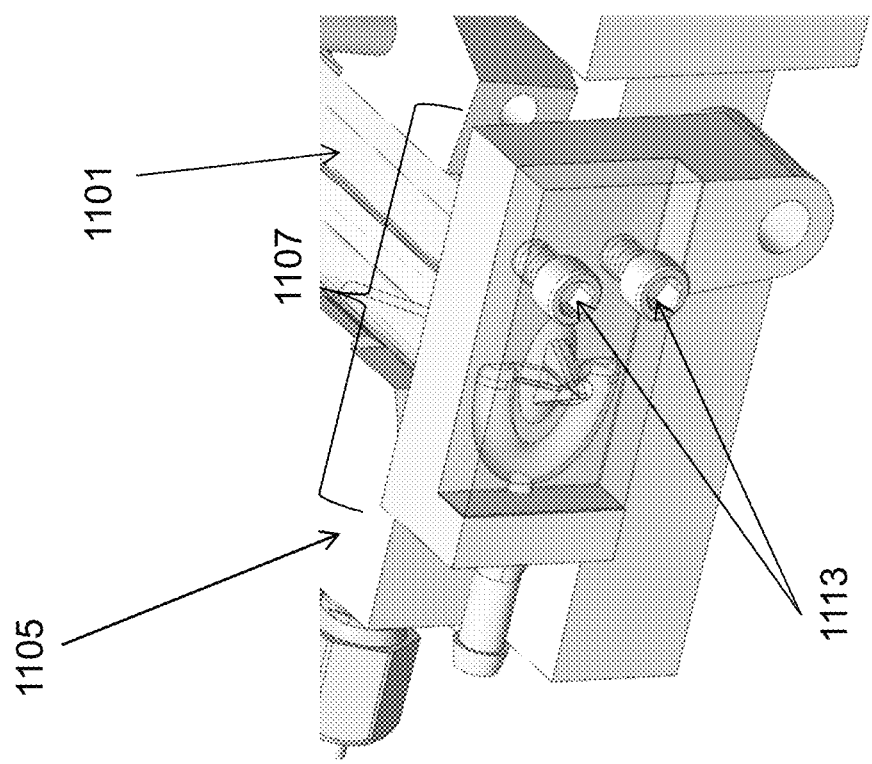
Figure 11D:
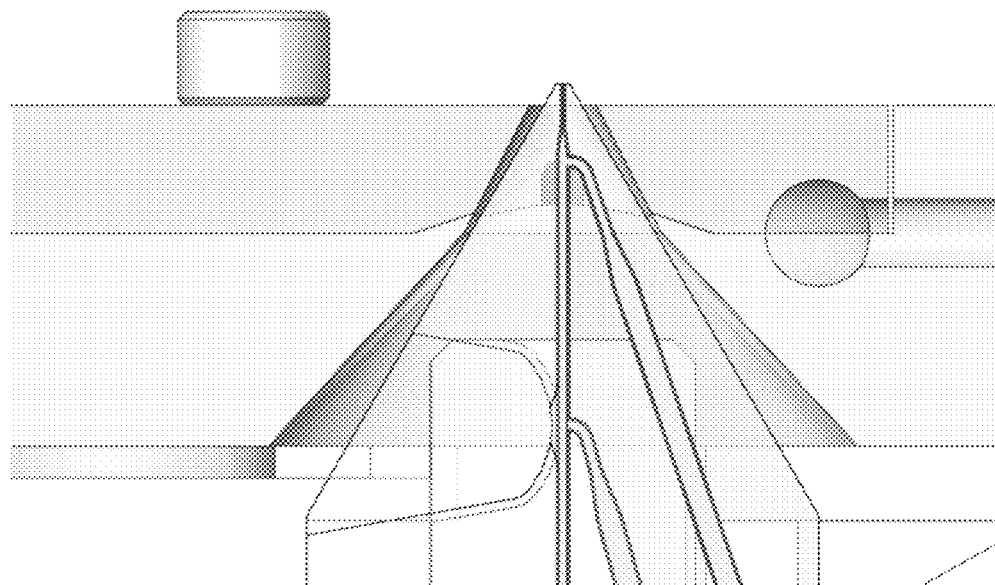
Figure 11C:
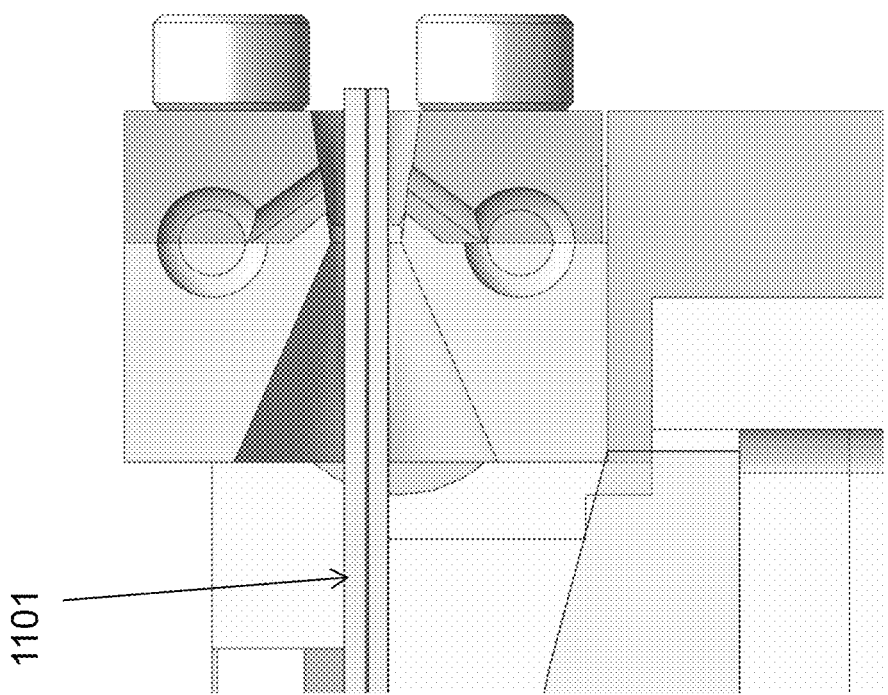
Figure 12:
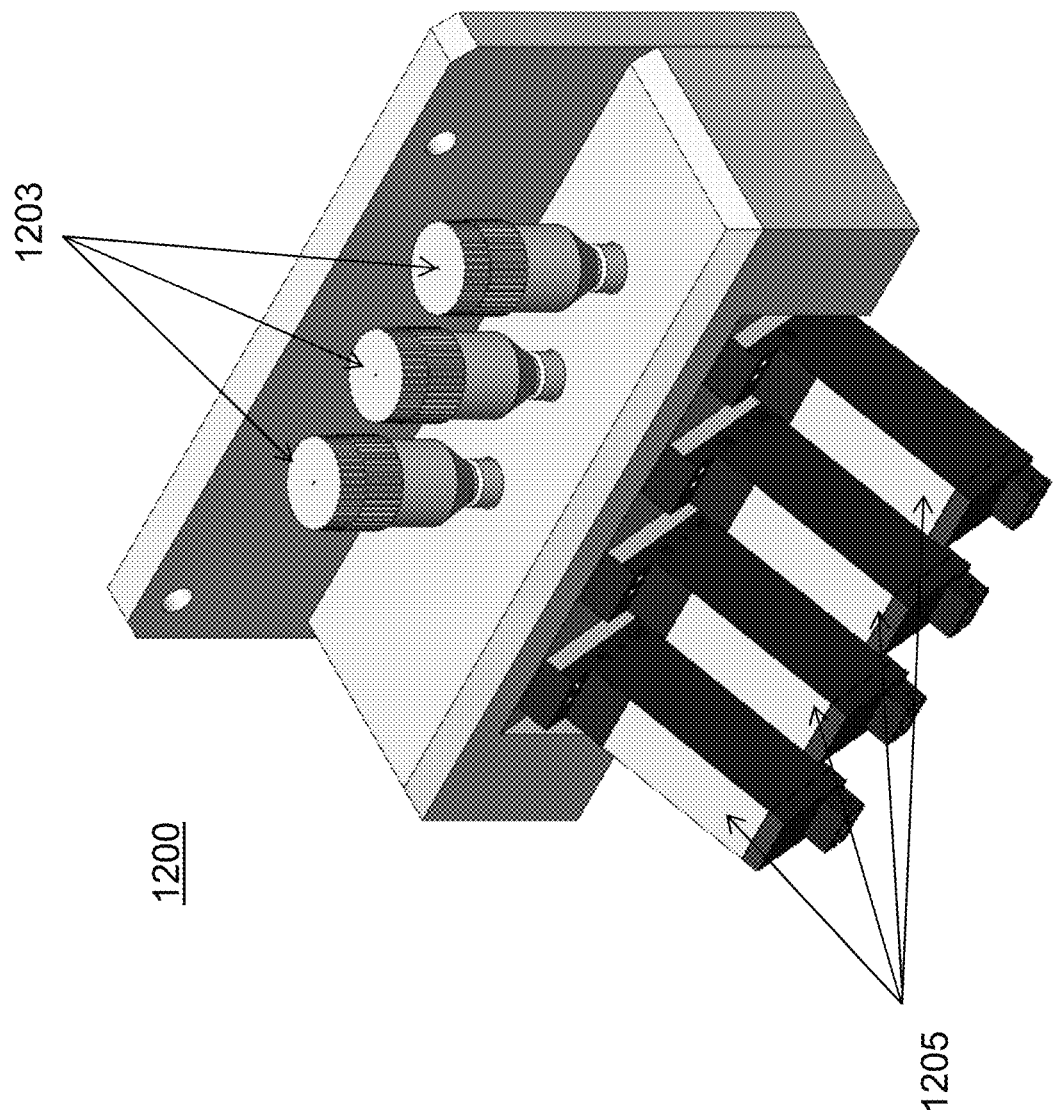
FIG. 12 schematically illustrates an example of a fixture.
Figure 13D:
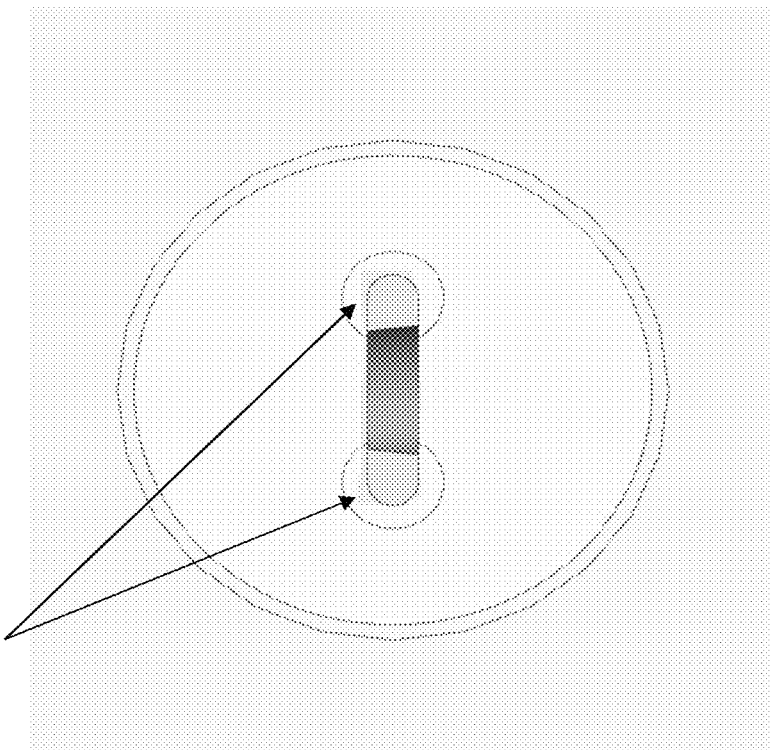
Figure 13C:
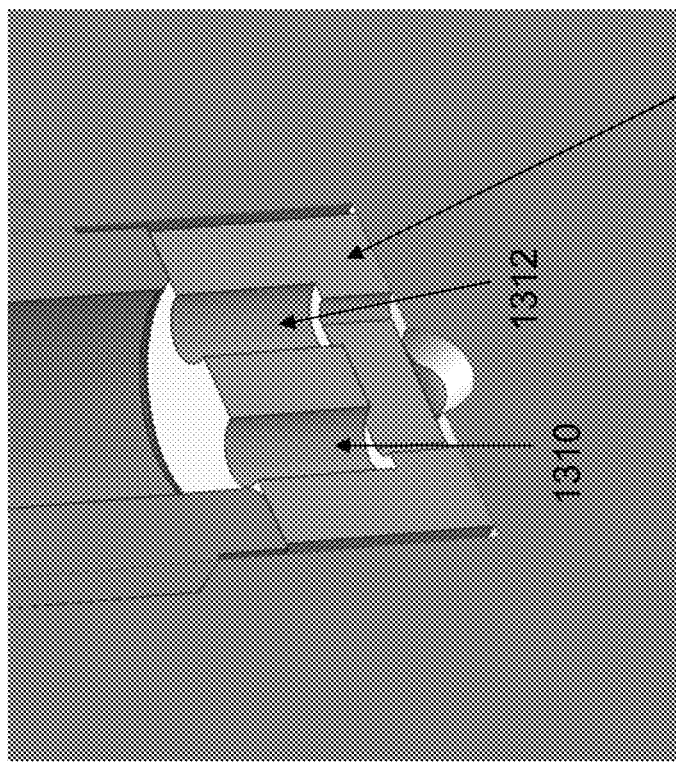
Figure 13F:
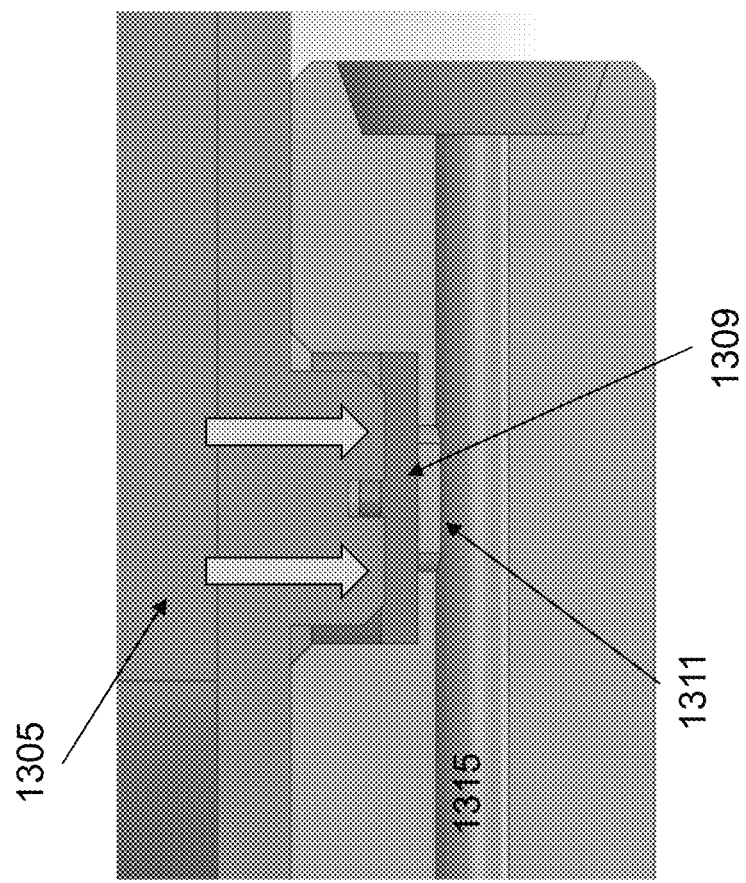
Figure 13E:
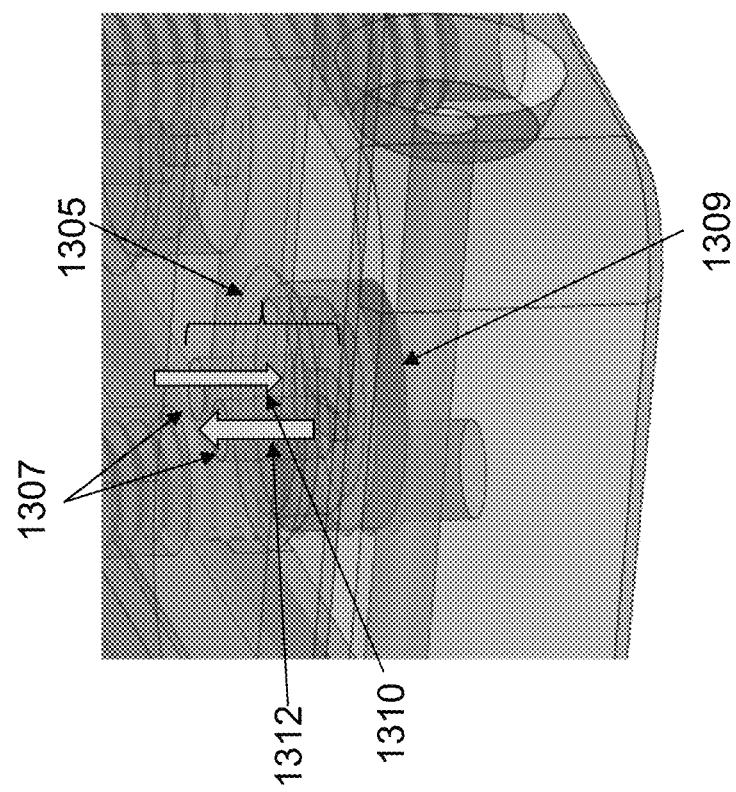
Figure 14:
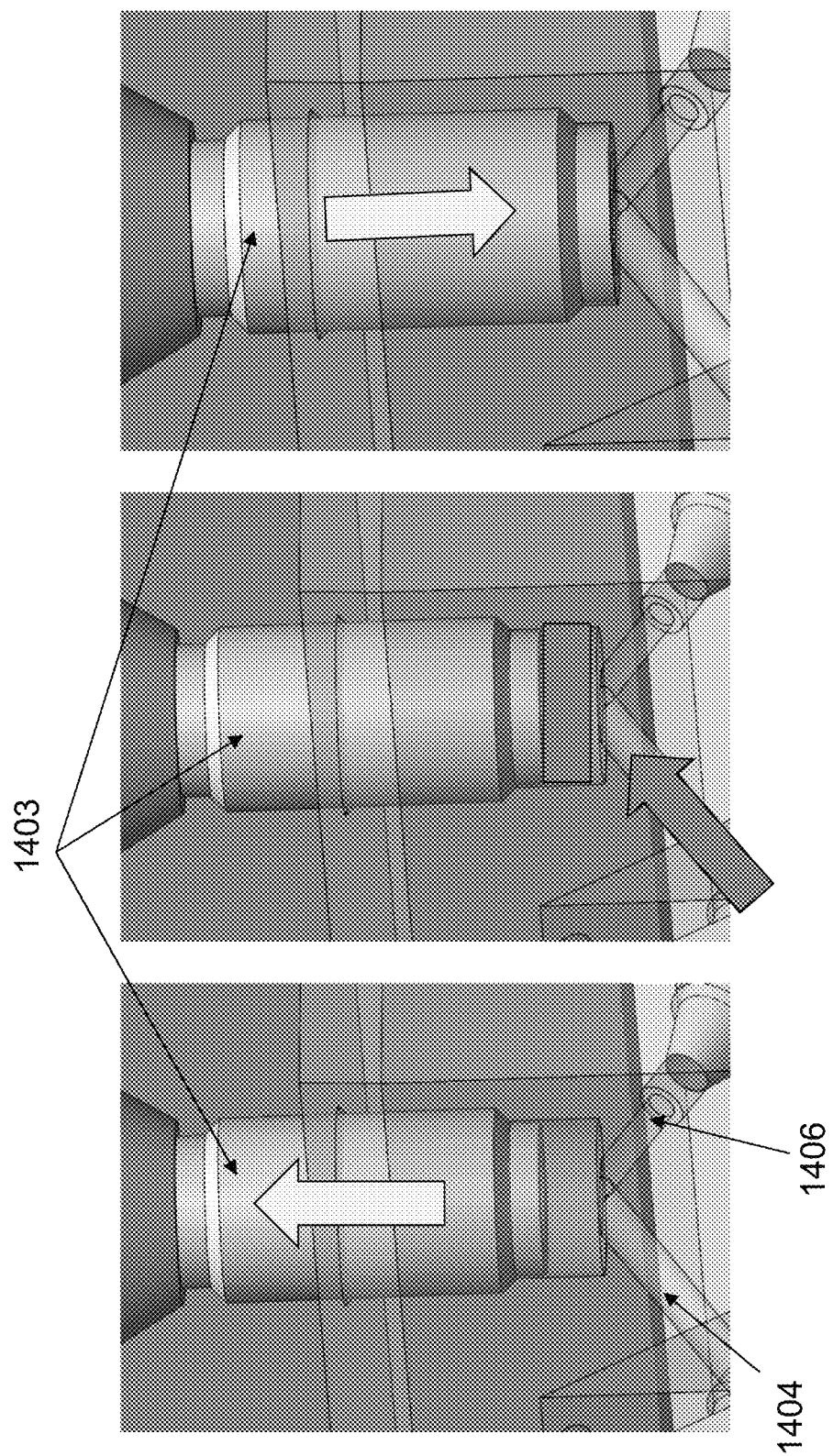
FIG. 14 schematically illustrates an example method of providing reagents to one or more reservoirs of a system.

In some instances, the waste management module may comprise the use of positive pressure. For example, in FIG. 8, an air knife 807 may be used to direct droplets away from the device 801. In such an example, the air knife 807 may be connected to an air source and/or pressurizer to generate air pressure to eject the droplets or direct the droplets away from the device 801. In some instances, the system may further comprise a vacuum unit (not shown), which may be used to collect the droplets that are directed away from the device 801. Similar to FIGS. 4-7, the device 801 may be coupled to a stage 805 or may be coupled to a cartridge which may couple to the stage 805.

In some instances, the waste management module may comprise a nebulizing unit. For example a nebulizer may be configured to secure to the chip. The nebulizer may comprise geometries necessary to direct air towards the chip such that the droplets or waste products are directed away from the electrospray tip or outlet (e.g., to a waste receptacle).

FIG. 9 schematically illustrates an example nebulizer 907 that may be configured to couple or secure to a device 901. The nebulizer 907 may comprise a chamber and an inlet that may direct air or nitrogen gas inside the nebulizer 907. The nebulizer may additionally comprise slits to direct the air or nitrogen gas out of the nebulizer (e.g., via a nozzle, funnel, etc.). The nebulizer may be configured to direct air or nitrogen towards an outlet of the device 901 and thereby direct waste products away from the device 901. In some embodiments, the nebulizer 907 may be used to aerosolize the waste products.

FIGS. 10A-D schematically illustrate additional examples of designs for nebulizer 1007. The nebulizer 1007 may be configured to couple to or secure to a device 1001. Similar to FIG. 9, the nebulizer 1007 may comprise a chamber and an inlet that may direct air or nitrogen gas inside the nebulizer 1007. The nebulizer may additionally comprise slits to direct the air or nitrogen gas out of the nebulizer (e.g., via a nozzle, funnel, etc.). The nebulizer may be configured to direct air towards an outlet of the device 1001 and thereby direct waste products away from the device 1001. In some embodiments, the nebulizer 1007 may be used to aerosolize the waste products.

FIGS. 11A-D schematically illustrate another example nebulizer 1107. The nebulizer 1107 may be configured to couple to or secure to a device 1101. Similar to FIGS. 9-10, the nebulizer 1107 may comprise a chamber and an inlet that may direct air or nitrogen gas inside the nebulizer 1107. The nebulizer may additionally comprise slits to direct the air or nitrogen gas out of the nebulizer (e.g., via a nozzle, funnel, etc.). The nebulizer may be configured to direct air towards an outlet of the device 1101 and thereby direct waste products away from the device 1101. In some embodiments, the nebulizer 1107 may be used to aerosolize the waste products. The nebulizer 1107 may also comprise fasteners 1113, e.g., screws, to secure the nebulizer 1107 to the stage 1105, or in certain embodiments, to the cartridge (not shown).

Example 6—Fixture (Electrode Interfacing Unit) with Membrane

FIG. 12 schematically illustrates an example of a fixture 1200, such as those described herein. The fixture 1200 may be configured to interface one or more electrodes with one or more components of the system (e.g., one or more inlets of the microfluidic device). The electrodes may be configured to interface with a plurality of reservoirs 1203, which may be in fluid and electrical communication with the device or a cartridge via connections through valves 1205 comprising the device. The reservoirs 1203 may comprise reagents and/or buffers for use in the separation and/or mobilization reactions. In some instances, the fixture 1200 may comprise one or more membranes (not shown) that allow for electrical communication of the electrode and the microfluidic device or the cartridge via connections through valves 1205. For instance, the membrane may be positioned at the bottom of each reservoir 1203, which can allow for fluidic and electrical communication of the reservoirs and electrodes to the device or cartridge via connections through valves 1205 and reduce the incidence of bubble formation at the interface of the reservoirs and the device or cartridge via connections through valves 1205.

In some instances, the geometry of the fixture may be configured to position the membrane to establish fluidic and/or electrical communication with the microfluidic device. FIGS. 13A-F schematically illustrate a portion of the fixture 1300 comprising a membrane (not shown). In FIG. 13A, the portion of the fixture 1300 may comprise an insert, e.g., U-shaped structure 1305 which may be connected to the reservoir 1303 and allow fluid and electrical communication with the membrane and the microfluidic device (not shown). The fixture 1300 comprises an inlet fluid channel 1304 that is fluidically coupled to an outlet fluid channel 1306, which is coupled to a separation channel (not shown). The inlet fluid channel 1304 and the outlet fluid channel 1306 intersect at a plane 1308 that defines or is parallel to a surface of the reservoir 1303. At or adjacent to the plane 1308, a membrane (not shown) may be positioned. The membrane may cover all or substantially all of an opening comprising the intersection (e.g., plane 1308) of the inlet fluid channel 1304 and the outlet fluid channel 1306.

FIG. 13B illustrates schematically a view of the bottom of the portion of the fixture where the membrane may be positioned. FIG. 13C provides a cross section view of the insert comprising the U-shaped structure 1305. The U-shaped structure 1305 of the insert comprises an inlet fluid path 1310 and an outlet fluid path 1312, which may facilitate substantially bubble-free wetting of the membrane. FIG. 13D provides a schematic of the view of the bottom of the portion of the fixture. The membrane may fluidically and/or electrically connect two ports 1307, which may be connected (e.g., via the fluid inlet path 1310 and/or the fluid outlet path 1312) to the reservoir 1303 of fixture 1300. FIG. 13E provides another view of the U-shaped structure 1305. The U-shaped structure 1305 may comprise or be coupled to a membrane 1309. Fluidic and electrical communication with the reservoir 1303 and the membrane 1309 may be established using ports 1307 via the inlet fluid path 1310 and/or the outlet fluid path 1312. FIG. 13F illustrates another view of the U-shaped structure 1305. The membrane 1309 may be coupled to or connected to a port 1311 which may be connected to a channel 1315. Channel 1315 may comprise, in some instances, an inlet fluid channel (the region leading up to the U-shaped structure) and an outlet fluid channel (the region following the U-shaped structure), which may connect to a microfluidic device or separation channel. The connection may establish fluidic and electric communication with the reservoir (not shown) and channel 1315.

Example 7 Reservoir Filling

FIG. 14 schematically illustrates an example method of providing reagents to one or more reservoirs 1403 of the systems described herein. The reservoirs 1403, which may be a part of the fixture (e.g., 1200 and 1300), may be filled with buffers or reagents e.g., for the separation reaction and/or the mobilization reaction. In some instances, it may be desirable to fill the reservoir from the bottom of the reservoir. Reagents and/or buffers may be introduced via an inlet fluid channel 1404. In some instances, the reservoir 1403 may be configured to move (e.g., via translation) such that the reservoir 1403 may be moved to an upwards configuration, filled, and then resealed by moving the reservoir 1403 back to the starting configuration. The outlet fluid channel 1406 may be connected fluidically and/or electrically with a device or separation channel (e.g., via a port and/or inlet or outlet fluid channels).

Figure 15:
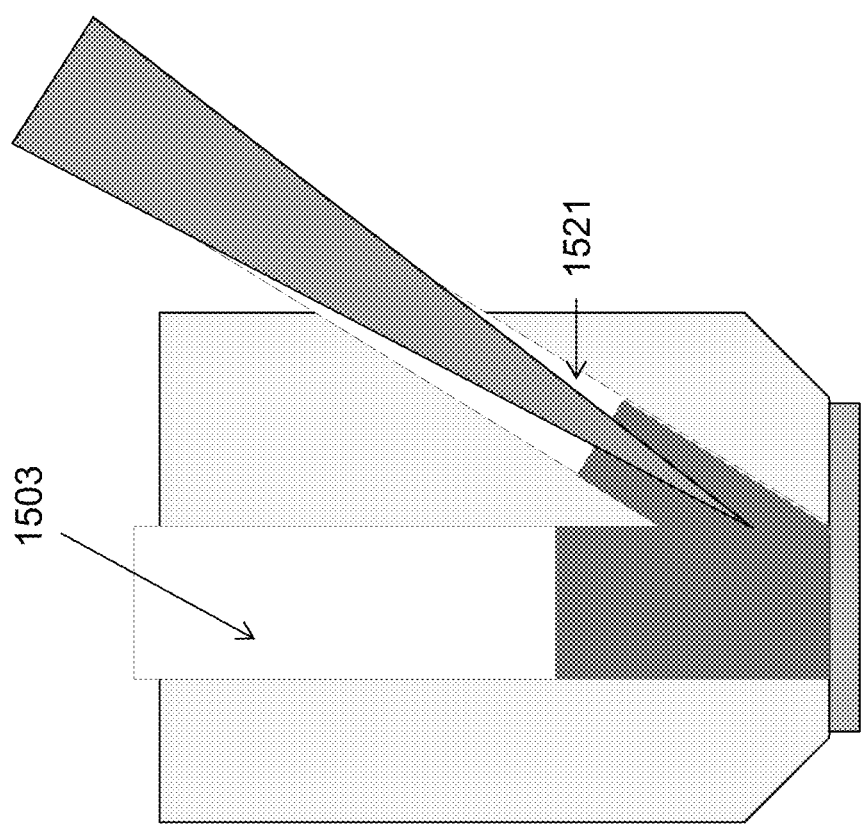
FIG. 15 illustrates schematically an example method of providing reagents to one or more reservoirs.
Figure 15:
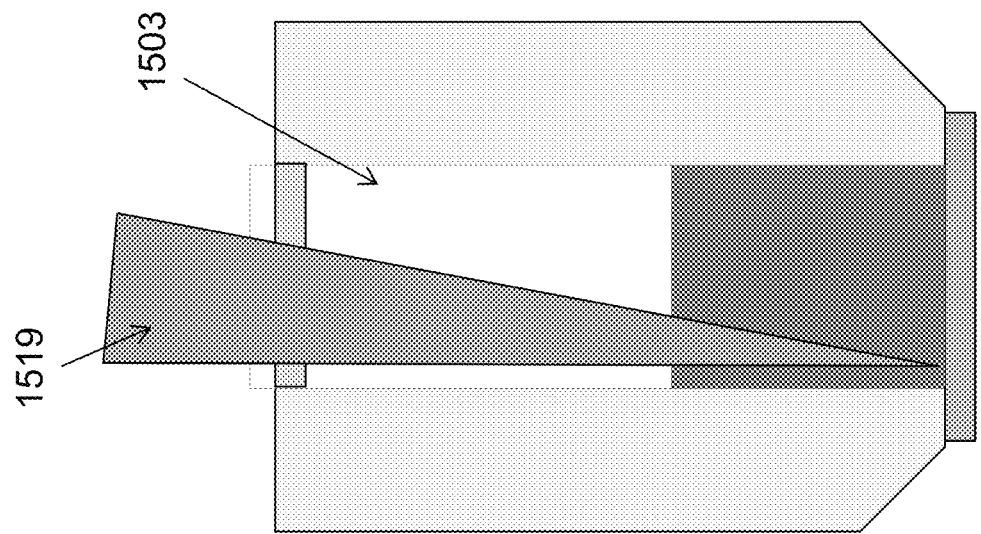

In some instances, the reservoirs may be filled using conventional methods. FIG. 15 illustrates schematically an example method of providing reagents to one or more reservoirs 1503. In such an example a pipette (e.g., a pipette, micropipette, etc.)1519 may be used to introduce buffers or reagents into the reservoir 1503. In some embodiments, the reservoir 1503 may further comprise a side port 1521. The introduction of buffers or reagents via the side port 1521 may help in prevention of trapping bubbles on top of the membrane at the bottom of the reservoir 1503.

Example 8 Cartridge Design

Figure 16:
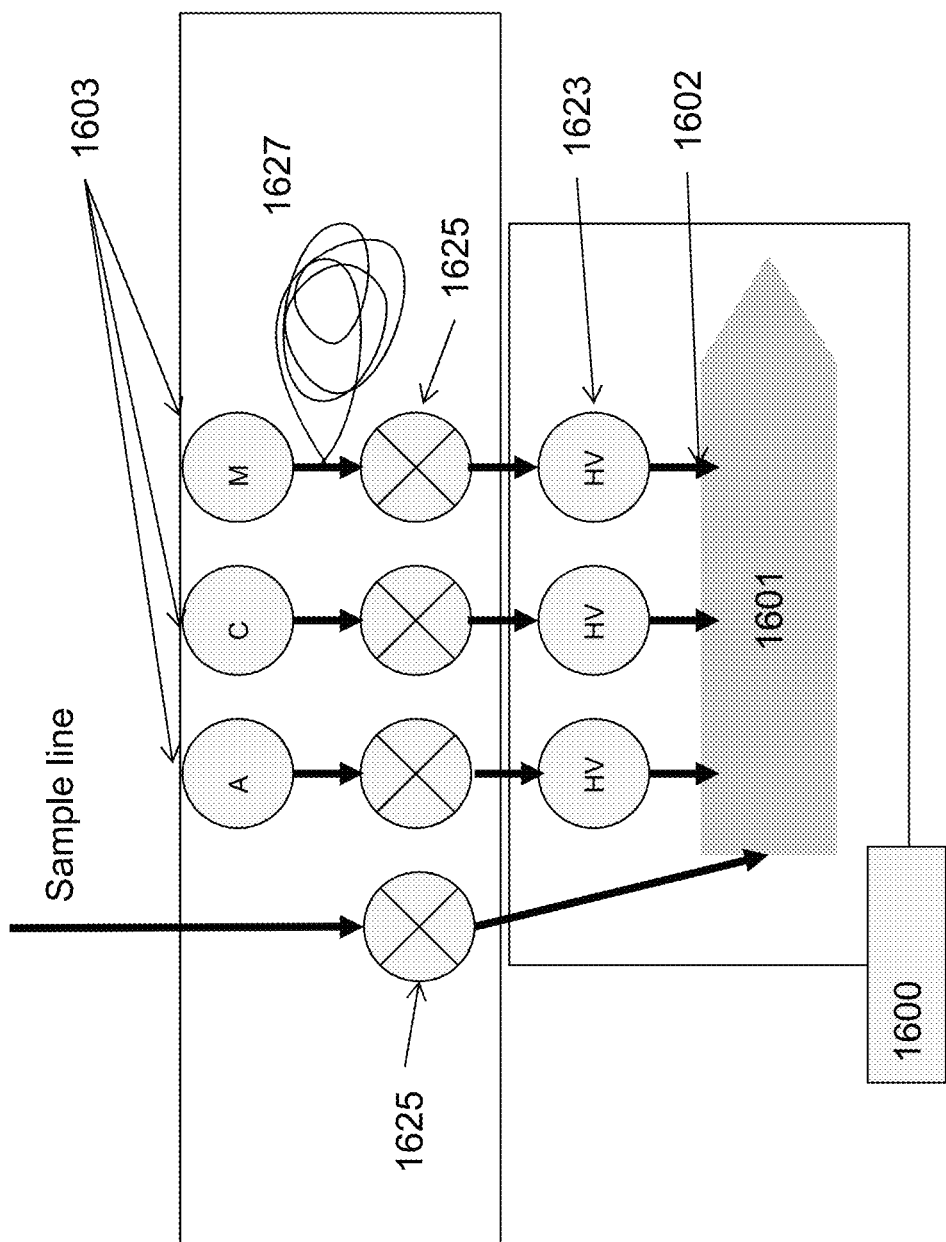
FIG. 16 schematically illustrates an example system comprising a cartridge, as described in certain embodiments herein.

FIG. 16 schematically illustrates an example system comprising a cartridge, as described in certain embodiments herein. The cartridge 1600 may comprise a microfluidic device 1601, which may comprise a plurality of inlet ports 1602. The ports 1602 may be in electrical and fluidic communication with ports 1623 which may be connected to a high voltage power supply (e.g., via electrodes connected to a high voltage power supply, which electrodes are connected to one or more reservoirs 1603). The ports may be in fluidic and electrical communication with the reservoirs 1603 comprising reagents or buffers (e.g., anolyte, catholyte, mobilization agents, and background electrolyte). The flow of the reagents or buffers from the reservoirs 1603 can be controlled using valves 1625. In some cases one or more reservoirs 1603 may also be connected to a restrictor 1627 (e.g., long tubing), which may stabilize the flow rate and/or flow profile from the reservoir 1603 to the valve 1625 to the port 1623. The reservoirs 1603 may each comprise a different reagent or buffer; for example, one reservoir may comprise the anolyte buffer, another reservoir may comprise the catholyte buffer, and yet another reservoir may comprise the mobilization buffer. The cartridge 1600 or device 1601 may also be connected to a sample line, which may be used to supply the sample to the cartridge 1600 or device 1601 via a valve 1625.

Figure 17:
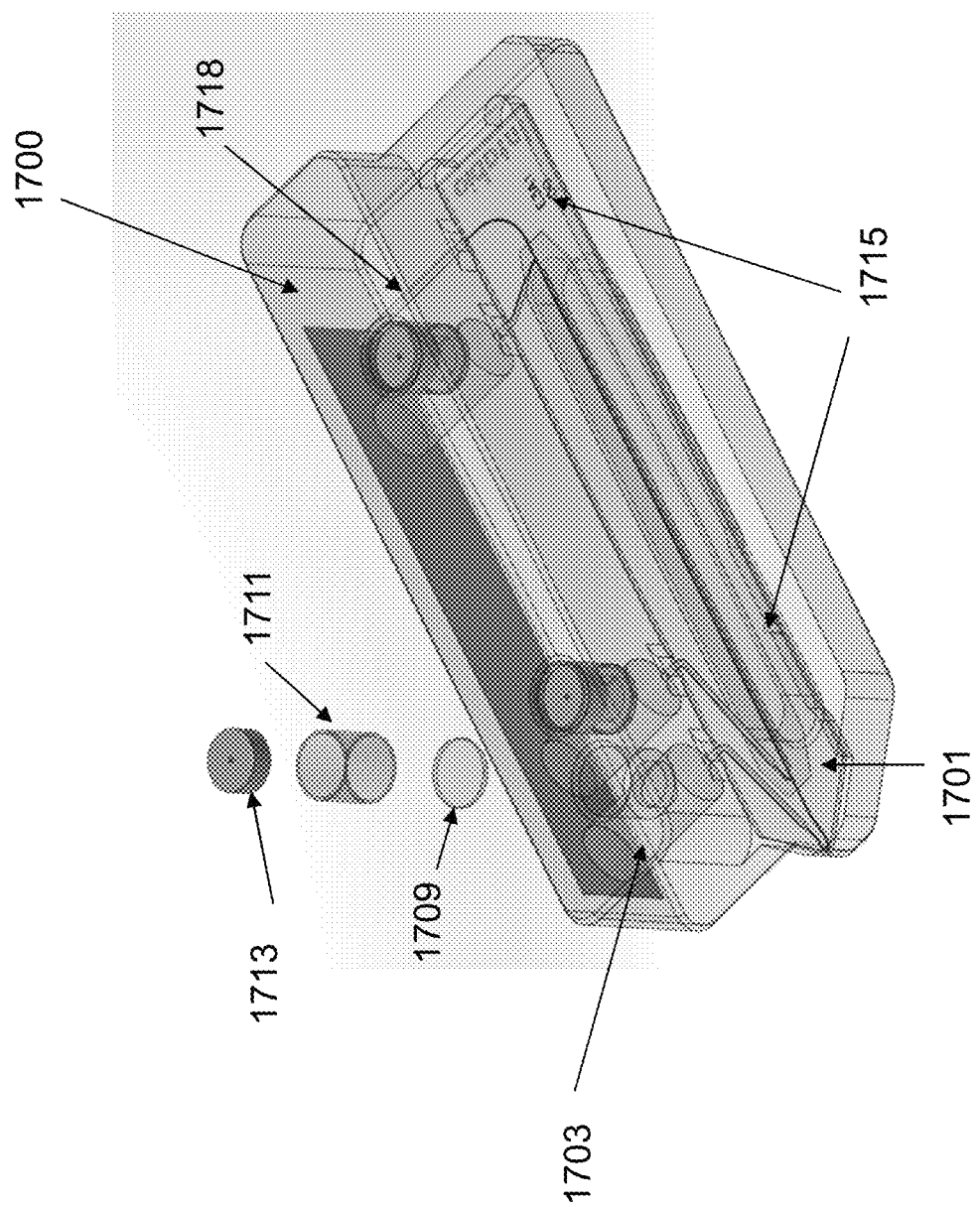
FIG. 17 shows an example embodiment of a cartridge comprising a microfluidic device of the present disclosure.
Figure 18:
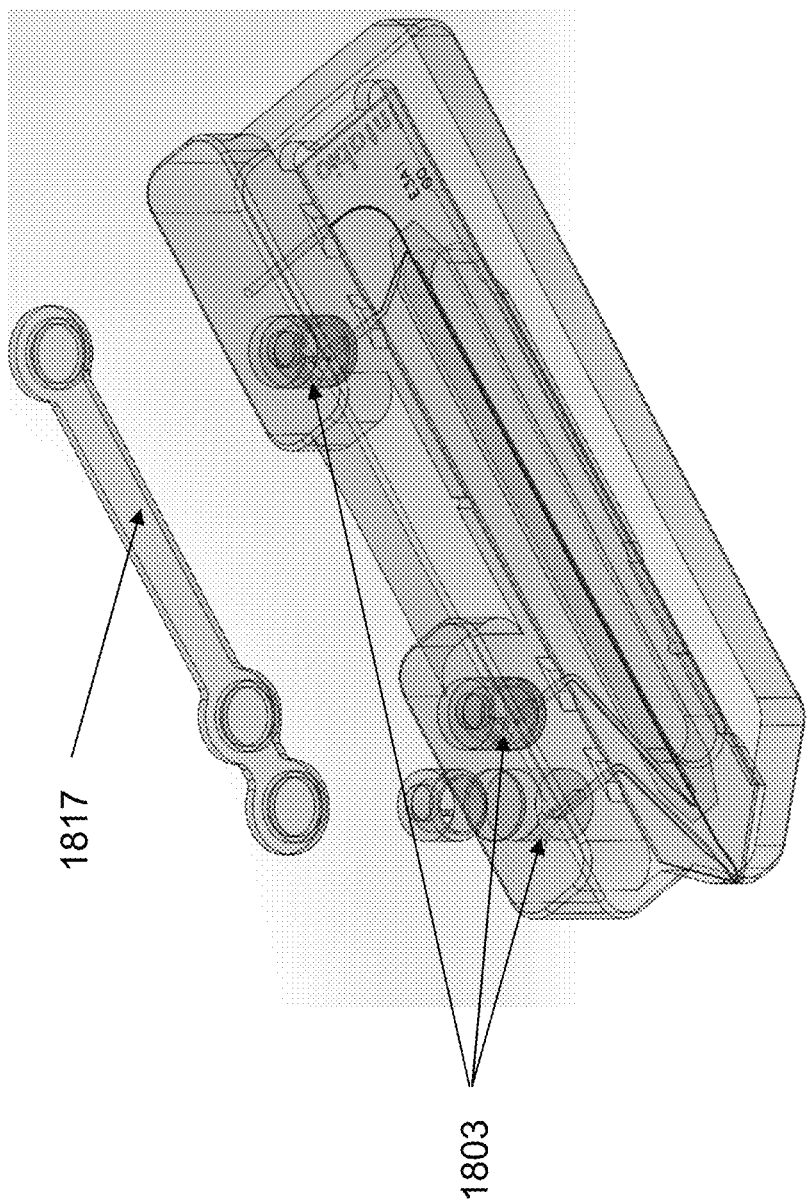
FIG. 18 shows another example embodiment of a cartridge comprising a microfluidic device of the present disclosure.
Figure 19A:
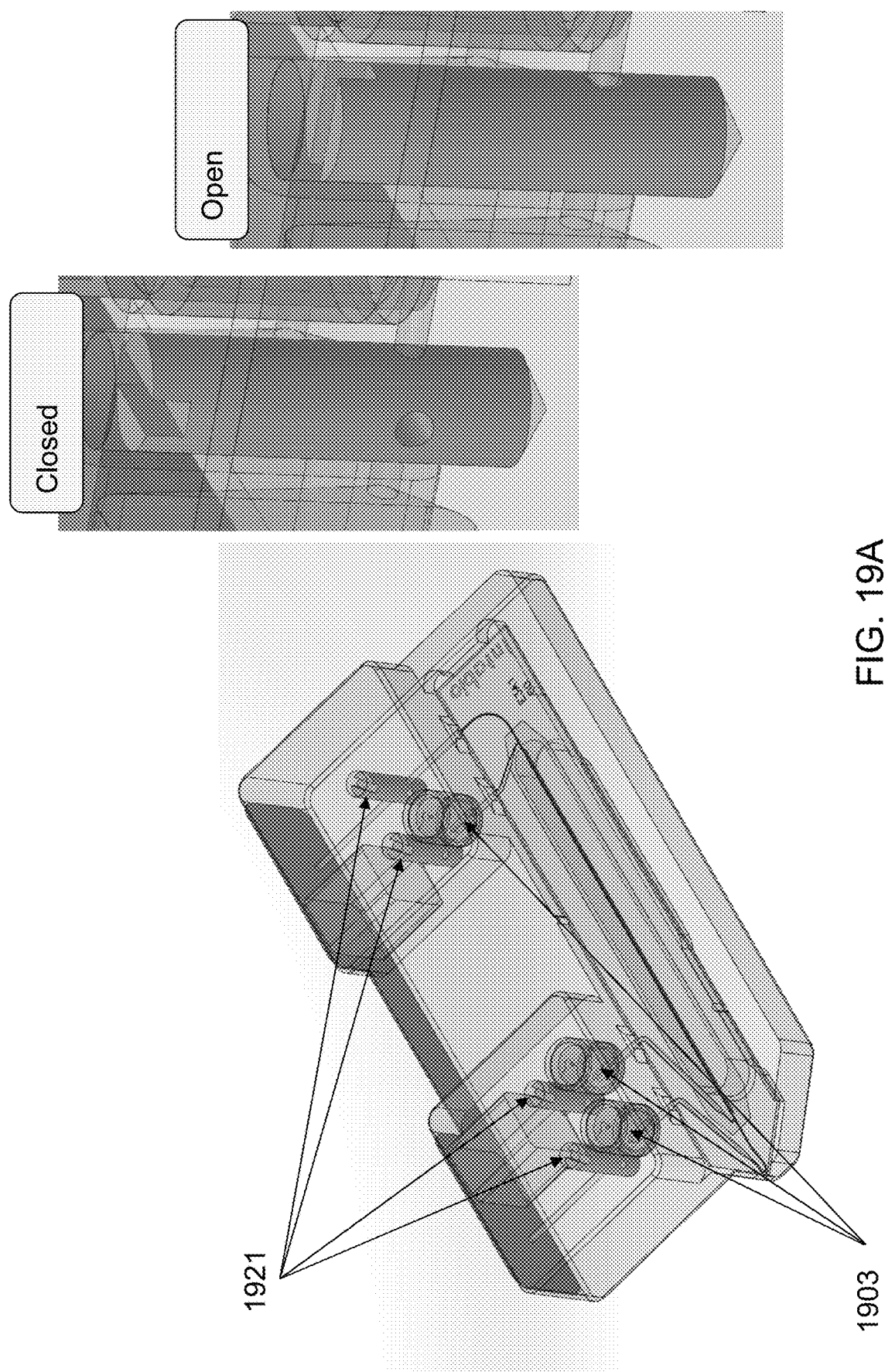
FIGS. 19A-B show additional example embodiments of a cartridge comprising a microfluidic device of the present disclosure and a shear valve.
Figure 19B:
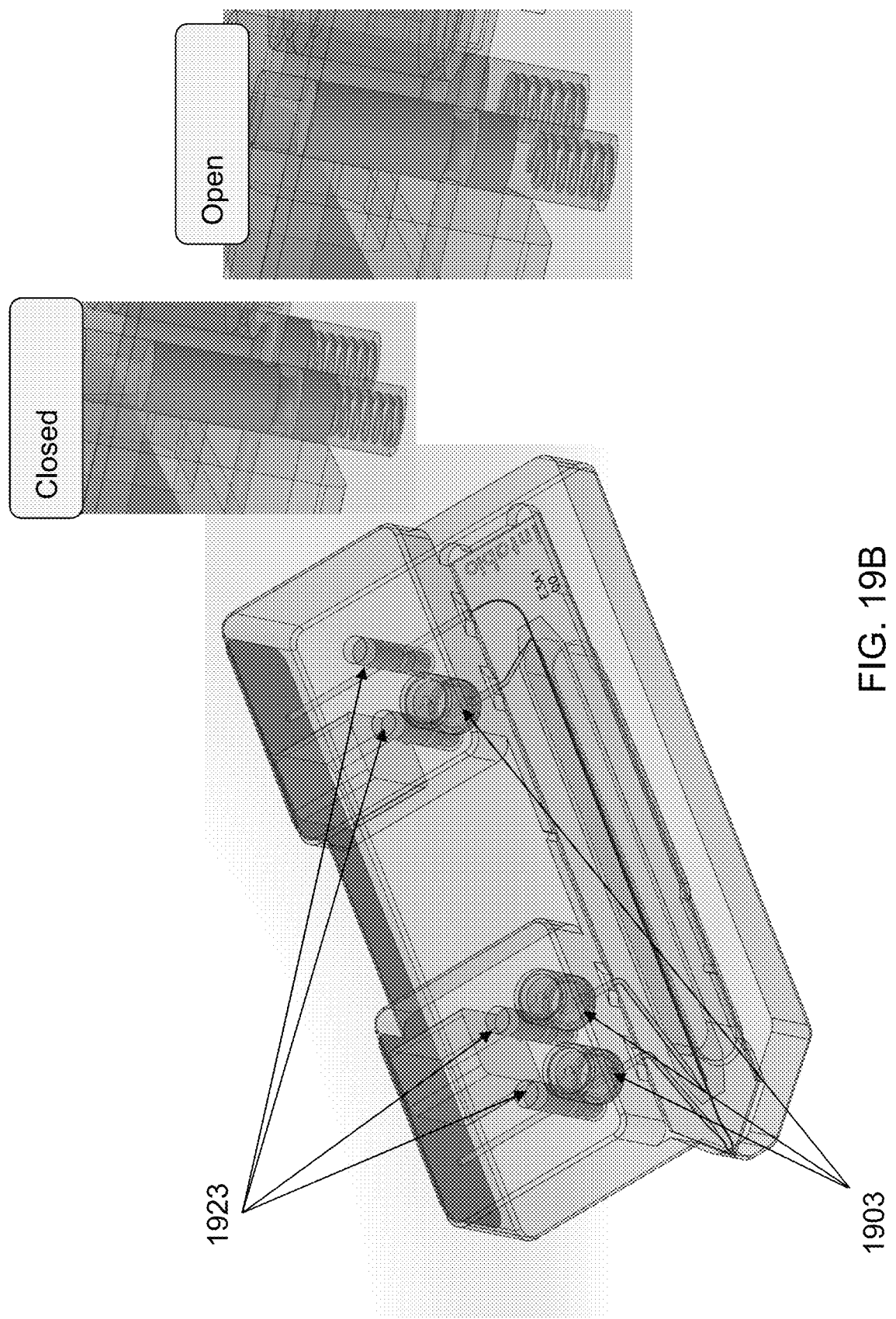
Figure 20:
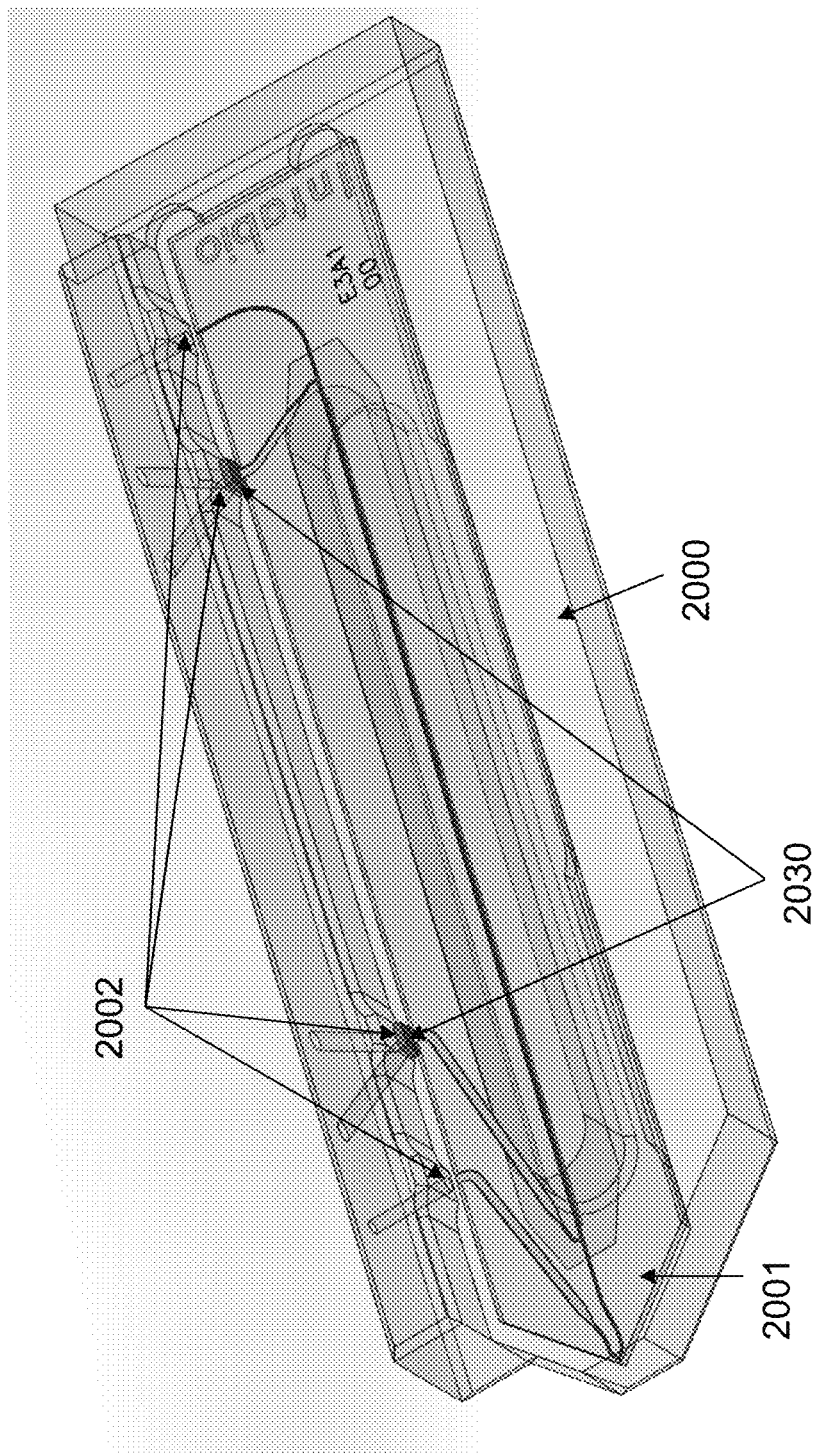
FIG. 20 shows another example embodiment of a cartridge comprising a microfluidic device of the present disclosure.

FIGS. 17-20 show example embodiments of cartridges. In FIG. 17, the cartridge 1700 may comprise reservoirs 1703 which may be coupled to a membrane 1709, a tube 1711, and a plug 1713 which may seal the reservoir and comprise a hole, for example, for insertion of an electrode or for filling the reservoirs. The cartridge 1700 may additionally comprise a channel 1718 for inserting and/or injecting the sample. The device 1701 may be secured to the cartridge 1700 using stake features 1715. FIG. 18 shows another example of a cartridge. An adaptor 1817 may be coupled to the cartridge for facile filling of the reservoirs 1803. FIGS. 19A-B show another example of a cartridge comprising valves. In FIG. 19A, a stopcock valve 1921 may be integrated with each reservoir 1903, which may allow for flow rate control. In FIG. 19B, a slider valve 1923 may be integrated with each reservoir 1903. FIG. 20 shows another example embodiment of a cartridge. The device 2001 may be secured to the cartridge 2000 and fluidically and/or electrically connected to reservoirs (not shown) and/or the sample via several ports 2002 and/or an inlet fluid channel or outlet fluid channel. Fluidic connections may be secured using gaskets 2030 or O-rings.

Figure 21:
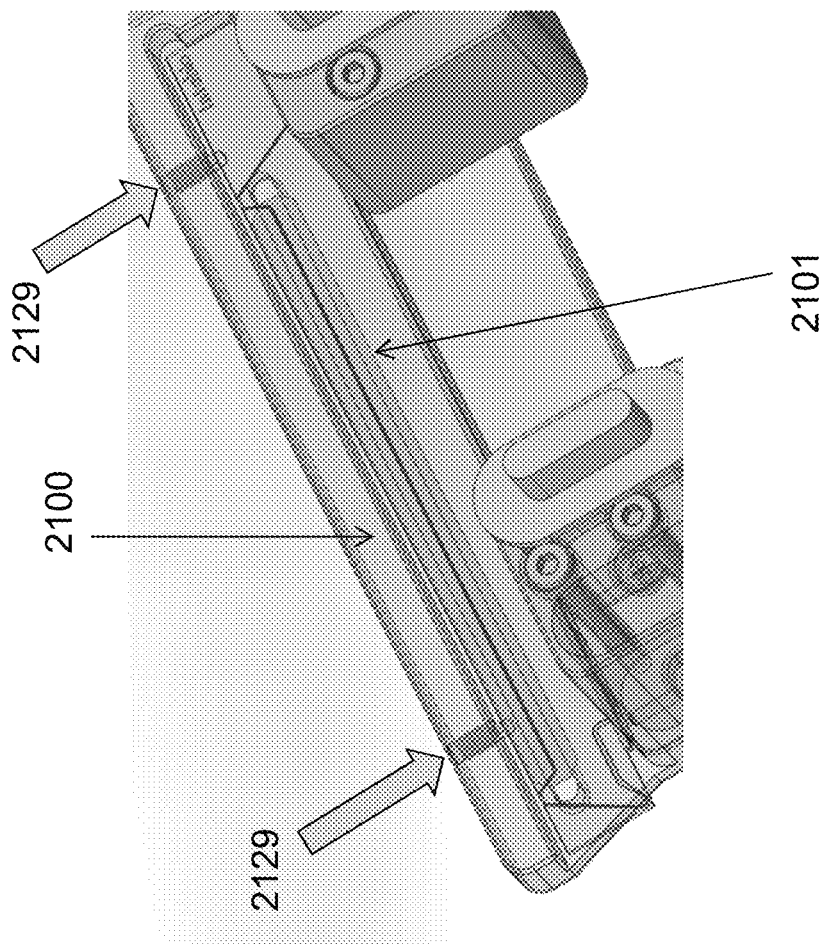
FIG. 21 schematically shows a non-limiting example of securing features that may be used to secure a device to a cartridge.
Figure 21:
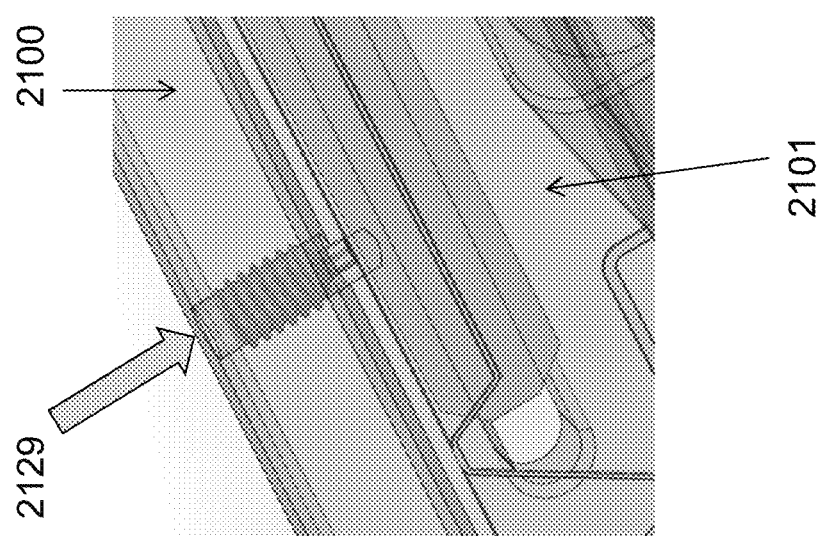

FIG. 21 schematically shows an example of securing features that may be used to secure the device to the cartridge. The cartridge 2100 may comprise screws 2129 which may be used to fasten the device 2101 to the cartridge 2100. The cartridge 2100 may comprise one, two, three, or more screws 2129. In some instances, nylon-tipped screws may be used. In some instances, a pressure plate (e.g., a washer) may be added between the screw 2129 and the device 2101, which may help evenly distribute stress and prevent stress concentrations of the device 2101 or cartridge 2100.

Figure 22:
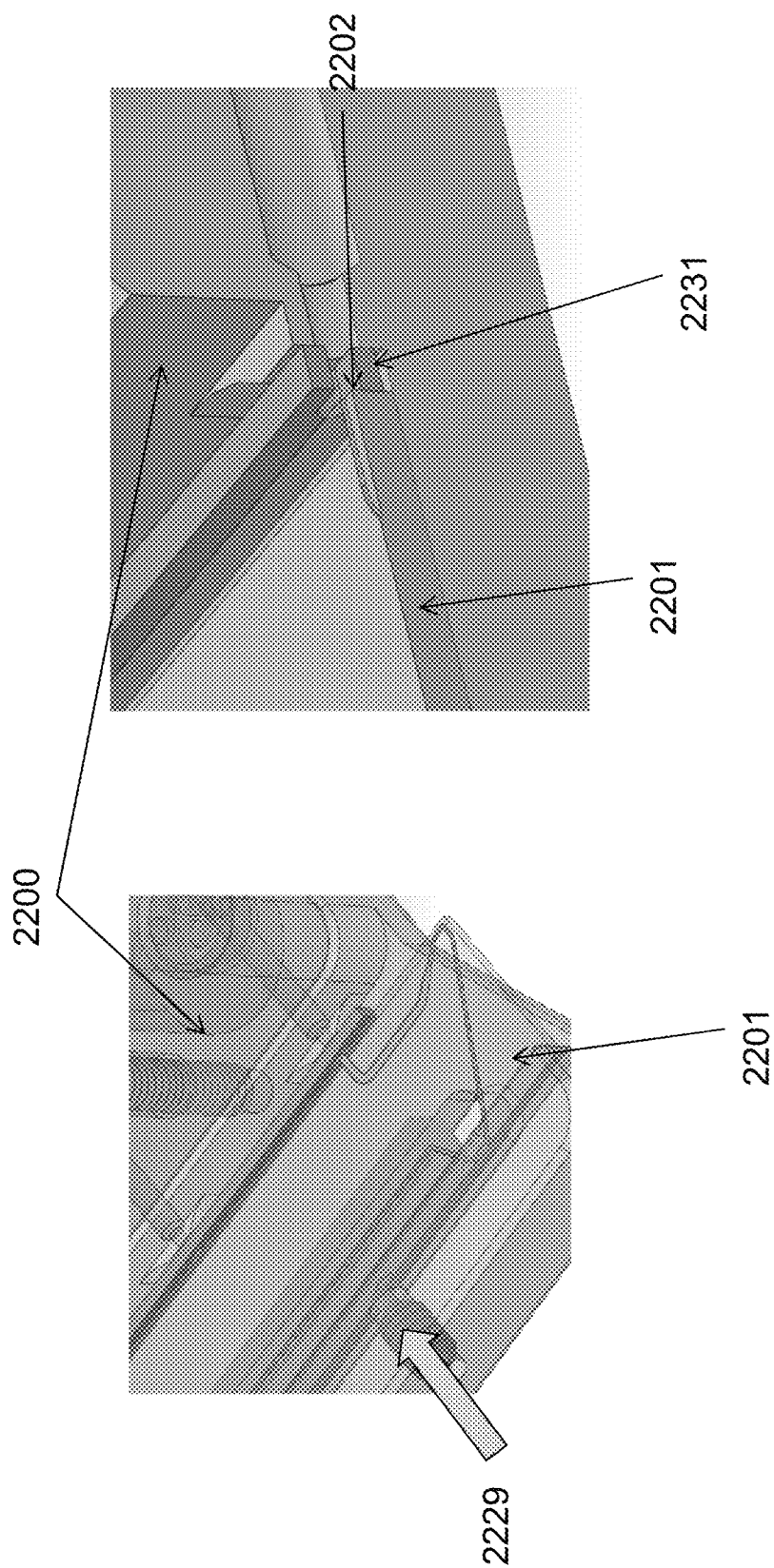
FIG. 22 schematically shows a non-limiting example of securing features that may be used to generate a fluidic seal of a cartridge to a device.

FIG. 22 shows an example schematic of securing features that may be used to generate a fluidic seal of the cartridge to the device. The cartridge 2200 may comprise screws 2229 which may be used to fasten the device 2201 to the cartridge 2200. The cartridge 2200 may comprise one, two, three, or more screws 2229. In some instances, the cartridge 2200 may comprise a gasket 2231. The gasket 2231 may interface with the device 2201 and form a seal around an inlet or outlet port 2202 of the device 2201. In some embodiments, the inlet or outlet ports 2202 may be secured to the cartridge 2200 using an O-ring.

Figure 23:
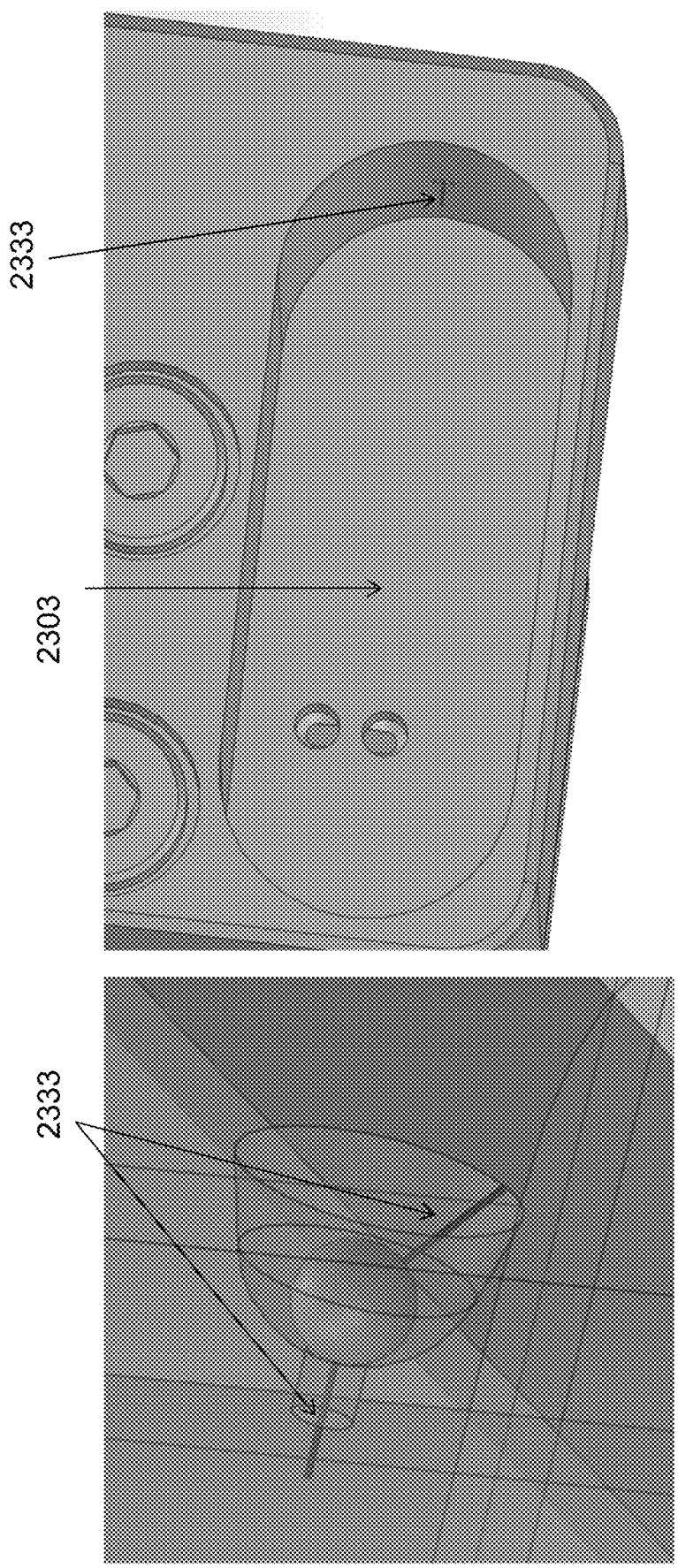
FIG. 23 schematically shows a non-limiting example of an electrical connection to a reservoir of a device or a cartridge.

FIG. 23 schematically shows electrical connection of one or more reservoirs to the device. The electrodes 2333 may comprise platinum wires and may be secured in place using, e.g., adhesives or other fastening mechanisms, as described elsewhere herein. The electrodes 2333 may be in contact with a reservoir 2303 thereby establishing electrical communication with the reservoir which may be in contact with the microfluidic device, as described herein.

Figure 24:
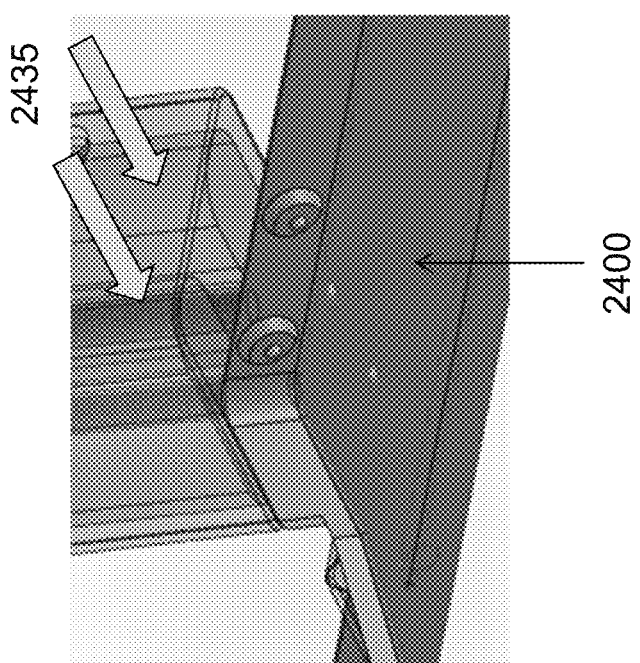
FIG. 24 schematically shows a non-limiting example of a mounting plate for coupling one or more reservoir units to a cartridge that also interface with an instrument.

FIG. 24 schematically shows coupling of an instrument to the cartridge. The cartridge 2400 may be coupled to an instrument that may be used for providing reagents to the reservoirs of the cartridge via fluid channels 2435.

Figure 25:
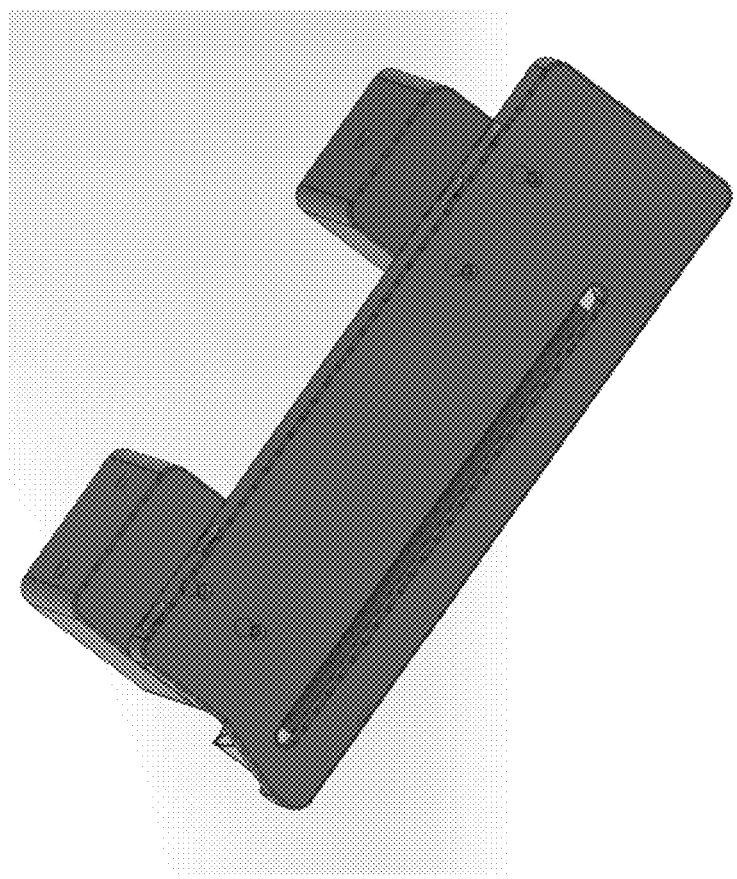
FIG. 25 shows an example cartridge with a reservoir structure.
Figure 25:
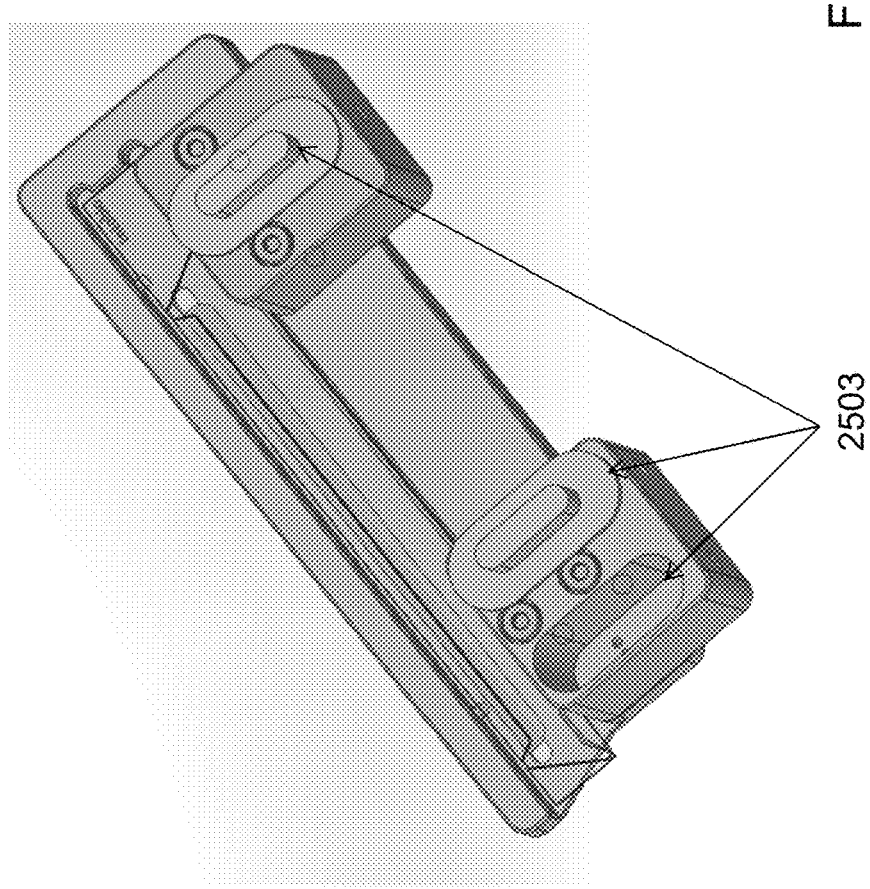
Figure 26:
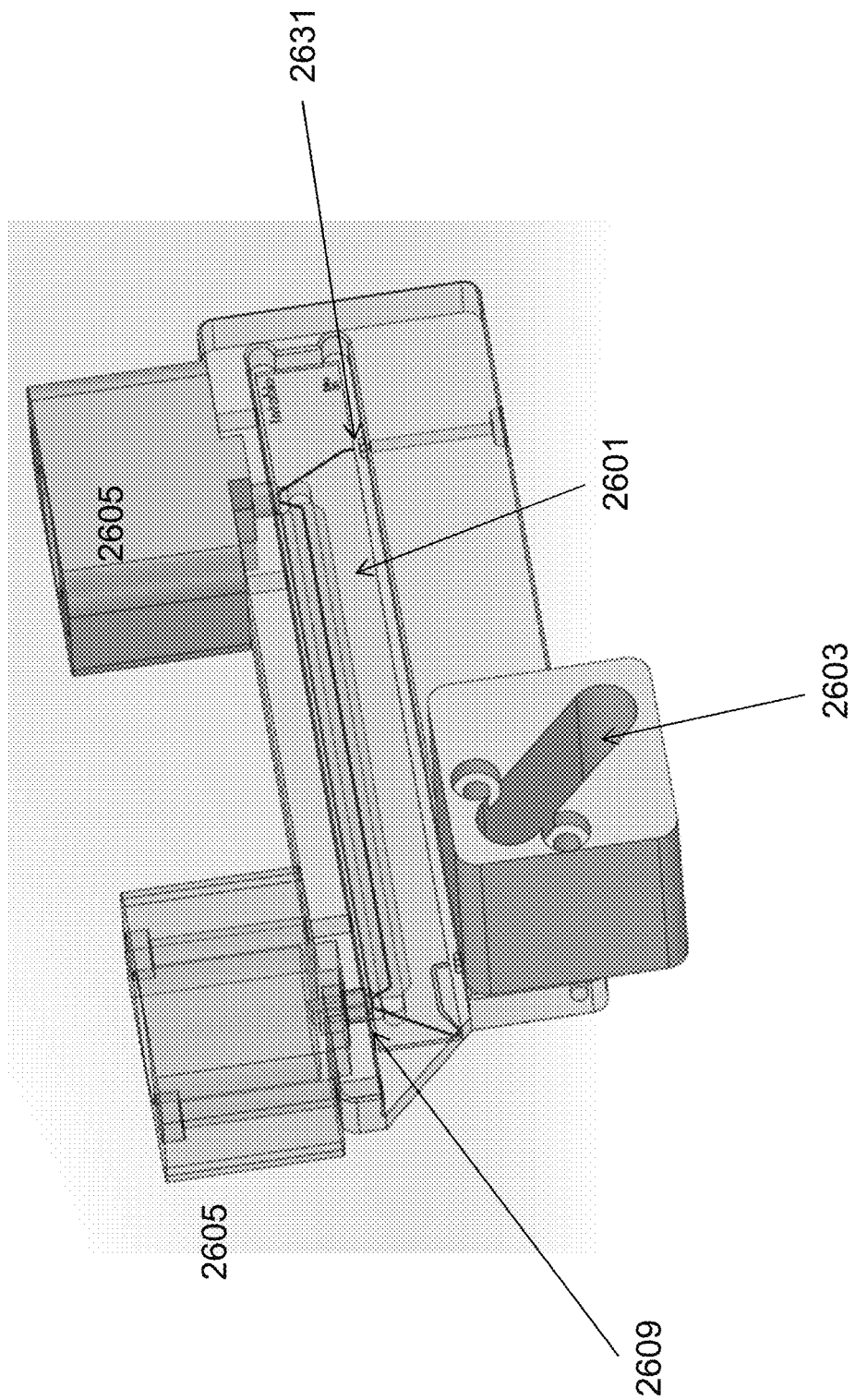
FIG. 26 shows another example cartridge with a reservoir structure.
Figure 27:
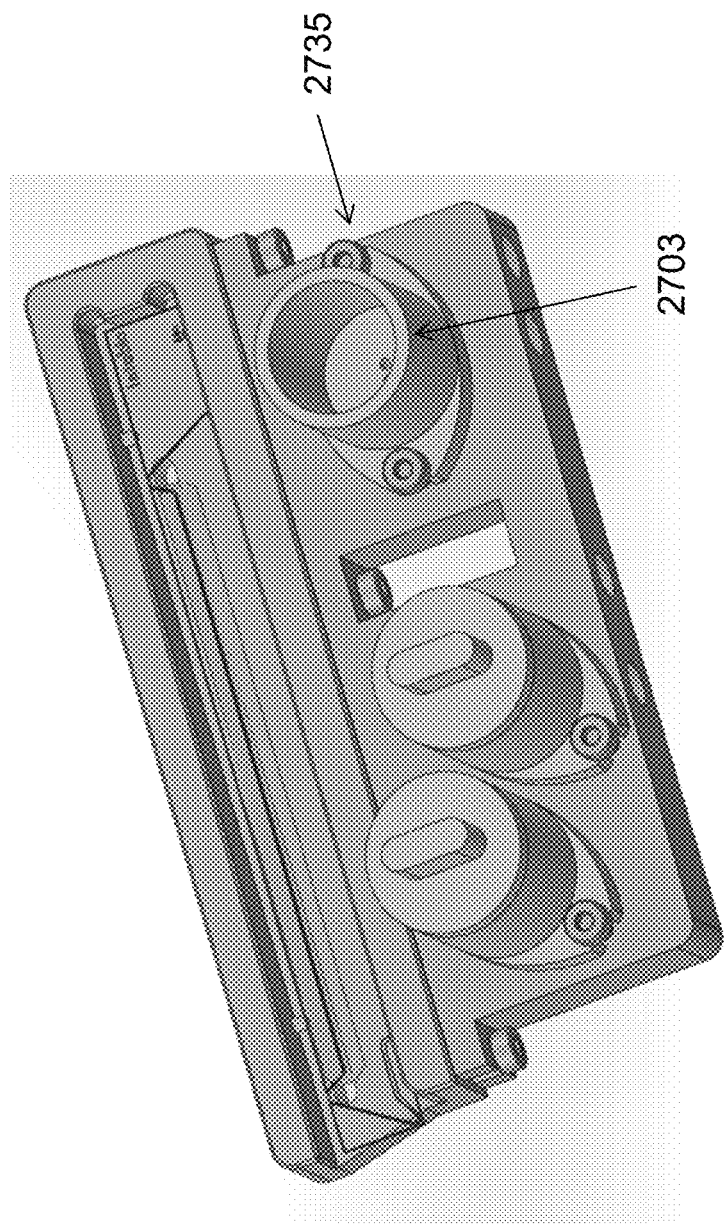
FIG. 27 shows another example cartridge with a reservoir structure.
Figure 28A:
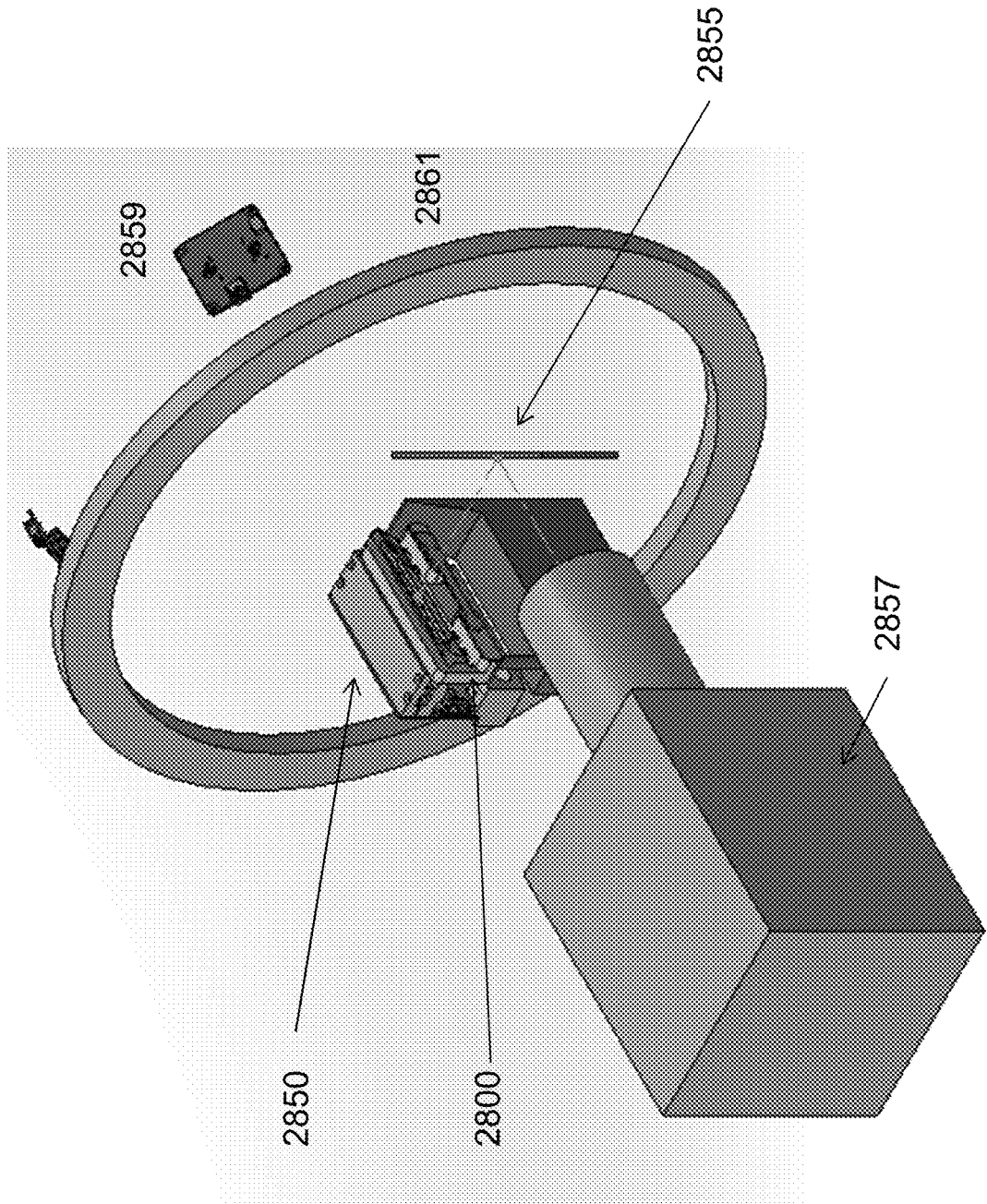
FIG. 28A: imaging system comprising a scanning (or turning) mirror.
Figure 28B:
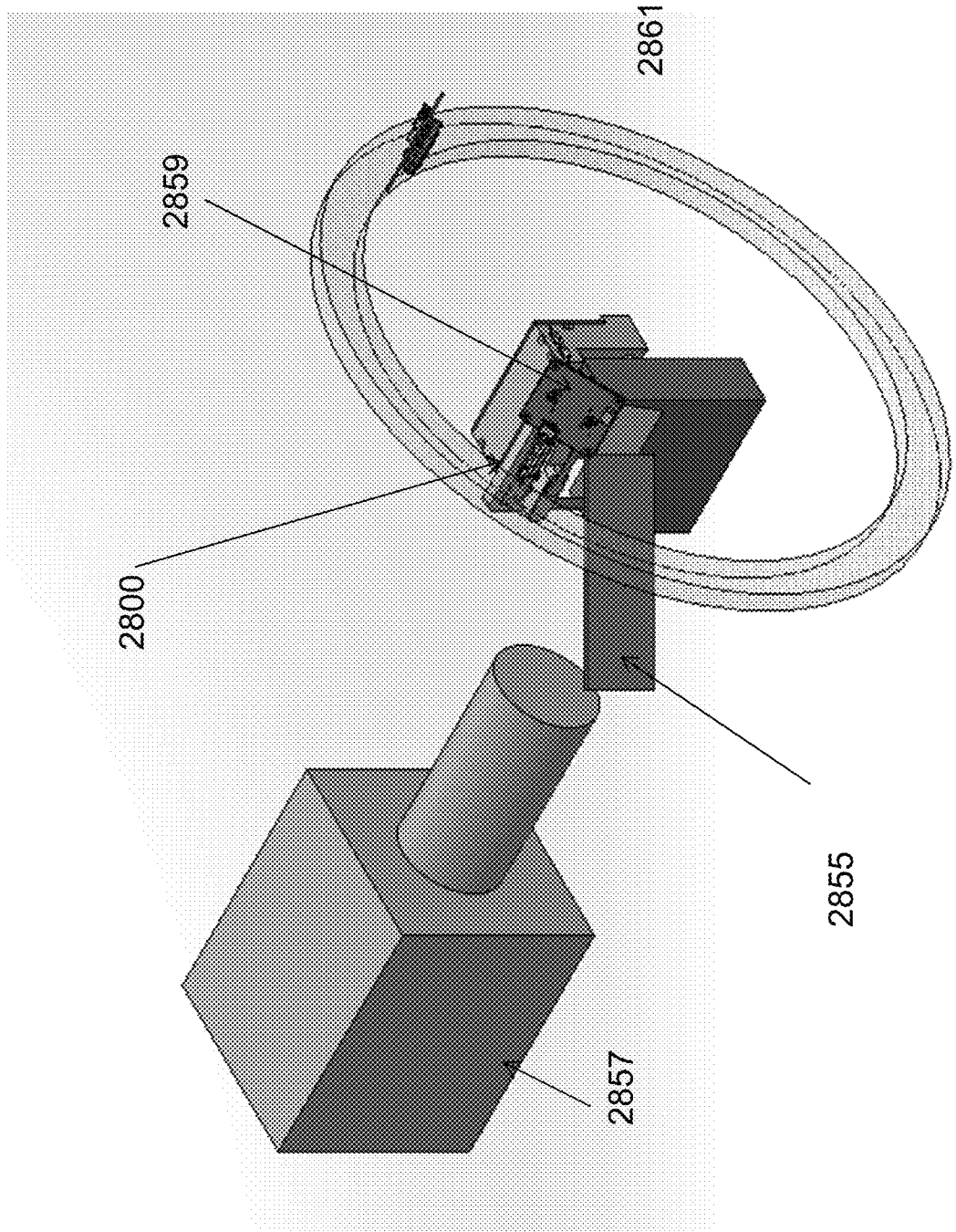
FIG. 28B: imaging system comprising a mirror for whole channel imaging.
Figure 28C:
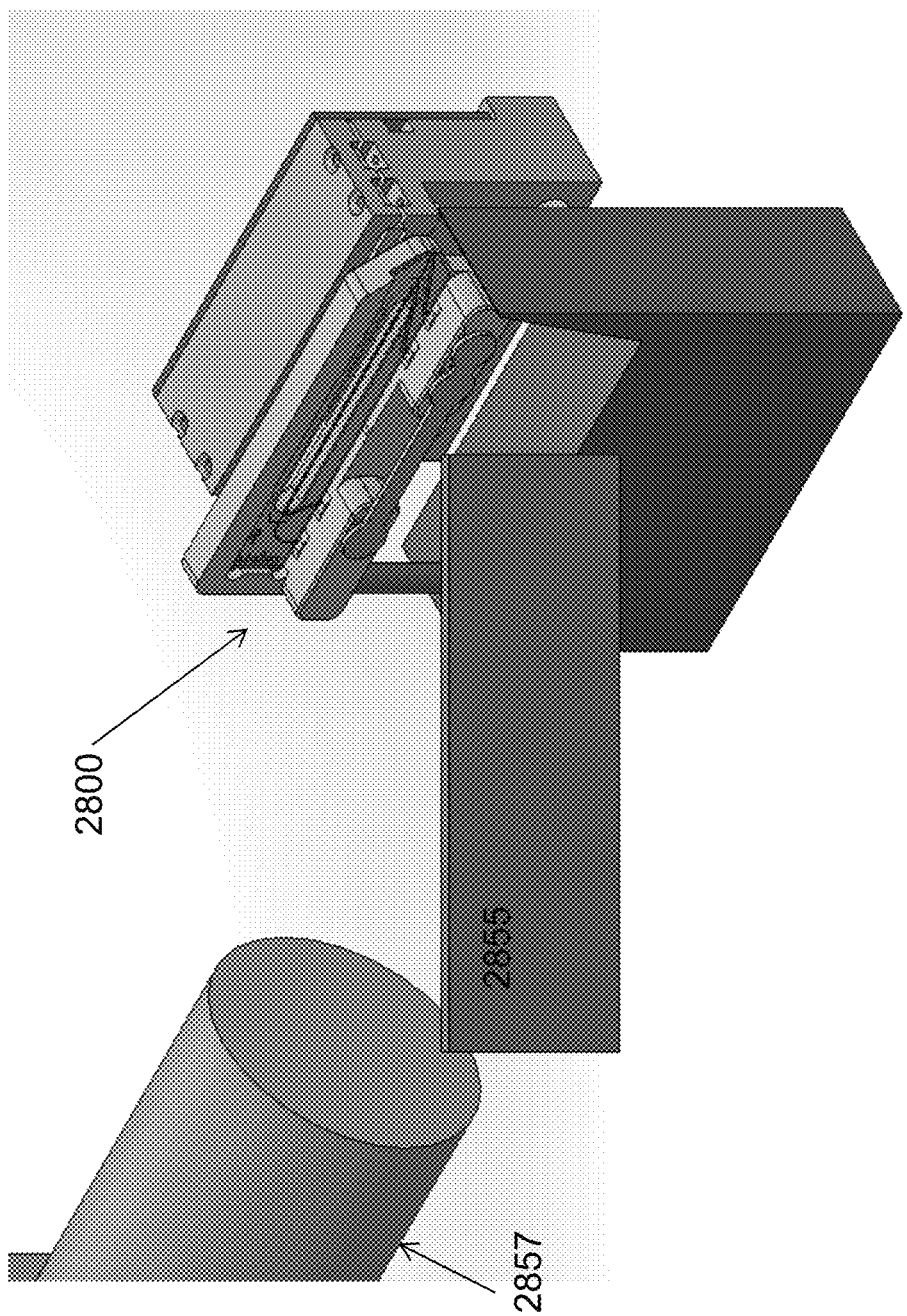
FIG. 28C: detail view of the imaging system of FIG. 28B.
Figure 28D:
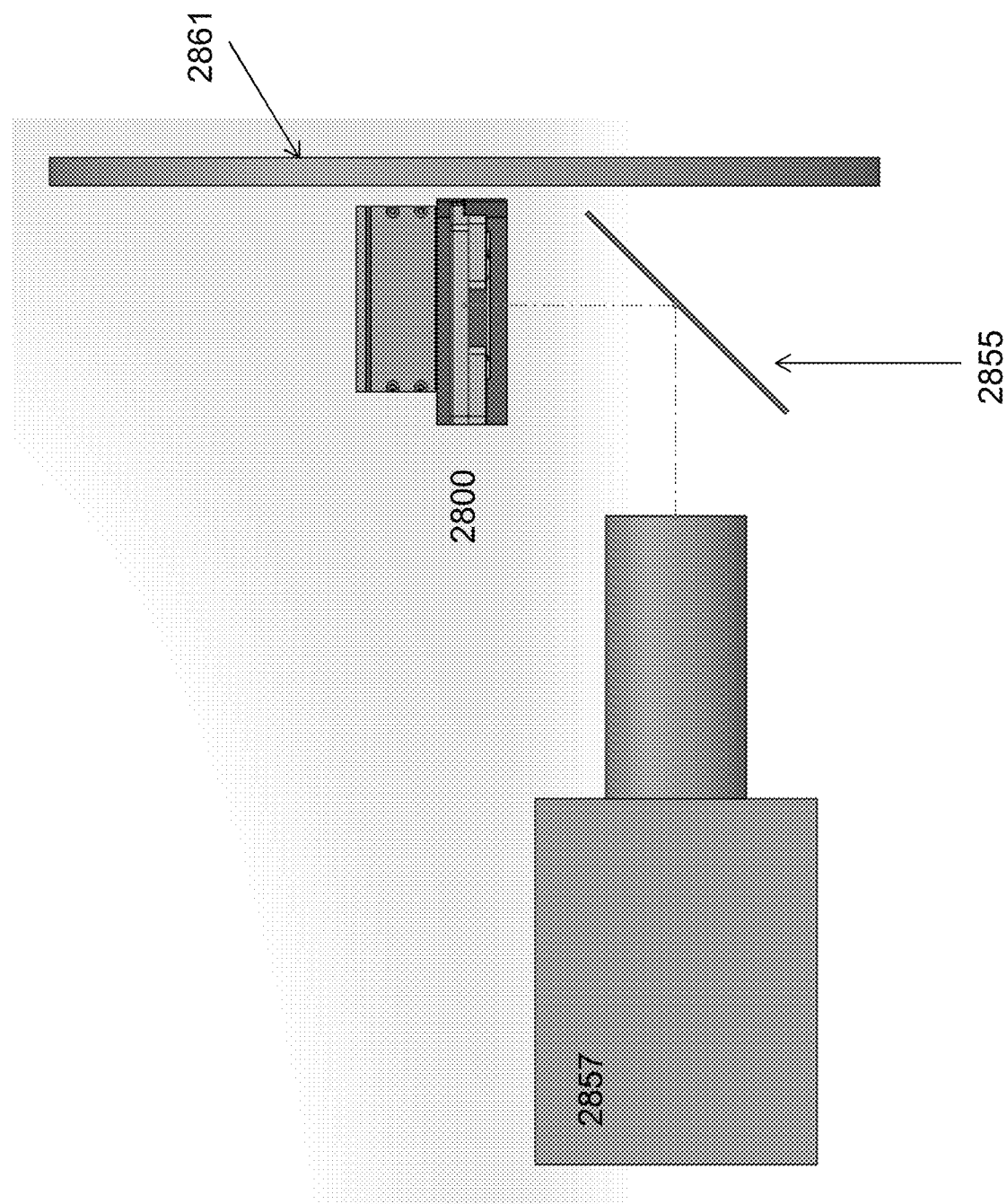
FIG. 28D: top view of the imaging system illustrated in FIGS. 28B and 28C.

FIGS. 25-27 show additional example cartridges with varying reservoir structures. FIG. 25 illustrates an embodiment where the cartridge comprises a plurality of oblong reservoirs 2503. FIG. 26 illustrates an embodiment where the cartridge comprises an oblong reservoir 2603. The reservoir 2603 may be skewed at an angle such that the reservoir 2603 is positioned sufficiently far away from an outlet or tip of the device 2601. The device 2601 may be connected to a high voltage reservoir 2605 using a membrane 2609. In some instances, the membrane 2609 may be mechanically pressed between the high voltage reservoir 2605 and the device 2601. In some instances, the device 2601 may be sealed to one or more fluid channels using a gasket 2631. FIG. 27 illustrates an embodiment where the cartridge comprises an additional manifold unit 2735. The manifold unit may comprise the reservoirs 2703. The manifold unit 2735 may be coupled to the cartridge using a fastening mechanism described herein, e.g., screws and threads.

As described herein, the cartridges may comprise reservoirs, reagents, membranes, valves, securing devices or features (e.g., screws, pins (e.g., pogo pins), adhesives, levers, switches, grooves, form-fitting pairs, hooks and loops, latches, threads, clips, clamps, prongs, rings, rubber bands, rivets, grommets, ties, snaps, tapes, vacuum, seals), gaskets, o-rings, electrodes, or a combination thereof. The cartridge may be monolithically built or may be modular and comprise removable parts. For instance, the microfluidic device may be configured to couple removably to the cartridge. Similarly, the reservoirs, membranes, valves, etc. may each be removable from the cartridge. In the case where one or more components may be removable, the cartridge may be configured such that each of the individual components may be aligned in place with sufficient tolerance by a user. For example, the cartridge may comprise grooves and pins, such that the microfluidic device may be integrated by sliding the device along the cartridge until the cartridge reaches a pin for alignment. In some instances, the device may be configured to be positioned flush with the cartridge or a portion thereof. In some instances, the device may be positioned into the cartridge such that one or more inlets, outlets, etc. may be connected (e.g., fluidically and/or electrically) to a reservoir, electrode, membrane and/or other useful interfacing unit. In some instances, the interfacing of the device and the reservoirs, electrodes, etc. may be performed by a without any additional measurement or adjustment from the user. For example, the reservoirs may be configured to receive an electrode which snaps into place or is secured via a pogo pin, thereby establishing electrical and/or fluidic communication. It will be appreciated that these example configurations of the cartridge and device are not meant to be limiting, and that many different configurations of positioning the microfluidic device or other component of the cartridge may be achieved.

Example 9 Imaging Systems

FIGS. 28 A-D show different perspective views of an example imaging system disclosed herein. The imaging system may be used for whole-channel imaging or whole-device imaging, or imaging of multiple channels of a device. In some instances, the device may be secure to a cartridge 2800. The cartridge may comprise a portion that is transparent. In some cases, the cartridge 2800 may be positioned near an illumination source, e.g., UV illuminator 2850. The device may be illuminated using the UV illuminator 2850 and light may be collected via a detector 2857, e.g., a camera. In some instances, the light may be directed to the detector 2857 using a mirror 2855, e.g., a turning mirror. The imaging system may further comprise a second detector 2859, which may comprise a camera that may be used to image electrospray. In some instances, the imaging system may comprise an illumination ring 2861. The device may be configured to direct the sample or analyte to a downstream analysis unit, e.g., a mass spectrometer via electrospray ionization, as described herein.

Example 10 System Configurations

Figure 29:
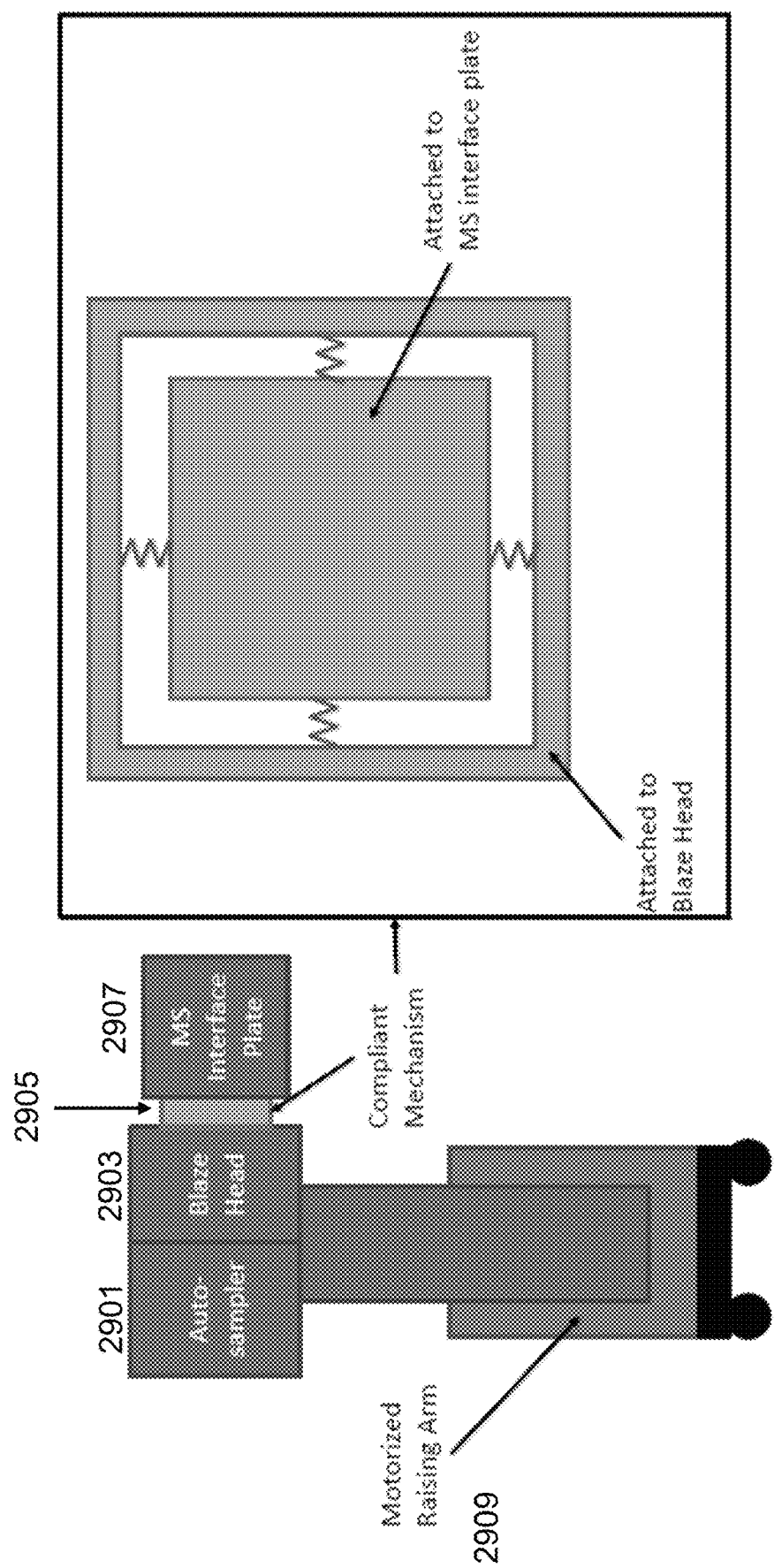
FIG. 29 schematically illustrates an example system for interfacing a microfluidic separation device/cartridge according to an embodiment described herein with a mass spectrometer.
Figure 30:
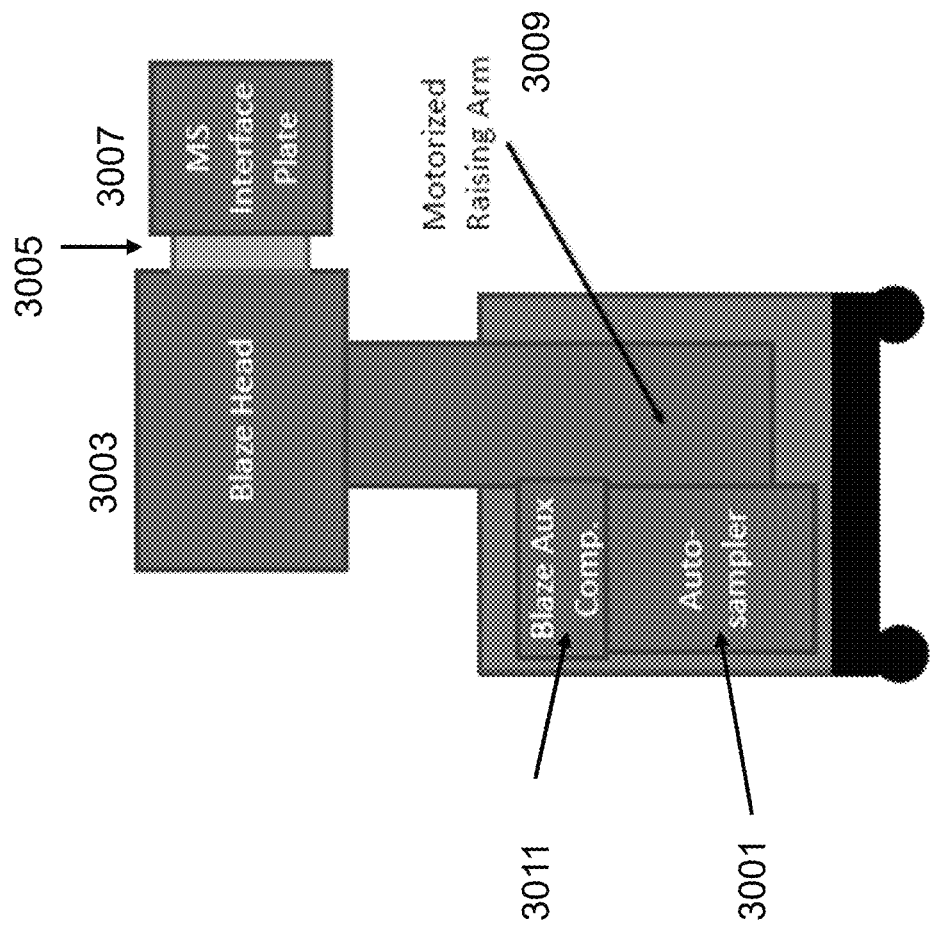
FIG. 30 schematically illustrates another example system, according to an embodiment described herein.
Figure 31:
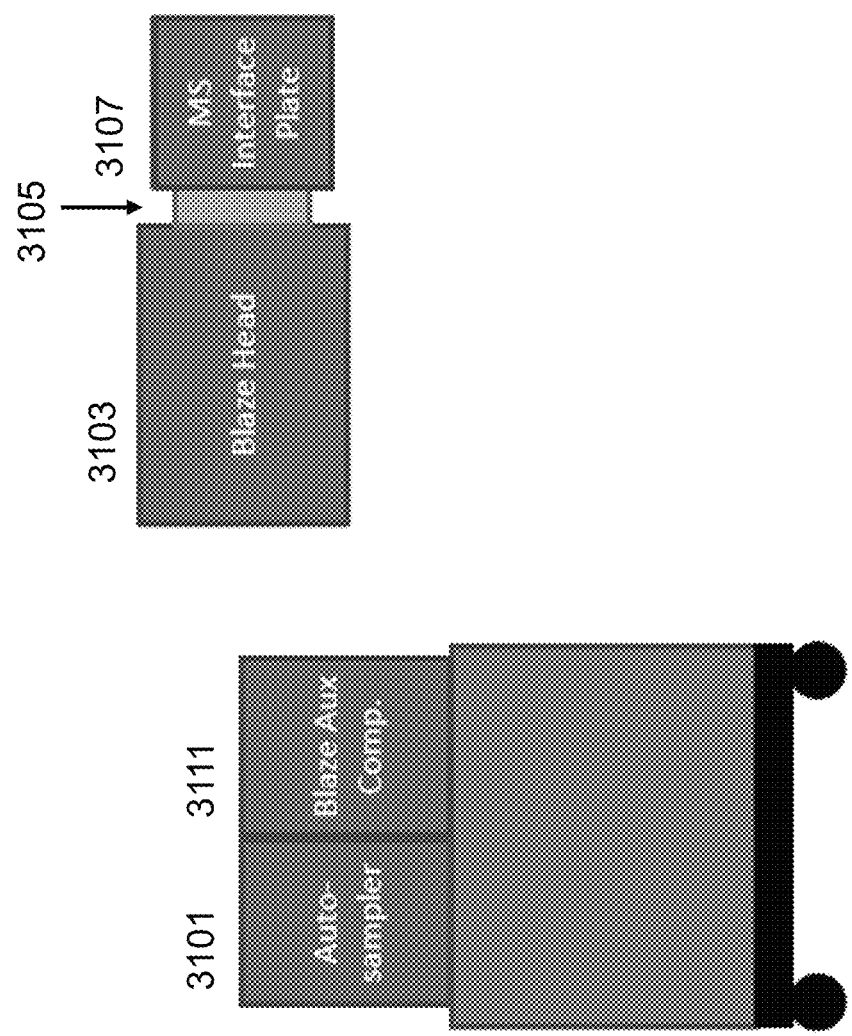
FIG. 31 schematically illustrates an example system, according to an embodiment described herein.

FIGS. 29-31 schematically illustrate examples of systems described herein. FIG. 29 illustrates an example of an instrument configured to perform one or more reactions described herein, e.g., separation of analytes via isoelectric focusing, mobilization of the analyte peaks, and downstream analysis via mass spectrometry. In certain embodiments, the system may comprise an auto-sampler 2901, which may be used to process and/or detect the sample, which may be located in the separation unit 2903, which may comprise the device used for the isoelectric focusing, mobilization, etc. The system may comprise a compliant mechanism 2905 which may help with interfacing of the device in the separation unit 2903 and a downstream analysis unit 2907. In some instances, the downstream analysis unit 2907 is a mass spectrometer. In some instances, the system may be situated on a motorized raising arm 2909, which may be used to move any of the components described herein. For example, the raising arm 2909 may be used to raise and lower the auto-sampler 2901, the separation unit 2903, the compliant mechanism 2905, and/or the analysis unit 2907 (e.g., mass spectrometer interface plate).

FIG. 30 illustrates another example of an instrument configured to perform one or more reactions described herein, e.g., separation of analytes via isoelectric focusing, mobilization of the analyte peaks, and downstream analysis via mass spectrometry. Similar to the system of FIG. 29, the system may comprise an auto-sampler 3001, which may be used to process and/or detect the sample, which may be located in the separation unit 3003, which may comprise the device used for the isoelectric focusing, mobilization, etc. The system may comprise a compliant mechanism 3005 which may help with interfacing of the device in the separation unit 3003 and a downstream analysis unit 3007. In some instances, the downstream analysis unit 3007 is a mass spectrometer. In some instances, the system may be situated on a motorized raising arm 3009, which may be used to move any of the components described herein. For example, the raising arm 3009 may be used to raise and lower the auto-sampler 3001, the separation unit 3003, the compliant mechanism 3005, and/or the analysis unit 3007 (e.g., mass spectrometer interface plate). In some cases, the system may also comprise one or more computer or computer processors 3011.

FIG. 31 illustrates an example of an instrument configured to perform one or more reactions described herein, e.g., separation of analytes via isoelectric focusing, mobilization of the analyte peaks, and downstream analysis via mass spectrometry. In certain embodiments, the system may comprise an auto-sampler 3101, which may be used to process and/or detect the sample, which may be located in the separation unit 3103, which may comprise the device used for the isoelectric focusing, mobilization, etc. A second system may be located adjacent or remotely to the system and may comprise the separation unit 3103, a compliant mechanism 3105 which may help with interfacing of the device in the separation unit 3103 and a downstream analysis unit 3107. In some instances, the downstream analysis unit 3107 is a mass spectrometer. In some cases, the system may also comprise one or more computer or computer processors 3111, which may be coupled to the auto-sampler 3101.

Example 11 Mobility Chromatograms

Figures 32A, 32B:
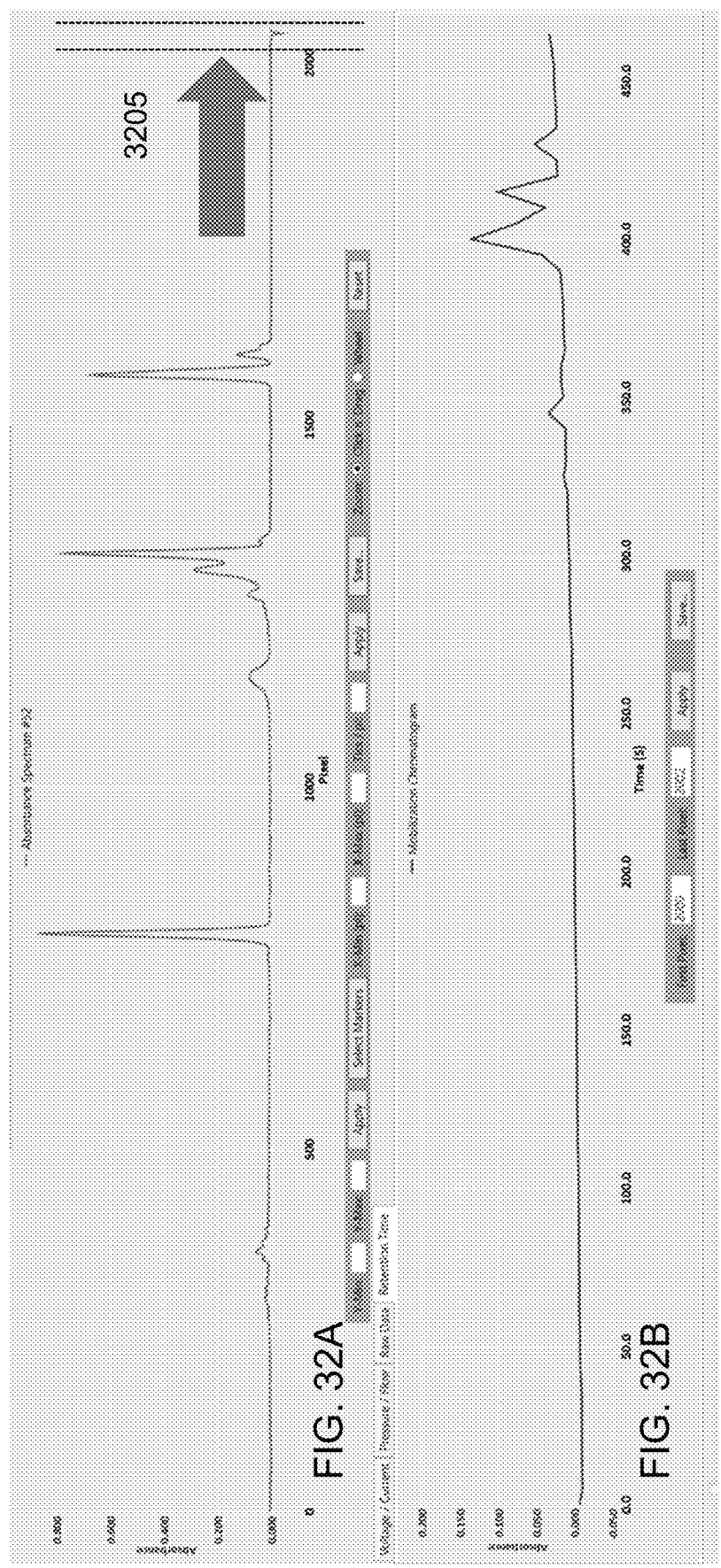
FIGS. 32A-B show example data of a mobilization reaction and a mobility chromatogram.

FIGS. 32A-B show example data of a mobilization reaction and mobility chromatogram. Whole channel imaging may be performed during separation (e.g., via isoelectric focusing) of a sample comprising protein isoforms. For example, a biologic therapeutic (e.g., antibody therapeutic) may be separated using isoelectric focusing along a pH gradient (e.g., pH 5 to pH 10.5 gradient). Following the separation reaction, a mobilization reaction may be performed (e.g., to direct the separated analytes to a downstream analysis unit, such as a mass spectrometer). Whole-channel imaging of the mobilization reaction may be performed over time, and a portion of each image may be used to generate a chromatogram. FIG. 32A illustrates the absorbance measurement of a channel of the device as a function of the pixel number (or distance) along the channel. Each pixel corresponds to approximately 25 microns along the length of the separation channel. FIG. 32B shows an example mobility chromatogram generated by plotting the absorbance measurement (e.g., average absorbance) of a 3-pixel-wide section 3205 of the image or absorbance plot of FIG. 32A as a function of time. In such an example, plotting the 3-pixel-wide section 3205 can function as a point detector, thereby yielding information on the mobilization of the analyte peaks as a function of time and allow for better correspondence and/or validation of data obtained from the downstream analysis unit (e.g., mass spectrometer).

Example 12 Computer Systems

Figure 33:
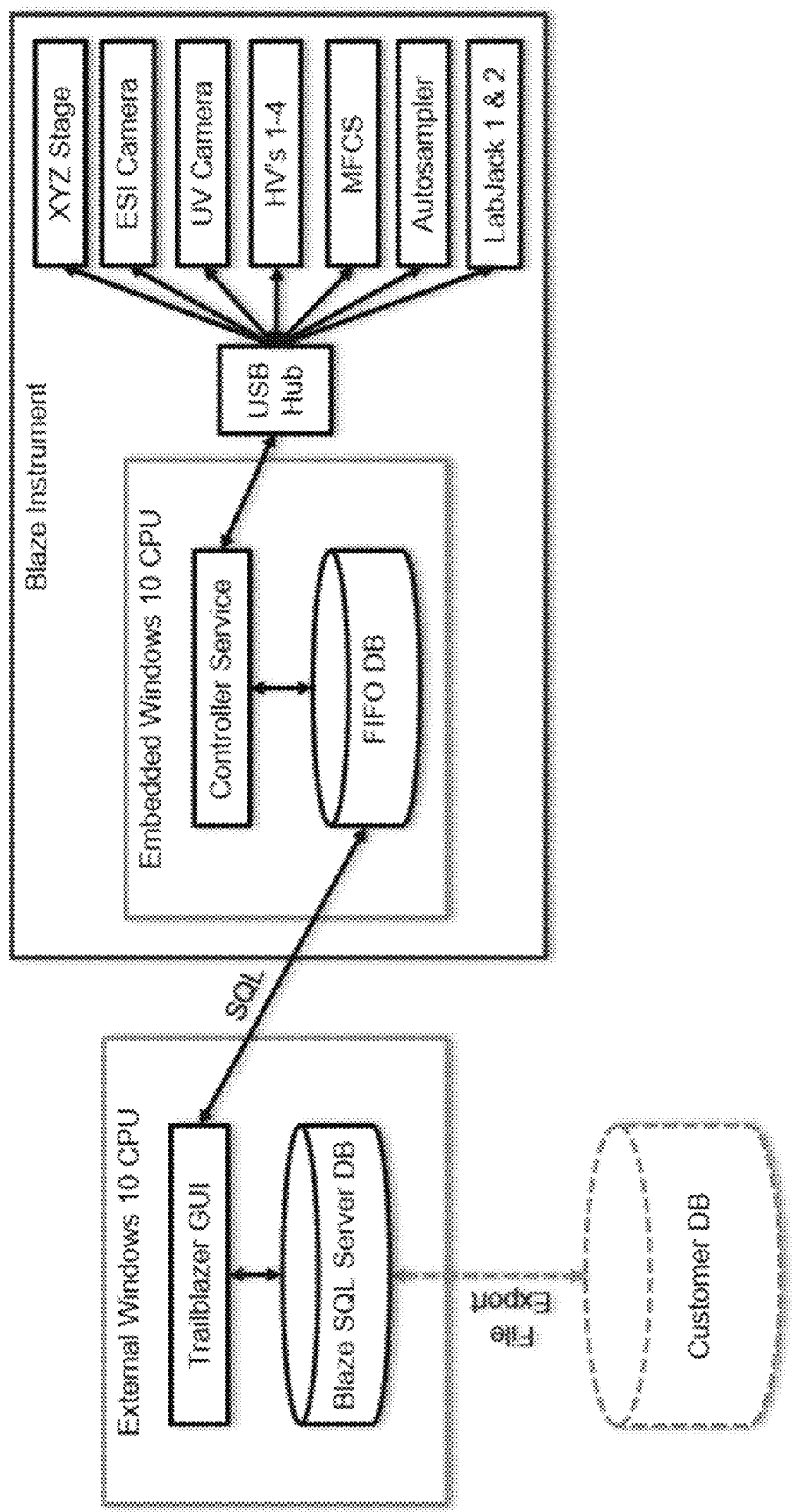
FIG. 33 shows a non-limiting example of a software architecture for one embodiment of the disclosed systems.

FIG. 33 shows an example software architecture system. The software architecture system may be integrated with the systems disclosed herein and may comprise one or more computer processors. In some instances, the one or more computer processors may be configured to collect and/or analyze data. The software architecture system may comprise a computer processing unit that comprises a controller service, which may be in communication with a first in first out (FIFO) database. In some instances, the FIFO database may be in communication with a second computer processor, which may comprise a graphical user interface and a server database. The second computer processor may be in communication, e.g., via cloud, with a customer database. In some instances, the computer processing unit may be in communication with one or more hardware units of the system (e.g., via a wired or wireless connection). For example, the computer processing unit may be connected via a USB hub to the stage, camera or cameras, high voltage power supplies, autosampler, flow control system (e.g., software and hardware for microfluidic flow control, e.g., Fluigent Inc.) and/or other lab equipment.

Example 13 Integrated Systems

Figure 34:
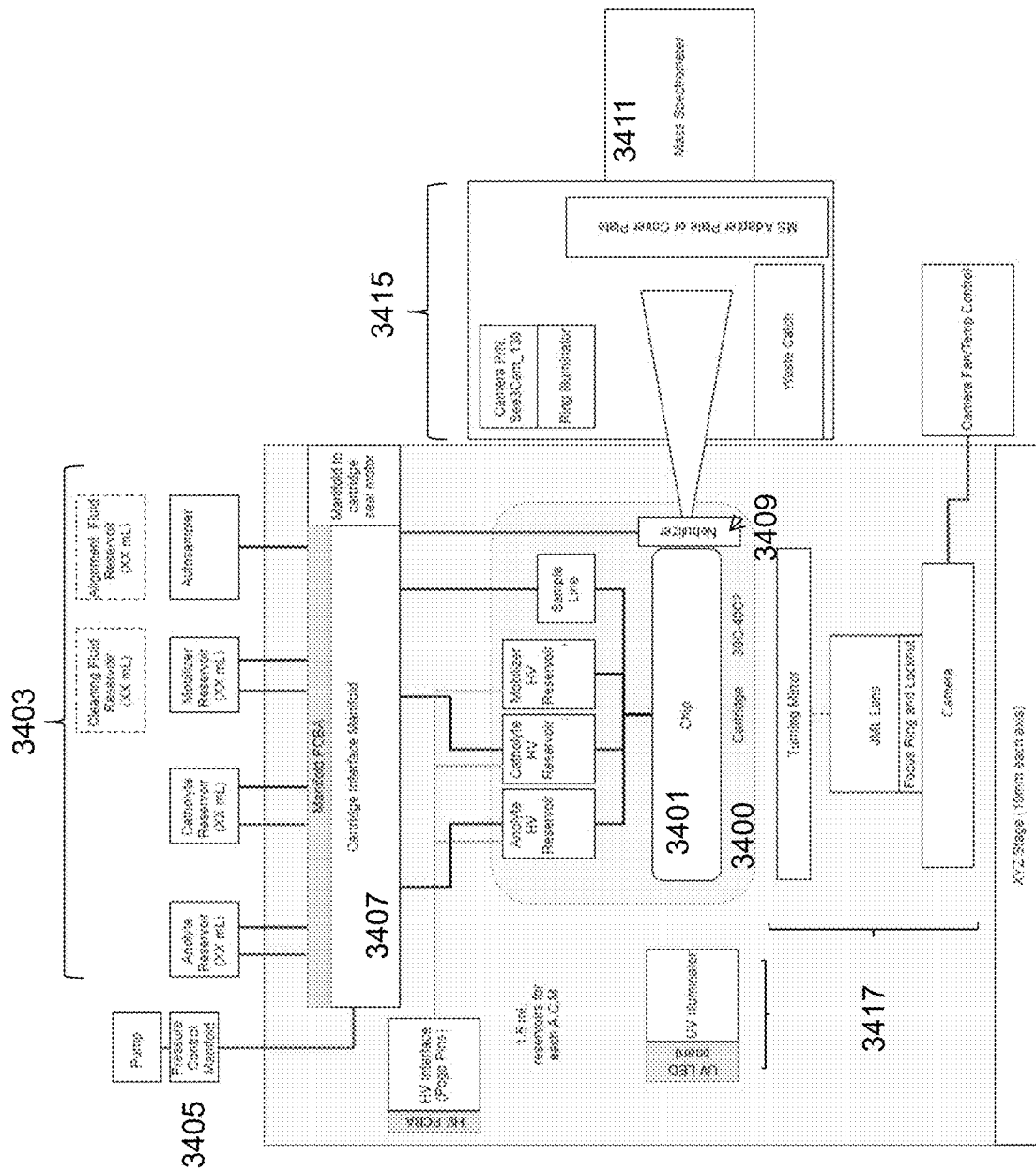
FIG. 34 shows a non-limiting example of a block diagram of an integrated system in one embodiment of the present disclosure.

FIG. 34 shows an example block diagram of an integrated system. The integrated system may comprise one or more systems disclosed herein. The system may comprise an interfacing cartridge 3407, which may be in fluidic and/or electrical communication with a plurality of reservoirs 3403. For example, the interfacing cartridge 3407 may be connected to an anolyte reservoir, a catholyte reservoir, a mobilizer reservoir, and an autosampler unit. Alternatively, or in addition to, the interfacing cartridge 3407 may be in fluidic and/or electrical communication with a pressure control manifold 3405, which may be coupled to a fluid driving mechanism, e.g., a pump. The interfacing cartridge 3407 may be coupled to a cartridge 3400 which may comprise the device 3401. The device 3401 may be in electrical and/or fluidic communication with an anolyte high voltage reservoir, a catholyte high voltage reservoir, a mobilizer high voltage reservoir and a sample line. The anolyte high voltage reservoir, a catholyte high voltage reservoir, a mobilizer high voltage reservoir and a sample line may each be in fluidic and/or electrical communication with the interfacing cartridge 3407. The device 3401 may also be coupled to a waste management unit 3409, which may be used to direct waste away from the device 3401 and, in some instances, also be used to direct the sample to the downstream analysis unit 3411. In some embodiments, the waste management unit 3409 may comprise a nebulizer. In some instances, the downstream analysis unit 3411 may comprise a mass spectrometer.

The system may also comprise a plurality of imaging systems. For example, the system may comprise imaging system 3415, which may comprise a camera, an illuminator, a waste receptacle, and/or an adaptor, which may be used to interface with the analysis unit 3411. The system may also comprise imaging system 3417, which may comprise an illuminator (e.g., UV illumination source), a mirror, and/or a camera or other suitable detector. In some instances, the detector (e.g., camera) may be connected to a cooling source, e.g., fan or other temperature control platform.

Figure 35:
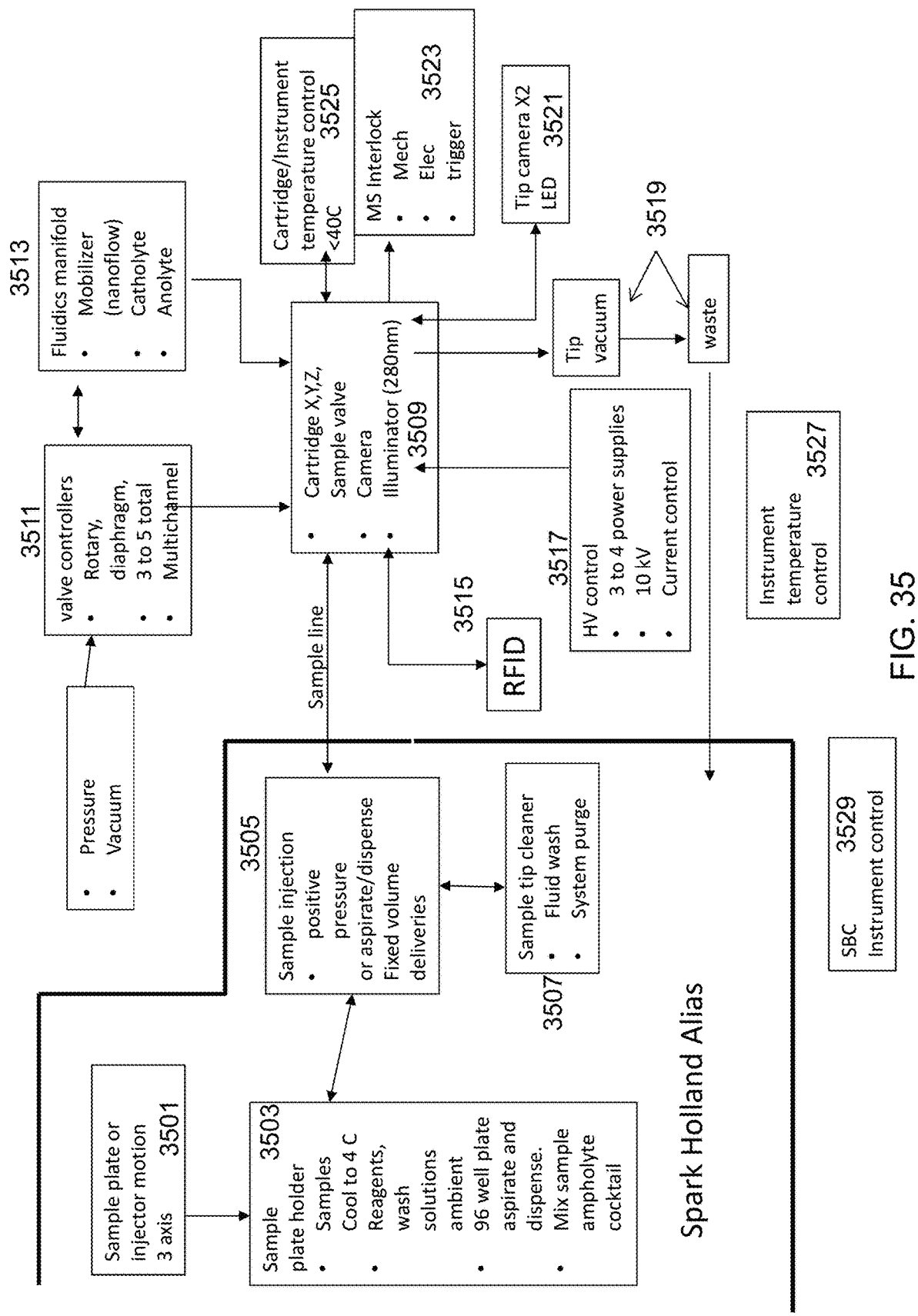
FIG. 35 shows another non-limiting example of a block diagram of an integrated system in one embodiment of the present disclosure.

FIG. 35 shows an example block diagram of an integrated system. The system may comprise a sample 3501, a sample and reagent holder and/or processor 3503, which may be configured to store the samples and process the samples (e.g., mix, add reagents, aspirate or dispense samples, etc.), a sample injector 3505, and a sample tip cleaner 3507. The sample tip cleaner may comprise mechanisms to wash the sample and/or the system. The system may also comprise a separation unit 3509, which may comprise a cartridge comprising the device, an imaging system (e.g., UV illuminator and camera). The separation unit may be coupled to a plurality of controllers 3511 which may comprise fluid controls using negative pressure (e.g., vacuum) or positive pressure (e.g., rotary or diaphragm pumps, valves, etc.). The controllers 3511 and/or the separation unit 3509 may be coupled to a fluidics manifold 3513, which may comprise one or more reagent-containing reservoirs.

The separation unit 3509 may be used to perform a separation reaction (e.g., isoelectric focusing) and/or a mobilization reaction. The separation unit 3509 may be connected to or coupled to a communication interface 3515 (e.g., RFID), a high voltage power supply 3517, a waste management unit 3519 (e.g., vacuum and waste receptacle), another imaging unit 3521, and/or a downstream analysis unit 3523 (e.g., a mass spectrometer). In some instances, the separation unit 3509 may be coupled to a temperature control unit 3525. In some instances, one or more systems described herein may comprise a temperature control unit 3527 and/or other control unit, e.g., for instrument control 3529.

Example 14—Tracking Velocity of Analyte Peaks as they Leave the Microfluidic Chip and Enter the Mass Spectrometer Microfluidic channel network 100 in the device illustrated in FIG. 1B is fabricated in a 250-micron thick layer of opaque cyclic olefin polymer. Channel 112 is 250 microns deep, so it cuts all the way through the 250-micron layer. All other channels are 50 microns deep. The channel layer is sandwiched between two transparent layers of cyclic olefin polymer to fabricate a planar microfluidic device. Ports 102, 104, 106, 108 and 110 provide access to the channel network for reagent introduction from external reservoirs and electrical contact. Port 102 is connected to a vacuum source, allowing channel 103 to act as a waste channel, enabling the priming of the other reagents through the channel network to "waste." Acid (e.g., 1% formic acid) is primed through port 108 to channels 109, 112, 114, and 103, and out to port 102. A sample (e.g., a peptide or protein diluted in 4% Pharmalyte 3-10, 12.5 mM pI standard 3.38 (purified peptide, sequence: Trp-Asp-Asp-Asp), 12.5 mM pI standard 10.17 (purified peptide, sequence: Trp-Tyr-Lys-Arg)) is primed through port 106 into channels 107, 112, 114, and 103 and out to port 102. This leaves channel 112 containing the sample analyte. Base (e.g., 1% dimethylamine) is primed through port 104 into channels 105, 114, and 103 and out to port 102. Mobilizer (e.g., 1% formic acid, 49% methanol) is primed through port 110 into channels 111, 114, and 103, and out channel 103 to port 102.

Electrophoresis of the analyte sample in channel 112 is performed by applying 4000V to port 108 and connecting port 110 to ground. The ampholytes in the analyte sample establish a pH gradient spanning channel 112. Absorbance imaging of the separation is performed using a 280 nm light source aligned to channel 112 and measuring the transmission of 280 nm light through the channel 112 with a CCD camera. Software calculates the absorbance by comparing light transmission during separation or mobilization compared to a "blank" reference measurement taken in the absence of focused analyte before the analyte is run, then displays the absorbance per pixel over the length of channel 112. Locations where standards or analyte has focused are displayed as peaks in absorbance traces derived from the image data.

Once the analyte has completed focusing, a final focused absorbance image is captured. Software will identify the spatial position of the pI markers and interpolate in between the markers to calculate the pI of the focused analyte fraction peaks. At this point, the control software will trigger a relay disconnecting the ground at port 110, and connecting port 104 to ground, as well as setting pressure on the mobilizer reservoir connected to port 104 to establish flow of 100 nL/min of mobilizer solution through port 104 into channels 105 and 114, and out of the chip at orifice 116. Orifice 116 is positioned 2 mm away from a mass spectrometer ESI inlet, with an inlet voltage of −3500V to −4500V.

While the pressure driven flow directs mobilizer from port 104 to orifice 116, some of the formic acid in the mobilizer reagent will electrophorese in the form of formate from channel 105, through channel 112 to the anode at port 108. As the formate travels through channel 112 it will disrupt the isoelectric pH gradient, causing the ampholytes, standards and analyte sample to increase charge and migrate electrophoretically out of channel 112 into channel 114, where pressure driven flow from port 110 will carry them into the ESI spray out of orifice 116.

While mobilization occurs, the software continues to capture absorbance images, and identifies peaks, tracking their migration out of the imaging channel 112 into channel 114. By tracking the time each peak exits imaging channel 112, its velocity, and the flow rate in channel 114, the software can calculate the time the peak traverses channel 114 and is introduced to the mass spectrometer via orifice 116, allowing direct correlation between the original focused peak and the resulting mass spectrum.

Example 15 Microfluidic Device for Electrospray and Sample Processing

FIG. 2 provides a schematic top-down view of one non-limiting example of a microfluidic device for performing one or more separation reactions, e.g., isoelectric focusing reaction. The device comprises a substrate 201 in which fluid channels measuring 210 microns wide and 100 microns in depth are fabricated using, e.g., embossing, laser micromachining, or photolithography and wet chemical etching. The fluid channels can be sealed by bonding the substrate 201 to a transparent coverslip (not shown). In some instances, e.g., in cases where UV absorbance imaging is used to monitor separation and/or mobilization reactions, substrate 201 may be fabricated from an optically transparent material. In some instances, e.g., where epifluorescence imaging is used to monitor separation and/or mobilization reactions, substrate 201 may be fabricated from an optically opaque material.

Access to the fluid channels within the device is provided through sample inlet ports 207, which may be located on the side of the chip. The chip may also comprise anode wells 206, cathode wells 204, sample outlet ports 203, and chemical mobilization agent inlet ports 209. One anode well 206 and cathode well 204 are in fluid- and electrical communication with a proximal end and distal end of the separation channel 205. Chemical mobilization agent inlet ports 209 are connected to the distal ends of separation channels 205 via chemical mobilization channels.

For use in performing a plurality of isoelectric focusing reactions to separate mixtures of proteins, protein samples are pre-mixed with ampholyte pH gradient and pI markers before placing into vials and loading onto an autosampler. The samples are serially loaded into the device by the autosampler via the sample inlet ports 207 onto the microfluidic device, through the separation channels 205, and out of the device to waste through the sample outlet ports 203.

A catholyte fluid (e.g., 1% $N_4OH$ in $H_2O$) is loaded into cathode wells 204, anolyte (e.g., 10 mM $H_3PO_4$) is loaded into the anode wells 206, and a mobilizer solution (e.g., 49% MeCN, 49% $H_2O$, 1% Formic Acid) is connected to mobilization agent inlet ports 209. A membrane (not shown) may be interfaced with any of the anode or cathode wells (206 and 204) to provide electrical and fluid communication of the device with the electrodes. An isometric schematic of the sample outlet or ESI tip 203 is shown in FIG. 3.

Referring to FIG. 2, after all reagents are loaded, an electric field of, e.g., +600V/cm is applied from one or more of the anode wells 206 to the corresponding cathode wells 204 by connecting electrodes to the anode wells 206 and cathode wells 204 to initiate isoelectric focusing. As noted above, the voltages and/or currents applied to each of the separation channels 205 may be controlled independently and may also be recorded as a function of time. In some instances, the electrodes used for anodes and cathodes may be integrated with the devices. For UV absorbance imaging, a collimated beam of light provided by a UV light source is aligned with the separation channels 205, and an image sensor (e.g., a CCD camera or CMOS camera) is placed on the other side of the separation channels 205 to measure the amount of light transmitted through each of the separation channels 205, thereby imaging and detecting the focused proteins (or other separated analytes) by means of their absorbance. In some instances, the focused protein may be unlabeled and detected through native absorbance at 220 nm, 280 nm, or any other wavelength at which the proteins will absorb light. For fluorescence imaging, i.e., epifluorescence imaging, excitation light of a suitable wavelength is delivered to the separation channels 205 by means of an optical assembly comprising suitable dichroic reflectors and bandpass filters, and emitted fluorescence is collected from the separation channels 205 by the same optical assembly and imaged onto the image sensor. In some instances, focused proteins (or other separated analytes) may be imaged and detected using native fluorescence. In some instances, the focused proteins may be detected using non-covalently bound fluorogenic, chromogenic, fluorescent, or chromophoric labels, such as SYPRO® Ruby, Coomassie Blue, and the like. In some instances, portions of the device may be constructed of an optically opaque material such that light may only be transmitted through the separation channels 205, thereby block any stray light from reaching the image sensor without having passed through the separation channels 205 and increasing the sensitivity of UV absorbance measurements.

Images of the focusing proteins in all or a portion of the separation channels 205 can be captured continuously and/or periodically as the isoelectric focusing reactions are performed in the plurality of separation channels 205. In some instances, detection of the positions of the pI markers in the images of the separation channels 205 may be used to determine the local pH as a function of position along the separation channels and, by extrapolation, make more accurate determinations of pI for the separated proteins (or other analytes). In some instances, when focusing is complete a positive pressure is applied at sample inlet ports 207 and/or anode wells 206 to mobilize the separated protein (or other analyte) mixture towards sample outlets 203. In some instances, when focusing is complete the electrodes connected to cathode wells 204 are disconnected, and electrodes in electrical communication with mobilizer channels 208 are used to apply an electric field of 675V/cm from anode wells 206 to the chemical mobilization agent inlets 209 to electrophoretically introduce the mobilization agent into separation channels 205. In some instances, mild positive pressure applied to mobilization agent inlets 209 may be used instead of, or in addition to, electrophoretic introduction of a chemical mobilization agent.

In the case of electrophoretic introduction of the mobilization agent, the formic acid in the mobilizer solution is drawn by the electric field into the separation channels 205, where it ionizes the proteins and ampholytes and disrupts the pH gradient used for isoelectric focusing. The ionization of the enriched protein fractions causes them to migrate out of the separation channels 205. Continuing to image the separation channels 205 during the mobilization process can be used to refine the determination of pI for each separated protein.

Figure 38:
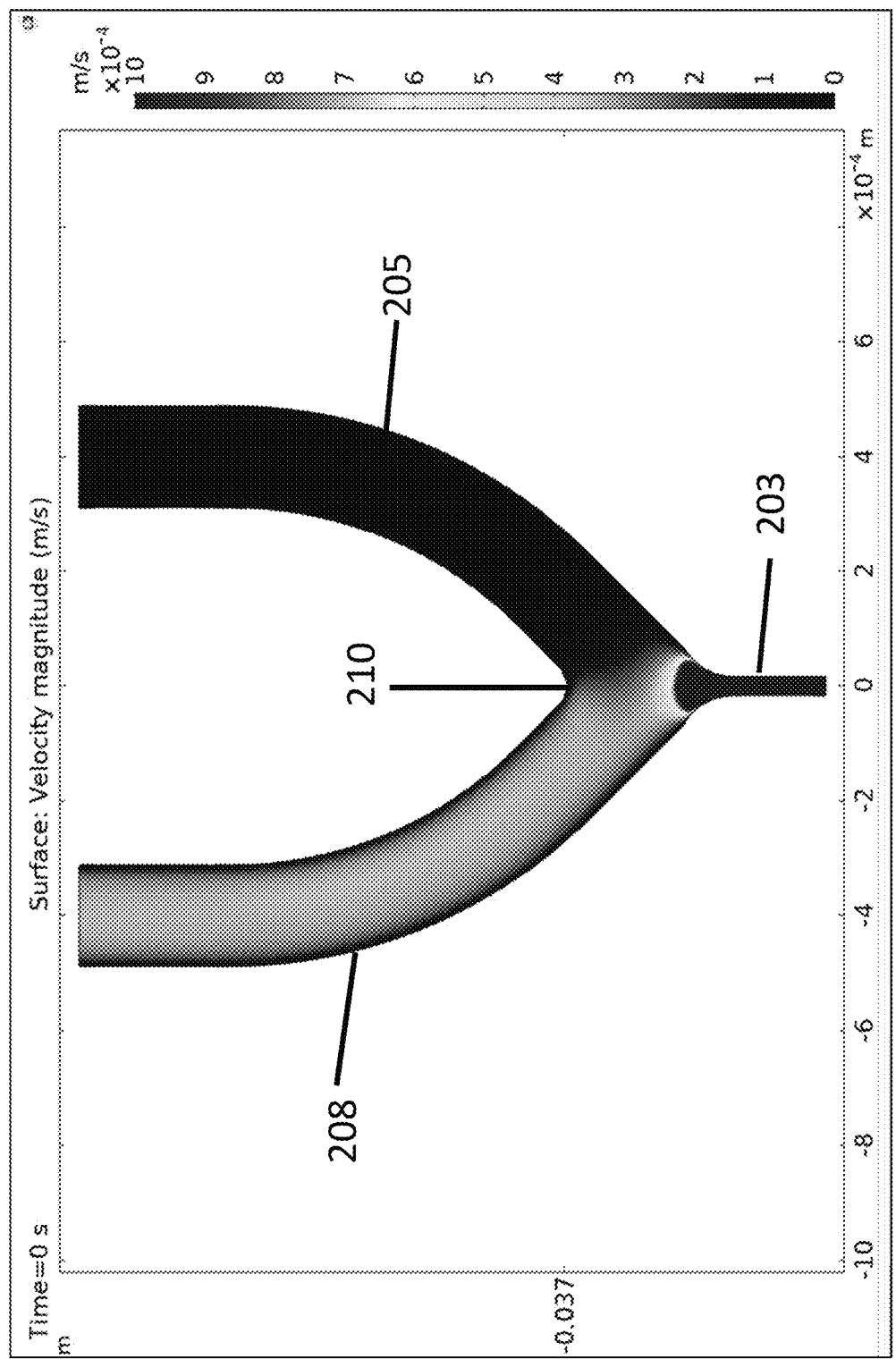
FIG. 38 provides a schematic drawing of an example chip with intersecting channels.

As the protein fractions and ampholytes migrate out of separation channels 205 past cathode wells 204, they mix with mobilizer agent from channels 208 at intersection 210 (see FIG. 38). The mobilizer agent is being delivered to sample outlets 203 at a defined flowrate (e.g., 7.5 nL/s), and this flowrate in channels 208 corresponds to a linear velocity (e.g., 1.4 mm/s). As the enriched protein fractions and ampholytes mix in the mobilizing agent, the new environment (reagent) causes a change in their electrophoretic mobility. This generates a linear electrophoretic velocity for ampholytes and protein fractions towards the electrodes in electrical communication with mobilizer channels 208—that is, in the opposite direction of the mobilizer linear velocity toward the tip. In some instances, the chip network is designed so that the electrophoretic velocity of the enriched protein fractions will be less than the mobilizer flow velocity, so that enriched protein fractions migrate out the sample outlets (electrospray tips) 203 into electrospray and into a mass spectrometer for detection. In some embodiments, the chip network is designed so that the electrophoretic velocity of some or all of the ampholytes is greater than the mobilizer linear velocity, so that some or all of the ampholytes migrate towards the electrodes in electrical communication with mobilizer channels 208 and are not introduced to the tips 203. In some instances, the ampholyte concentration is diluted in this way to reduce amount of ionizable material in the electrospray, which can lead to improved ionization of the enriched protein fractions. In some instances, the channel network may be designed to maximize the introduction of the enriched protein fractions in to the electrospray and to minimize the introduction of other sample components into the electrospray. In some instances, the channel network may be designed to maximize the introduction of the enriched protein fractions in to the electrospray and to minimize the introduction of ampholytes into the electrospray.

For example, the electrophoretic mobility of NIST monoclonal antibody (NIST mAb) standard (pn 8671, NIST reference material) in 49% water, 1% formic acid, 50% MeCN mobilizer has been measured to be $1.5 \times 10^{-4}$ cm$^2$/Vs. In an electric field of strength 675V/cm, this would result in a linear velocity of $(1.5 \times 10^{-4}$ cm$^2$/Vs$) \times (675$V/cm$) = 1.0 \times 10^{-1}$ cm/s, or, 1 mm/s toward the electrode in electrical connection with mobilizer channels 208. In this example, if mobilizer channels 208 were etched to 50 microns deep by 110 microns wide, channels 208 would have a volume of 5.5 nL/mm, so a mobilizer flowrate of 7.5 nL/s would correspond to a linear flowrate of 1.4 mm/s. This would overcome the NIST mAb electrophoretic velocity of 1 mm/s and the NIST mAb would exit the chip through sample outlet 203 into the electrospray.

Pharmalyte brand ampholyte gradient pH 8-10.5 has been measured to have an electrophoretic mobility of on average of $2.7 \times 10^{-4}$ cm$^2$/Vs in mobilizer, which corresponds to a linear velocity average of 1.8 mm/s in our example 675V/cm electric field. In the example, channels 208 which are 50 micron deep and 110 micron wide described above, this would overcome the 1.4 mm/s linear velocity of the mobilizer, and most of the ampholyte would migrate towards the electrodes in electrical communication with mobilizer channels 208 and not exit the chip through electrospray tips 203, thus reducing the amount of ampholyte which could interfere with ionization of the enriched protein fractions in the electrospray.

What is claimed is:

1. A method for performing a plurality of isoelectric focusing separations in parallel, the method comprising:
    a) providing a device comprising a planar substrate, wherein the planar substrate comprises a plurality of separation channels;
    b) introducing a sample comprising a mixture of analytes into at least two separation channels of the plurality of separation channels;
    c) controlling a voltage applied to the at least two separation channels to perform the plurality of isoelectric focusing separations to separate the mixture of analytes of the sample in the at least two separation channels;
    d) independently monitoring current of the at least two separation channels to determine a progress of the plurality of isoelectric focusing separations as the plurality of isoelectric focusing separations are performed in parallel;
    wherein a first end of the at least two separation channels of the plurality of separation channels is electrically coupled to an anolyte reservoir using a first membrane-containing high voltage electrode fixture;
    and wherein the first membrane-containing high voltage electrode fixture comprises: an electrode reservoir;
        a membrane;
        an inlet fluid channel comprising a first end and a second end; and
        an outlet fluid channel comprising a first end that is fluidically coupled to the second end of the inlet fluid channel, and a second end that is fluidically coupled to a separation channel, wherein the inlet fluid channel and the outlet fluid channel intersect with and are fluidically coupled to each other at a plane that defines or is parallel to a surface of the electrode reservoir;
        wherein the membrane is disposed within the electrode reservoir at or adjacent to the plane such that the membrane covers all or substantially all of an opening comprising an intersection of the inlet fluid channel and the outlet fluid channel; and
        wherein the membrane provides a high hydrodynamic resistance, low electrical resistance connection between a high voltage electrode positioned within the electrode reservoir and a fluid contained within the inlet fluid channel and the outlet fluid channel.

2. The method of claim 1, wherein a second end of the at least two separation channels of the plurality of separation channels is electrically coupled to a catholyte reservoir using a second membrane-containing high voltage electrode fixture.

3. The method of claim 1, wherein voltages applied to the at least two separation channels are independently controlled.

4. The method of claim 1, wherein the sample introduced into each of the at least two separation channels is the same, and a first set of experimental conditions is used to perform the isoelectric focusing separations in a first subset of the at least two separation channels and a second set of experimental conditions is used to perform the isoelectric focusing separations in a second subset of the at least two separation channels.

5. The method of claim 1, wherein the sample introduced into each of the at least two separation channels is different for at least two subsets of the at least two separation channels and the same set of experimental conditions is used to perform the isoelectric focusing separations in each of the at least two separation channels.

6. The method of claim 1, further comprising recording a current trace for each of the at least two separation channels while performing the plurality of isoelectric focusing separations.

7. The method of claim 1, wherein the method further comprises flushing the at least two separation channels following completion of the isoelectric focusing separations and introducing another sample into the at least two separation channels in an automated fashion.

8. The method of claim 1, wherein detection of a failure in any of the at least two separation channels triggers an automated re-introduction and repeat of the isoelectric focusing separation for the sample that had been introduced into that separation channel.

9. The method of claim 8, wherein the failure comprises introduction of a bubble, formation of a bubble, an incorrectly prepared sample, an underfilled reagent reservoir, or any combination thereof.

10. The method of claim 9, wherein the failure is detected by monitoring the current of at least one of the at least two separation channels or by processing an image of at least one of the at least two separation channels.

11. The method of claim 1, further comprising measuring dynamic light scattering in at least one of the at least two separation channels while performing isoelectric focusing.

12. The method of claim 11, wherein the measurement of dynamic light scattering provides a determination of a size distribution profile, a determination of an aggregation state, or a determination of a hydrodynamic radius for one or more separated analytes.

13. The method of claim 1, wherein the membrane is hydrophilic and comprises cellulose or polytetrafluoroethylene (PTFE).

14. The method of claim 1, wherein the first membrane-containing high voltage electrode fixture further comprises an insert disposed within the electrode reservoir and positioned at or adjacent to the membrane, wherein the insert comprises an inlet fluid path and an outlet fluid path that facilitates substantially bubble-free wetting of a surface of the membrane when the electrode reservoir is filled with an electrolyte solution.

* * * * *